United States Patent
Kurokawa

(10) Patent No.: US 11,336,014 B2
(45) Date of Patent: May 17, 2022

(54) ANTENNA DEVICE AND MULTIAXIAL ANTENNA DEVICE INCLUDING ANTENNA DEVICE

(71) Applicant: Murata Manufacturing Co., Ltd., Nagaokakyo (JP)

(72) Inventor: Takashi Kurokawa, Nagaokakyo (JP)

(73) Assignee: MURATA MANUFACTURING CO., LTD., Nagaokakyo (JP)

(\*) Notice: Subject to any disclaimer, the term of this patent is extended or adjusted under 35 U.S.C. 154(b) by 213 days.

(21) Appl. No.: 16/819,670

(22) Filed: Mar. 16, 2020

(65) Prior Publication Data

US 2020/0220267 A1 Jul. 9, 2020

Related U.S. Application Data

(63) Continuation of application No. PCT/JP2018/035033, filed on Sep. 21, 2018.

(30) Foreign Application Priority Data

Sep. 28, 2017 (JP) .............................. JP2017-187545

(51) Int. Cl.
*H01Q 1/00* (2006.01)
*H01Q 7/08* (2006.01)
(Continued)

(52) U.S. Cl.
CPC ............. *H01Q 7/08* (2013.01); *H01Q 1/3241* (2013.01); *H01Q 1/36* (2013.01); *H04B 5/0081* (2013.01)

(58) Field of Classification Search
CPC ........... H01Q 7/08; H01Q 1/3241; H01Q 1/36
See application file for complete search history.

(56) References Cited

U.S. PATENT DOCUMENTS 6,243,045 B1 6/2001 Ishibashi
2004/0061660 A1\* 4/2004 Yoshida ................... H01Q 7/06
343/788

(Continued)

FOREIGN PATENT DOCUMENTS

JP H11282993 A 10/1999
JP 2005234754 A \* 9/2005
(Continued)

OTHER PUBLICATIONS

International Search Report Issued for PCT/JP2018/035033, dated Dec. 11, 2018.
(Continued)

*Primary Examiner* — Dieu Hien T Duong
(74) *Attorney, Agent, or Firm* — ArentFox Schiff LLP

(57) ABSTRACT

An antenna device includes a magnetic core having first and second main surfaces and extending in a first direction, and planar first and second coils connected in series and disposed next to each other in the first direction. The first coil has a first portion located on a side of the first main surface and a second portion located on a side of the second main surface and not overlapping the first portion in a plan view. The second coil has a third portion located on the side of the first main surface and a fourth portion located on the side of the second main surface and disposed at a position that does not overlap the third portion in the plan view. The shortest distance between the second and fourth portions is shorter than the shortest distance between the second and third portions.

18 Claims, 46 Drawing Sheets

(51) Int. Cl.
*H01Q 1/32* (2006.01)
*H01Q 1/36* (2006.01)
*H04B 5/00* (2006.01)

(56) References Cited

U.S. PATENT DOCUMENTS

| | | | |
|---|---|---|---|
| 2007/0008140 A1* | 1/2007 | Saarisalo | G06K 7/0008 |
| | | | 340/572.7 |
| 2007/0195001 A1 | 8/2007 | Ueda | |
| 2010/0066626 A1 | 3/2010 | Ueda | |
| 2010/0321267 A1 | 12/2010 | Ito et al. | |
| 2013/0321235 A1* | 12/2013 | Luong | G06K 19/07773 |
| | | | 343/850 |
| 2015/0222016 A1* | 8/2015 | Sato | H01Q 7/06 |
| | | | 343/788 |
| 2018/0212326 A1 | 7/2018 | Orihara | |

FOREIGN PATENT DOCUMENTS

| | | | |
|---|---|---|---|
| JP | 2009136022 A | 6/2009 | |
| JP | 2011004316 A | 1/2011 | |
| JP | 2016103834 A | 6/2016 | |
| WO | 2016190055 A1 | 12/2016 | |
| WO | 2017169543 A1 | 10/2017 | |

OTHER PUBLICATIONS

Written Opinion of the International Searching Authority issued for PCT/JP2018/035033, dated Dec. 11, 2018.

\* cited by examiner (PRIOR ART)

(PRIOR ART)

(PRIOR ART)

ANTENNA DEVICE AND MULTIAXIAL ANTENNA DEVICE INCLUDING ANTENNA DEVICE

CROSS REFERENCE TO RELATED APPLICATIONS

The present application is a continuation of PCT/JP2018/035033 filed Sep. 21, 2018, which claims priority to Japanese Patent Application No. 2017-187545, filed Sep. 28, 2017, the entire contents of each of which are incorporated herein by reference.

TECHNICAL FIELD

The present invention relates to an antenna device including a magnetic core and coils, and a multiaxial antenna device including such antenna devices.

BACKGROUND

Antenna devices for communication with external devices via magnetic field signals are known. Antenna devices are used in, for example, communication systems called keyless entry systems with which doors of automobiles are unlocked or locked by remote control.

As an antenna used in an antenna device, a bar antenna 490 in which a coil 492 is wound around a rod-shaped core 491 as shown in FIG. 63 is known. The receiving sensitivity of the bar antenna 490 is the highest when an angle θz (see, e.g., FIG. 64) between a receiving magnetic field and a core axis is 0°. The receiving sensitivity decreases with an increase in the angle θz, and becomes substantially zero at 90° (see, e.g., FIG. 65).

For purposes of this disclosure, the direction of an incident magnetic field, in which the receiving sensitivity of a receiving antenna is maximum, is termed a maximum receiving sensitivity direction, and the direction of an output magnetic field, in which the transmission sensitivity of a transmission antenna is maximum, is termed a maximum transmission sensitivity direction. The maximum receiving sensitivity direction and the maximum transmission sensitivity direction are collectively termed a maximum transmission/receiving sensitivity direction.

Incidentally, there is a request for a low-profile antenna device, and Patent Document 1 (identified below) describes one configuration example of a low-profile antenna device. FIG. 66(a) is a plan view of the antenna device 520 described in Patent Document 1, and FIG. 66(b) is a side view of the antenna device 520.

The antenna device 520 described in Patent Document 1 includes a magnetic core 521 and a coil conductor 522. The magnetic core 521 has a first main surface MS1 and a second main surface MS2. The coil conductor 522 has a first conductor portion 523 and a second conductor portion 524. The first conductor portion 523 is located on the side of the first main surface MS1 of the magnetic core 521. The second conductor portion 524 is located on the side of the second main surface MS2 of the magnetic core 521 and is disposed at a position different from that of the first conductor portion 523 in plan view in a first main surface direction or a second main surface direction.

Patent Document 1: Japanese Unexamined Patent Application Publication No. 2016-103834.

The maximum transmission/receiving sensitivity of the antenna device 520 described in Patent Document 1 is a combined sensitivity of a maximum transmission/receiving sensitivity caused by a magnetic field that links with only the coil and a maximum transmission/receiving sensitivity caused by a magnetic field that passes along the magnetic core and links with the coil. It is found that, in the case where the maximum transmission/receiving sensitivity direction coincides with an axial direction of the magnetic core or the maximum transmission/receiving sensitivity direction is a direction perpendicular to the main surfaces of the magnetic core, the maximum transmission/receiving sensitivity direction remains unchanged when a metal is brought close to the antenna device 520. However, in the case where the maximum transmission/receiving sensitivity direction is other than the above-described directions, when a metal is brought close to the antenna device 520, the maximum transmission/receiving sensitivity direction changes as a result of being brought close to the metal.

SUMMARY OF THE INVENTION

Accordingly, it is an object of the present invention to provide an antenna device that reduces a change in maximum transmission/receiving sensitivity direction when a metal is brought close to the antenna device by setting the maximum transmission/receiving sensitivity direction to an axial direction of a magnetic core or a direction perpendicular to main surfaces of the magnetic core, and a multiaxial antenna device including such antenna devices.

In an exemplary aspect, an antenna device includes a magnetic core having a first main surface and a second main surface and extending in a first direction; a planar first coil; and a planar second coil connected in series with the first coil and disposed next to the first coil along the first direction. The first coil has a first portion located on a side of the first main surface of the magnetic core and a second portion located on a side of the second main surface of the magnetic core and disposed at a position that does not overlap the first portion in plan view to the first main surface or the second main surface. The second coil has a third portion located on the side of the first main surface of the magnetic core and a fourth portion located on the side of the second main surface of the magnetic core and disposed at a position that does not overlap the third portion in plan view to the first main surface or the second main surface. A shortest distance between the second portion and the fourth portion is shorter than a shortest distance between the second portion and the third portion.

When viewed such that an electrical winding direction of the first coil and an electrical winding direction of the second coil are equal to each other, electrical winding starts or electrical winding ends of the first coil and second coil may be connected to each other. For purposes of this disclosure, the phrase "when viewed such that an electrical winding direction of the first coil and an electrical winding direction of the second coil are equal to each other" means that, when a direction from one end (e.g., electrical winding start) of the first coil to another end portion (e.g., electrical winding end) of the first coil is a clockwise direction, one end portion (e.g., electrical winding start) of the second coil and another end portion (e.g., electrical winding end) of the second coil are defined such that a direction from the one end portion (e.g., electrical winding start) of the second coil to the other end portion (e.g., electrical winding end) of the second coil is also a clockwise direction.

In an exemplary aspect, the magnetic core may have a rectangular plate shape, and each of the first coil and the second coil may have a winding axis in a direction perpendicular to the first main surface or second main surface of the magnetic core.

Moreover, the magnetic core may be made up of a combination of a plurality of members.

In an exemplary aspect, the magnetic core may have a bent shape when viewed in a direction parallel to the first main surface.

In another exemplary aspect, the first coil and the second coil each may have a bent shape when viewed in a direction parallel to the first main surface of the magnetic core.

Moreover, at least one of the first coil and the second coil may be formed on or in a board.

The antenna device may further include an electronic component implemented on or in the board.

The antenna device may further include a plurality of first tap extended lines respectively connected to different points of the first coil and a plurality of second tap extended lines respectively connected to different points of the second coil, and any one of the plurality of first tap extended lines and any one of the plurality of second tap extended lines may be connected to each other.

Yet further, the antenna device may further include an external connector on the board.

The antenna device may further include a switch for switching connection between an electrical winding start of the first coil and any one of an electrical winding start or electrical winding end of the second coil and switching connection between an electrical winding end of the first coil and another one of the electrical winding start and electrical winding end of the second coil.

The first coil may be configured such that a first driver circuit for driving the first coil is connectable to the first coil, and the second coil may be configured such that a second driver circuit for driving the second coil in synchronization with driving of the first coil is connectable to the second coil.

In addition, the first coil and the second coil each may be made up of a conductor pattern formed in three or more conductor pattern layers, and the antenna device may further include a plurality of guard conductor pattern layers disposed outward in an axial direction of the first coil or the second coil, having such a shape that loop current does not flow, and having guard conductor patterns electrically connected to a ground.

The first coil and the second coil each can comprise a conductor pattern formed in three or more conductor pattern layers, and, of the three or more conductor pattern layers, the conductor patterns in the outermost layers may be connected in series with each other, and one ends of the conductor patterns in the outermost layers, connected in series with each other, may be electrically connected to a ground.

A multiaxial antenna device includes a plurality of antenna devices including any one of the above-described antenna devices.

Moreover, in the multiaxial antenna device, the magnetic core may have an integrally formed cross shape.

With the antenna device of the exemplary embodiments of present invention, the maximum transmission/receiving sensitivity direction can be brought into coincidence with the axial direction of the magnetic core or the direction perpendicular to the main surfaces of the magnetic core. With this configuration, a change in the maximum transmission/receiving sensitivity direction can be reduced when a metal is brought close to the antenna device.

Moreover, with the exemplary antenna device, the maximum transmission/receiving sensitivity can be provided in a plurality of directions, and each maximum transmission/receiving sensitivity direction can be brought into coincidence with the axial direction of the magnetic core or the direction perpendicular to the main surfaces of the magnetic core. With this configuration, a change in the maximum transmission/receiving sensitivity direction can be reduced even when a metal is brought close to the multiaxial antenna device.

BRIEF DESCRIPTION OF DRAWINGS

FIGS. 54(a) and 54(b) show plan views of a multiaxial antenna device according to a sixteenth exemplary embodiment, in which FIG. 54(a) shows a front surface and FIG. 54(b) shows a back surface.

FIGS. 58(a) and 58(b) shows plan views of a multiaxial antenna device according to a first modification of the sixteenth exemplary embodiment, in which FIG. 58(a) shows a front surface and FIG. 58(b) shows a back surface.

DETAILED DESCRIPTION OF EMBODIMENTS

Hereinafter, features of the present invention will be specifically described by way of exemplary embodiments.

First Embodiment

Figure 1:
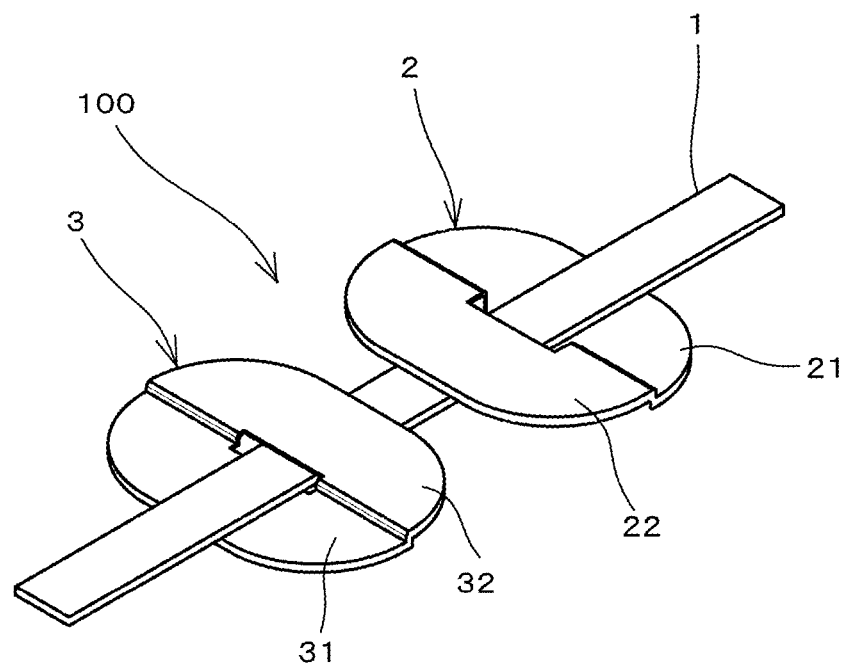
FIG. 1 is a perspective view of an antenna device according to a first exemplary embodiment.
Figure 2:
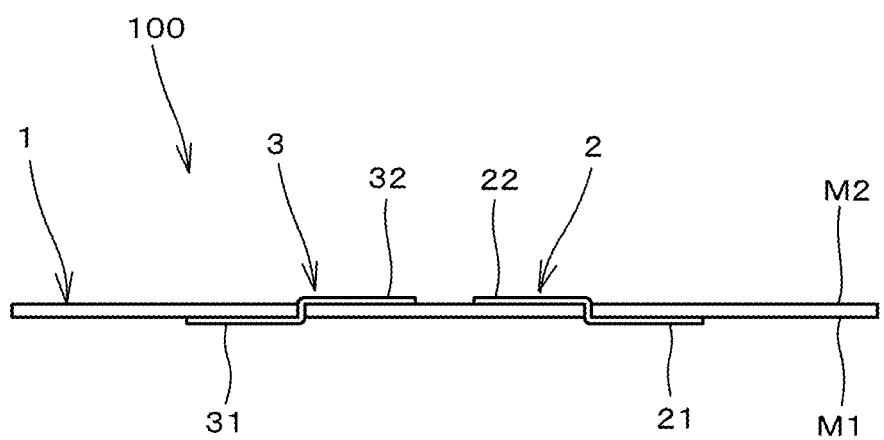
FIG. 2 is a side view of the antenna device according to the first exemplary embodiment.

FIG. 1 is a perspective view that shows an antenna device 100 according to a first embodiment. FIG. 2 is a side view of the antenna device 100 according to the first embodiment. Hereinafter, description will be made on the assumption that the antenna device 100 is a receiving antenna device configured to receive a magnetic field signal. However, the antenna device 100 can be configured as a transmitting antenna device that outputs a magnetic field signal in an alternative aspect.

As shown, the antenna device 100 according to the first embodiment includes a magnetic core 1, a first coil 2, and a second coil 3. In FIG. 1, the first coil 2 and the second coil 3 are schematically shown.

The magnetic core 1 has a thin rectangular plate shape extending in a first direction, and has a first main surface M1 and a second main surface M2.

When viewed in the first direction that is an axial direction of the magnetic core 1, more specifically, the axial direction that is a direction from the first coil 2 toward the second coil 3, the first coil 2 is disposed from the first main surface M1 of the magnetic core 1 to the second main surface M2 of the magnetic core 1. In other words, the first coil 2 has a first portion 21 located on the side of the first main surface M1 of the magnetic core 1 and a second portion 22 located on the side of the second main surface M2. The first portion 21 of the first coil 2, located on the side of the first main surface M1, is a portion having a surface facing the first main surface M1. The second portion 22 of the first coil 2, located on the side of the second main surface M2, is a portion having a surface facing the second main surface M2.

The second portion 22 of the first coil 2 is disposed at a position that does not overlap the first portion 21 in plan view to the first main surface M1 or second main surface M2 of the magnetic core 1 (e.g., the vertical or thickness direction of the antenna device 100). As shown in FIG. 2, the second portion 22 of the first coil 2, located on the side of the second main surface M2, is located higher (i.e., above) than the first portion 21 located on the side of the first main surface M1. In other words, the first coil 2 has a bent shape when viewed in a direction parallel to the first main surface M1 and second main surface M2 of the magnetic core 1 and perpendicular to a longitudinal direction of the magnetic core 1.

The second coil 3 is disposed next to the first coil 2 in the first direction. When viewed in the first direction that is the axial direction of the magnetic core 1, more specifically, the axial direction that is the direction from the first coil 2 toward the second coil 3, the second coil 3 is disposed from the second main surface M2 of the magnetic core 1 to the first main surface M1 of the magnetic core 1. In other words, the second coil 3 has a third portion 31 located on the side of the first main surface M1 of the magnetic core 1 and a fourth portion 32 located on the side of the second main surface M2. The third portion 31 of the second coil 3, located on the side of the first main surface M1, is a portion having a surface facing the first main surface M1. The fourth portion 32 of the second coil 3, located on the side of the second main surface M2, is a portion having a surface facing the second main surface M2.

The fourth portion 32 of the second coil 3 is disposed at a position that does not overlap the third portion 31 in plan view to the first main surface M1 or second main surface M2 of the magnetic core 1. As shown in FIG. 2, the fourth portion 32 of the second coil 3, located on the side of the second main surface M2, is located higher (i.e., above) than the third portion 31 located on the side of the first main surface M1. In other words, the second coil 3 has a bent shape when viewed in the direction parallel to the first main surface M1 and second main surface M2 of the magnetic core 1 and perpendicular to the longitudinal direction of the magnetic core 1.

The first portion 21 and second portion 22 of the planar first coil 2 each have a substantially flat plate shape. The third portion 31 and fourth portion 32 of the planar second coil 3 each have a substantially flat plate shape. Therefore, as shown in FIG. 2, the antenna device 100 has a low-profile shape with a small thickness as a whole.

The second portion 22 of the first coil 2, located on the side of the second main surface M2, is close to the fourth portion 32 of the second coil 3, located on the side of the second main surface M2. In other words, in the axial direction (extending direction) of the magnetic core 1, the shortest distance between the second portion 22 of the first coil 2 and the fourth portion 32 of the second coil 3 is shorter than the shortest distance between the second portion 22 of the first coil 2 and the third portion 31 of the second coil 3.

Each of the first coil 2 and the second coil 3 has a winding axis in a direction perpendicular to the first main surface M1 or second main surface M2 of the magnetic core 1. In an exemplary aspect, the numbers of turns, thickness, winding width, wire type, and the like, of each of the first coil 2 and the second coil 3 are desirably the same.

Moreover, the first coil 2 and the second coil 3 are connected in series with each other and form a single continuous coil.

Figure 3:
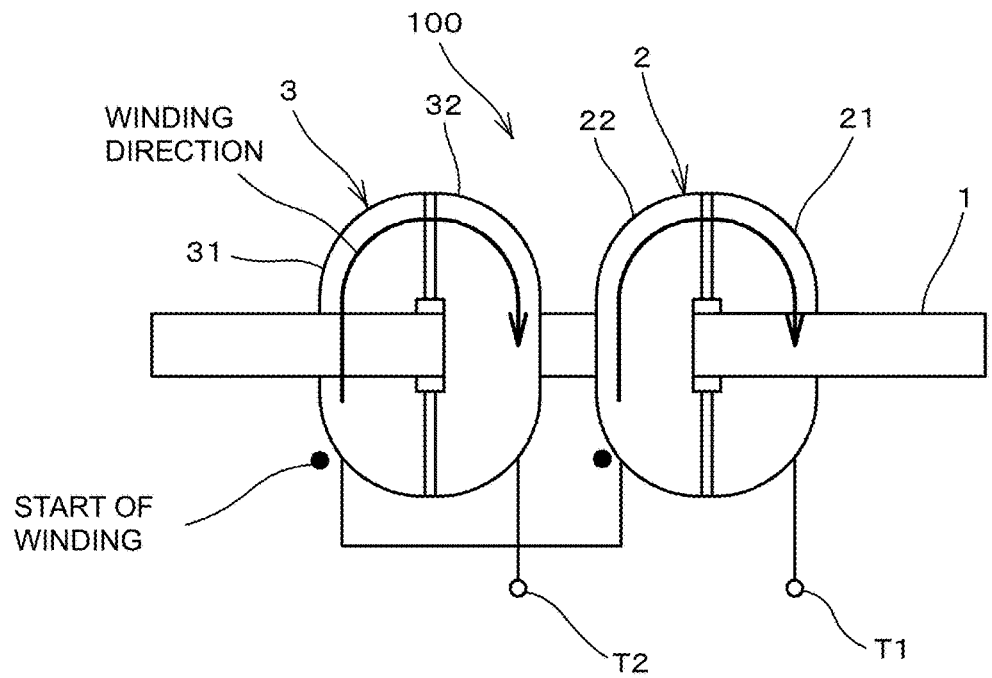
FIG. 3 is a view for illustrating a method of connecting a first coil and a second coil in the antenna device according to the first exemplary embodiment.

FIG. 3 is a view for illustrating a method of connecting the first coil 2 and the second coil 3. Here, description will be made on the assumption that the electrical winding directions of the first coil 2 and second coil 3 are the same when viewed in the direction of normal to the first main surface M1 or the second main surface M2.

In the present embodiment, as shown in FIG. 3, when viewed such that the electrical winding directions of the first coil 2 and second coil 3 are equal to each other, the electrical winding start of the first coil 2 and the electrical winding start of the second coil 3 are connected. The electrical winding end of the first coil 2 is connected to a first terminal T1. The electrical winding end of the second coil 3 is connected to a second terminal T2. The first terminal T1 is any one of an input terminal and an output terminal, and the second terminal T2 is the other one of the input terminal and the output terminal, for example.

Alternatively, the electrical winding end of the first coil 2 and the electrical winding end of the second coil 3 may be connected, the electrical winding start of the first coil 2 may be connected to the first terminal T1, and the electrical winding start of the second coil 3 may be connected to the second terminal T2 in an alternative aspect.

Figure 4:
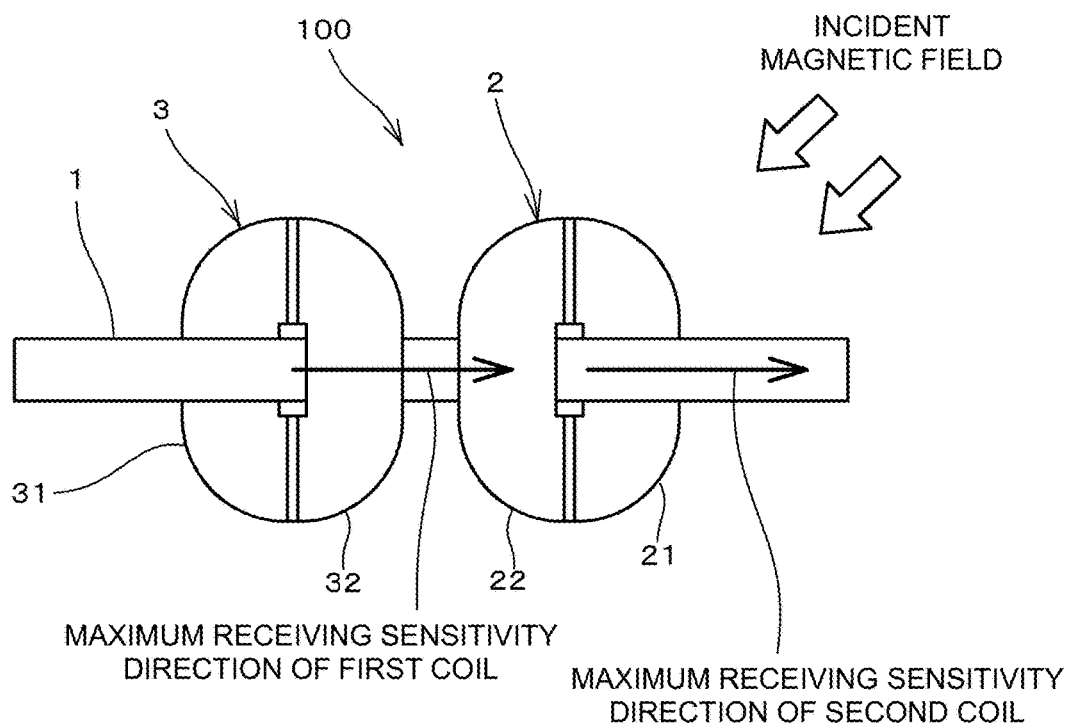
FIG. 4 is a view for illustrating the maximum transmission/receiving sensitivity of each of the first coil and the second coil in the case where a magnetic field enters in a direction parallel to a first main surface of a magnetic core.

In the antenna device 100 according to the first embodiment, having the structure as shown in FIG. 1 to FIG. 3, when a magnetic field enters in the direction parallel to the magnetic core 1 without a magnetic field component in the direction of normal to the first main surface M1 of the magnetic core 1 as shown in FIG. 4, there is almost no magnetic field that links with the first coil 2 or the second coil 3. For this reason, the maximum receiving sensitivity directions of the first coil 2 and second coil 3 each coincide with the axial direction of the magnetic core 1.

Figure 5:
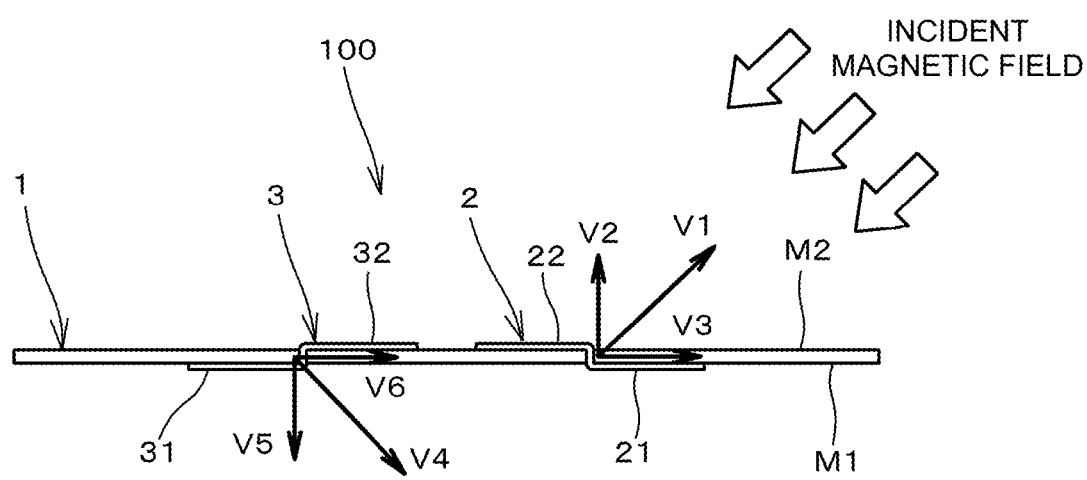
FIG. 5 is a view for illustrating the maximum transmission/receiving sensitivity of each of the first coil and the second coil in the case where a magnetic field having a magnetic field component in a direction of normal to the first main surface of the magnetic core enters.

On the other hand, as shown in FIG. 5, when a magnetic field having a magnetic field component in the direction of normal to the first main surface M1 of the magnetic core 1 enters, the maximum receiving sensitivity (e.g., vector V1) of the first coil 2 is a combined sensitivity of a maximum receiving sensitivity (e.g., vector V2) caused by a magnetic field that links with only the first coil 2 and a maximum receiving sensitivity (e.g., vector V3) caused by a magnetic field that links with the first coil 2 through the magnetic core 1.

Since the first coil 2 has a planar shape substantially parallel to the first main surface M1 and second main surface M2 of the magnetic core 1, the vector V2 coincides with the direction of normal to the second main surface M2 of the magnetic core 1 (i.e., the winding axis direction of the first coil 2). The vector V3 coincides with the axial direction of the magnetic core 1.

The maximum receiving sensitivity (e.g., vector V4) of the second coil 3 is a combined sensitivity of a maximum receiving sensitivity (e.g., vector V5) caused by a magnetic field that links with only the second coil 3 and a maximum receiving sensitivity (e.g., vector V6) caused by a magnetic field that links with the second coil 3 through the magnetic core 1.

Since the second coil 3 has a planar shape substantially parallel to the first main surface M1 and second main surface M2 of the magnetic core 1, the vector V5 coincides with the direction of normal to the first main surface M1 of the magnetic core 1 (i.e., the winding axis direction of the second coil 3). The vector V6 coincides with the axial direction of the magnetic core 1.

The first coil 2 is disposed from the first main surface M1 of the magnetic core 1 to the second main surface M2 of the magnetic core 1. The second coil 3 is disposed from the second main surface M2 of the magnetic core 1 to the first main surface M1 of the magnetic core 1. The electrical winding start of the first coil 2 and the electrical winding start of the second coil 3 are connected. For this reason, as shown in FIG. 5, the vector V5 of the second coil 3 and the vector V2 of the first coil 2 are opposite in direction. The direction of the vector V6 of the second coil 3 is the same as the direction of the vector V3 of the first coil 2.

Figure 6:
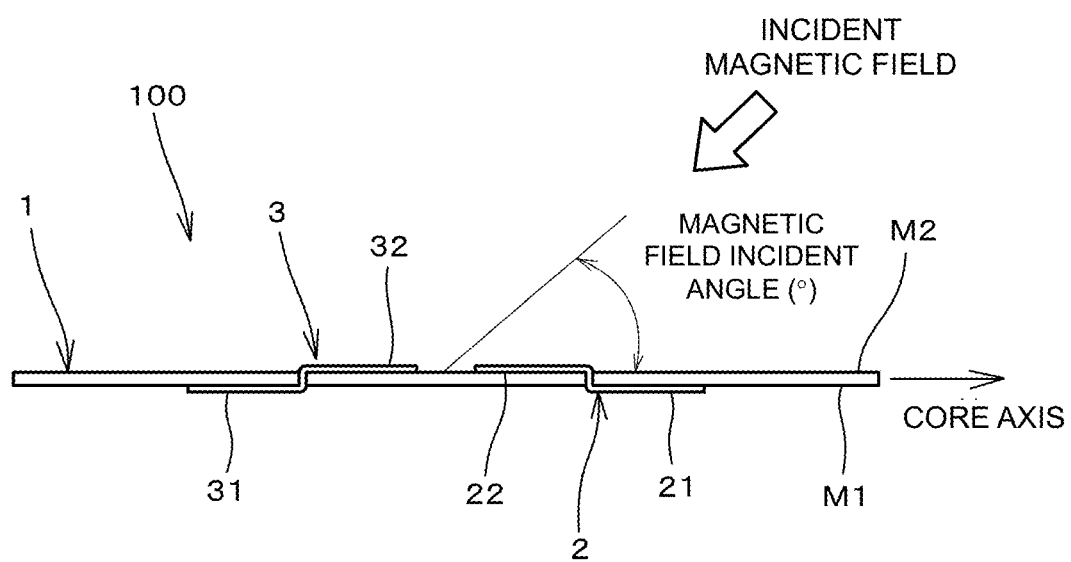
FIG. 6 is a view for illustrating a magnetic field incident angle.

Here, the relationship between an induced voltage of each of the first coil 2 and the second coil 3 and a magnetic field incident angle will be described. As shown in FIG. 6, a magnetic field incident angle is an angle formed between a core axis of the magnetic core 1 and an incident magnetic field.

Figure 7A:
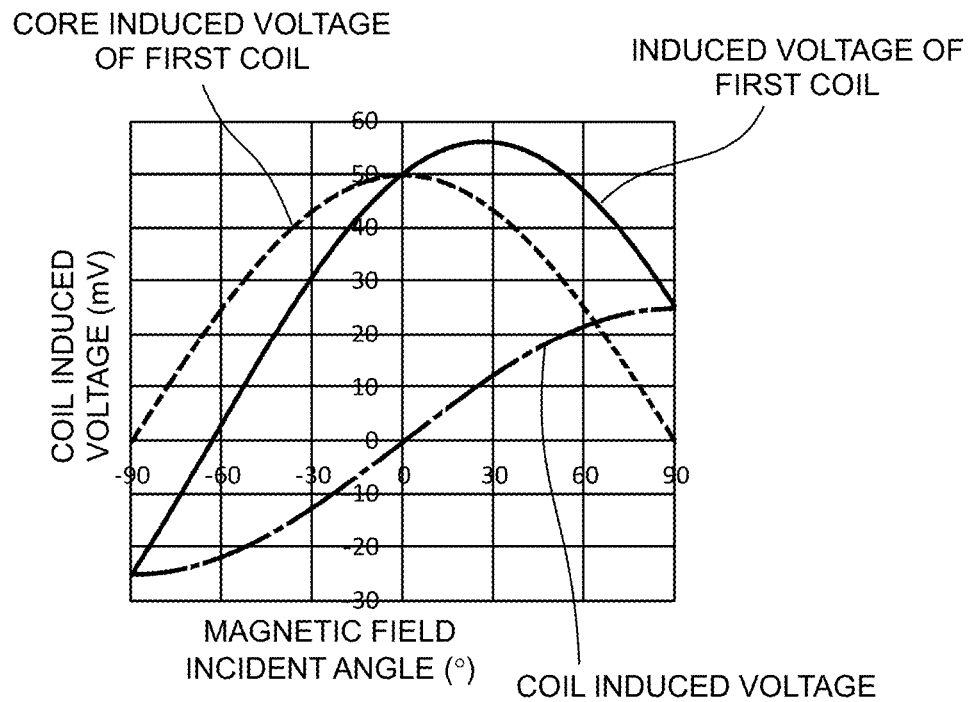
FIG. 7(a) is a graph that shows results of the relationship between a magnetic field incident angle and an induced voltage of the first coil, obtained through calculation.
Figure 7B:
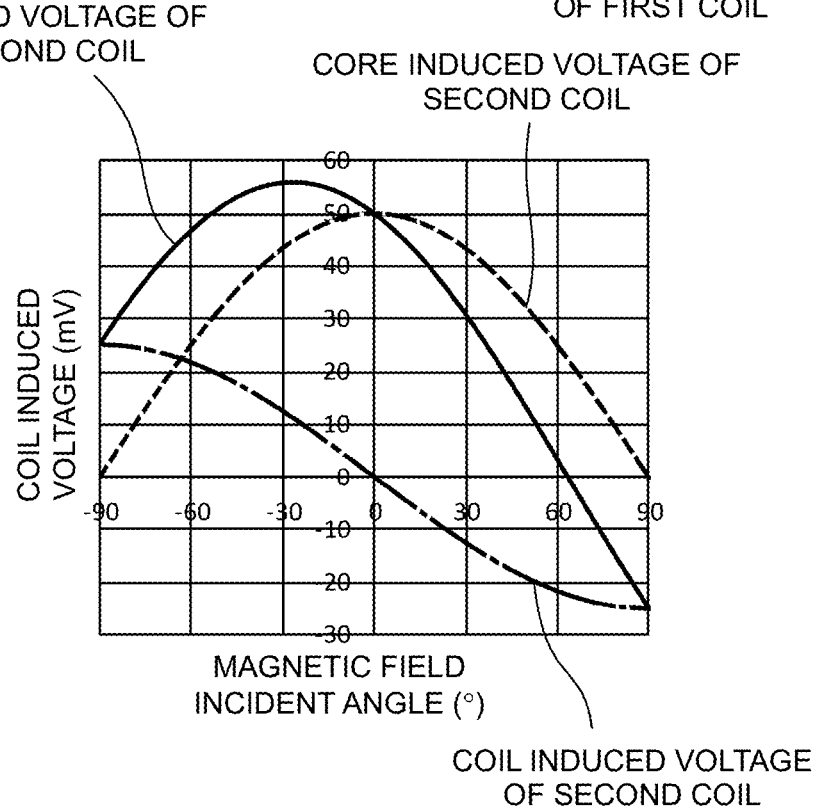
FIG. 7(b) is a graph that shows results of the relationship between a magnetic field incident angle and an induced voltage of the second coil, obtained through calculation.

FIG. 7(*a*) is a graph that shows results of the relationship between a magnetic field incident angle and an induced voltage of the first coil 2, obtained through calculation. In FIG. 7(*a*), the dashed line represents an induced voltage caused by a magnetic field that links with the first coil 2 through the magnetic core 1 (hereinafter, referred to as the core induced voltage of the first coil 2), the alternate long and short dashed line represents an induced voltage caused by a magnetic field that links with only the first coil 2 (hereinafter, referred to as the coil induced voltage of the first coil 2), and the continuous line represents an induced voltage of the first coil 2.

FIG. 7(*b*) is a graph that shows results of the relationship between a magnetic field incident angle and an induced voltage of the second coil 3, obtained through calculation. In FIG. 7(*b*), the dashed line represents an induced voltage caused by a magnetic field that links with the second coil 3 through the magnetic core 1 (hereinafter, referred to as the core induced voltage of the second coil 3), the alternate long and short dashed line represents an induced voltage caused by a magnetic field that links with only the second coil 3 (hereinafter, referred to as the coil induced voltage of the second coil 3), and the continuous line represents an induced voltage of the second coil 3.

As shown in FIG. 7(*a*) and FIG. 7(*b*), the coil induced voltage of the first coil 2 and the coil induced voltage of the second coil 3 have substantially the same magnitude and opposite phases. For this reason, the induced voltage of the first coil 2 and the induced voltage of the second coil 3 are represented by a graph symmetric with respect to a magnetic field incident angle of 0°.

In other words, the coil induced voltage of the first coil 2 and the coil induced voltage of the second coil 3 cancel each other, and an induced voltage obtained by adding the core induced voltage of the first coil 2 and the core induced voltage of the second coil 3 is the induced voltage of the antenna device 100. Therefore, the maximum receiving sensitivity direction of the antenna device 100 coincides with the axial direction of the magnetic core 1.

Figure 8:
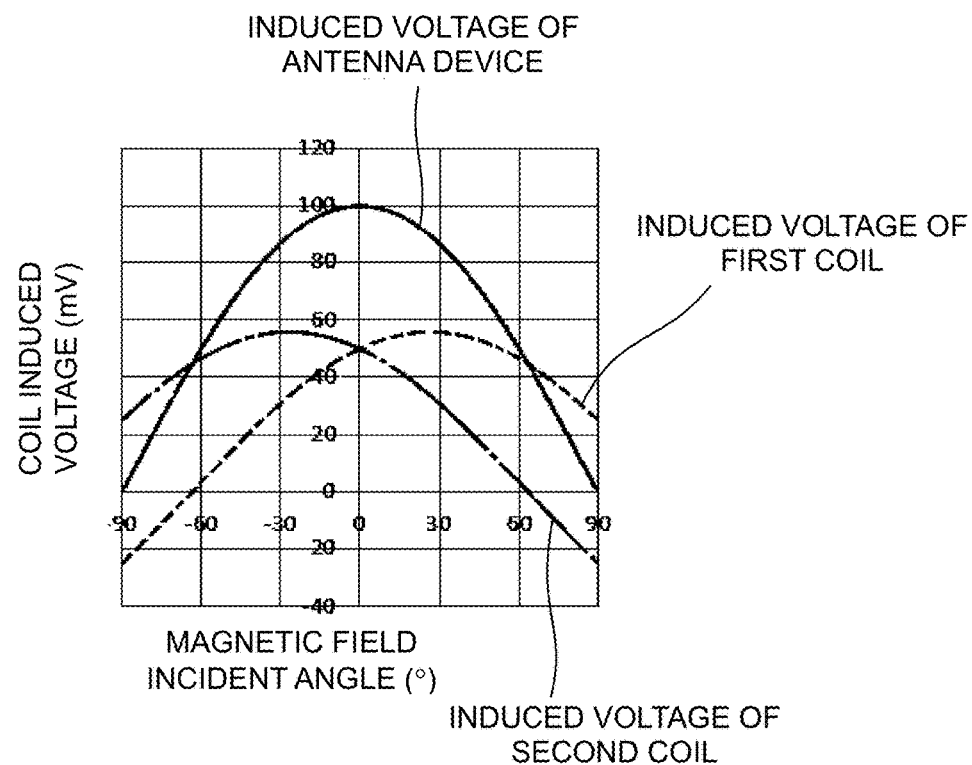
FIG. 8 is a graph that shows the relationship between a magnetic field incident angle and each of an induced voltage of the first coil, an induced voltage of the second coil, and an induced voltage of the antenna device.

FIG. 8 is a graph that shows the relationship between a magnetic field incident angle and each of an induced voltage of the first coil 2, an induced voltage of the second coil 3, and an induced voltage of the antenna device 100. As shown in FIG. 8, the induced voltage of the antenna device 100 is maximum in magnitude when the magnetic field incident angle is 0°.

Here, the magnitude of each of the induced voltage of the first coil 2 and the induced voltage of the second coil 3 is determined depending on the structure of the coil. When the first coil 2 and the second coil 3 have the same structure, the coil induced voltage of the first coil 2 and the coil induced voltage of the second coil 3 have the same magnitude and opposite phases, so the coil induced voltages cancel each other.

Figure 9:
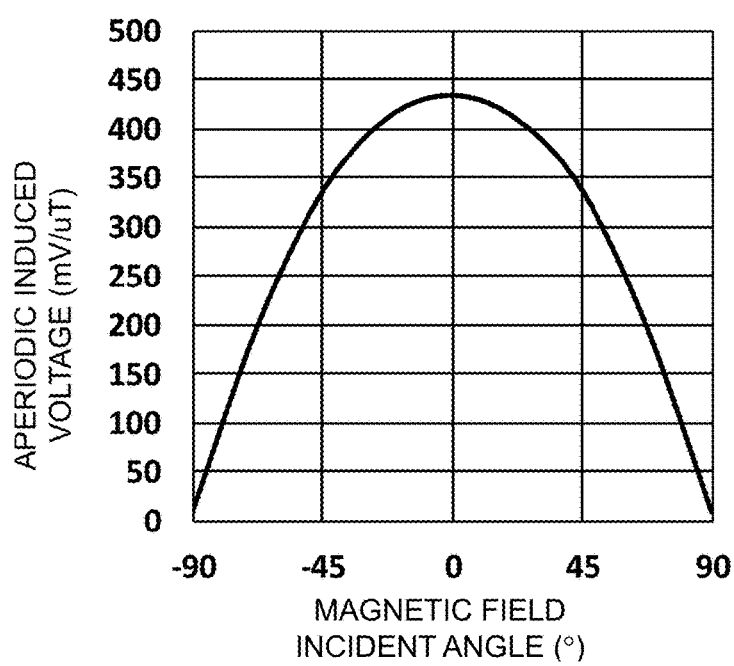
FIG. 9 is a graph that shows measured results of the relationship between a magnetic field incident angle and an induced voltage of the antenna device.

FIG. 9 is a graph that shows measured results of the relationship between a magnetic field incident angle (°) and an induced voltage (mV/μT) of the antenna device 100. The relationship between a magnetic field incident angle and an induced voltage was measured where the inductance of the first coil 2 was 3.8 mH, the inductance of the second coil 3 was 3.7 mH, the length of the magnetic core 1 in the axial direction was 50 mm, and the thickness of the antenna device 100 was 1.0 mm.

As shown in FIG. 9, the induced voltage of the antenna device 100 was maximum when the magnetic field incident angle was 0°. In other words, it demonstrated that the maximum receiving sensitivity direction of the antenna device 100 coincides with the axial direction of the magnetic core 1. In addition, even when a metal is brought close to the antenna device 100, the maximum receiving sensitivity direction remains unchanged.

In the antenna device 100 according to the present embodiment, the maximum receiving sensitivity can be increased by increasing the length of the magnetic core 1 in the axial direction. In other words, the maximum receiving sensitivity can be easily increased by increasing the length of the magnetic core 1 in the axial direction.

As described above, the magnetic core 1 of antenna device 100 has a flat plate shape, and the first coil 2 and the second coil 3 each have a bent shape when viewed in the direction parallel to the first main surface M1 and second main surface M2 of the magnetic core 1. With this configuration, the low-profile antenna device 100 is implemented without bending the magnetic core 1. By using the flat-plate magnetic core 1, insertion of the magnetic core 1 into the first coil 2 and the second coil 3 is easy during manufacturing of the antenna device 100, so manufacturing efficiency improves.

In the above description, the antenna device 100 is a receiving antenna device. However, similar advantageous effects are obtained when the antenna device 100 is a transmitting antenna device having a similar configuration. With a transmitting antenna device, a magnetic field signal that is generated by applying an alternating-current voltage to the first terminal T1 and the second terminal T2 is output. With the transmitting antenna device having the structure shown in FIG. 1 to FIG. 3, the maximum transmission sensitivity direction coincides with the axial direction of the magnetic core 1. Even when a metal is brought close to the transmitting antenna device, the maximum transmission sensitivity direction remains unchanged.

(First Modification of First Embodiment)

Figure 10:
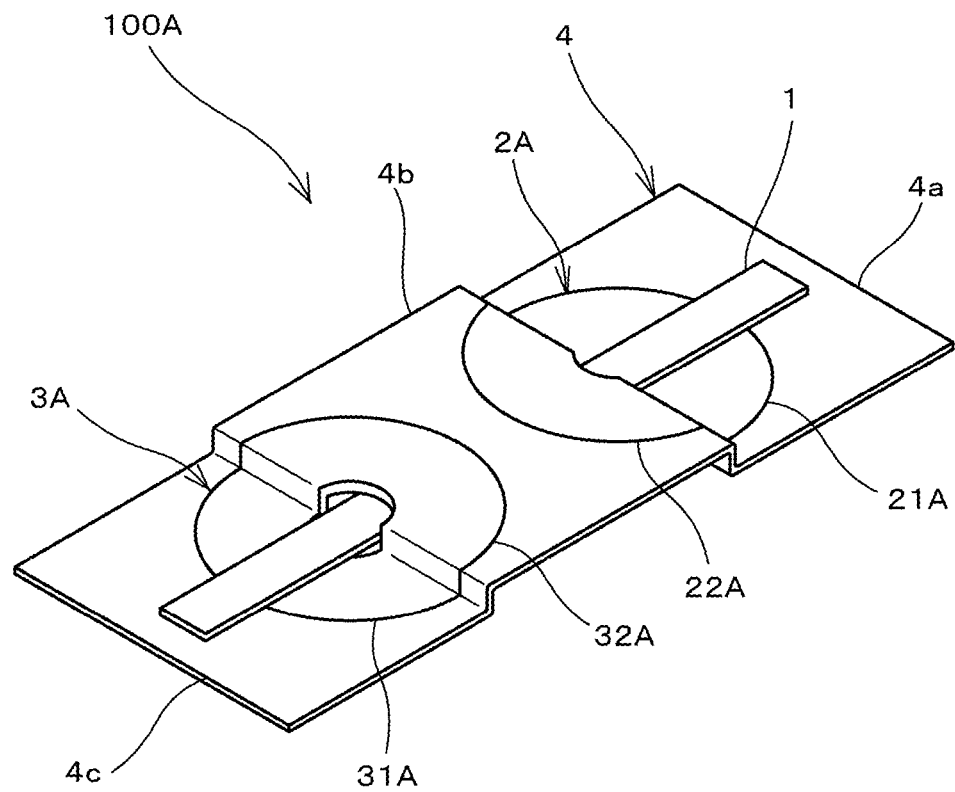
FIG. 10 is a perspective view that shows an antenna device according to a first modification of the first exemplary embodiment.
Figure 11:
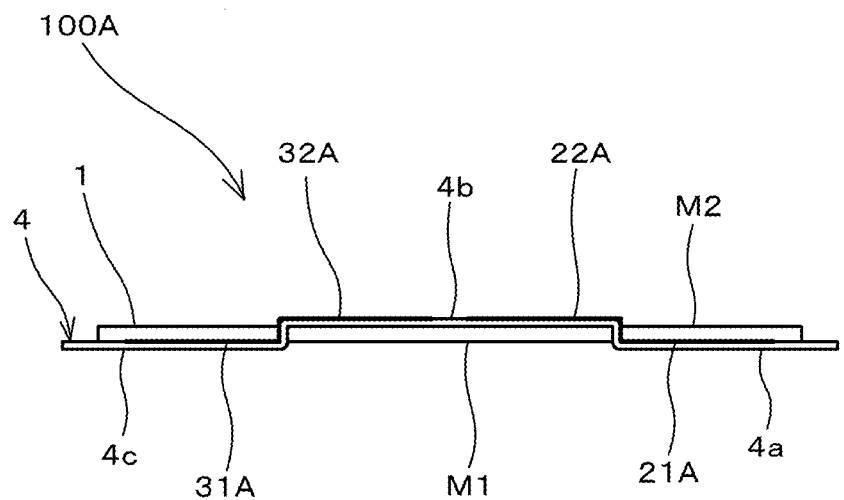
FIG. 11 is a side view of the antenna device according to the first modification of the first exemplary embodiment.

FIG. 10 is a perspective view that shows an antenna device 100A according to a first modification of the first embodiment. FIG. 11 is a side view of the antenna device 100A according to the first modification of the first embodiment. In the antenna device 100A, a first coil 2A and a second coil 3A are formed as a printed pattern on a printed circuit board 4.

The printed circuit board 4 includes a first flat plate portion 4a, a second flat plate portion 4b, and a third flat plate portion 4c. The first flat plate portion 4a and the third flat plate portion 4c are located at the same level (i.e., co-planar with one another). On the other hand, the second flat plate portion 4b is located higher than (e.g., above) the first flat plate portion 4a and the third flat plate portion 4c.

The first coil 2A is formed from the first flat plate portion 4a to the second flat plate portion 4b. A first portion 21A formed on the first flat plate portion 4a of the first coil 2A is located on side of the first main surface M1 of the magnetic core 1. A second portion 22A formed on the second flat plate portion 4b is located on the side of the second main surface M2 of the magnetic core 1.

The second coil 3A is formed from the second flat plate portion 4b to the third flat plate portion 4c. A third portion 31A formed on the third flat plate portion 4c of the second coil 3A is located on the side of the first main surface M1 of the magnetic core 1. A fourth portion 32A formed on the second flat plate portion 4b is located on the side of the second main surface M2 of the magnetic core 1.

In other words, the first coil 2A is disposed from the first main surface M1 of the magnetic core 1 to the second main surface M2 of the magnetic core 1. The second coil 3A is disposed from the second main surface M2 of the magnetic core 1 to the first main surface M1 of the magnetic core 1.

The second portion 22A of the first coil 2A, located on the side of the second main surface M2, is close to the fourth portion 32A of the second coil 3A, located on the side of the second main surface M2. In other words, the shortest distance between the second portion 22A of the first coil 2A and the fourth portion 32A of the second coil 3A is shorter than the shortest distance between the second portion 22A of the first coil 2A and the third portion 31A of the second coil 3A.

In the antenna device 100A, as well as the antenna device 100, the maximum receiving sensitivity direction coincides with the axial direction of the magnetic core 1. Advantageously, even when a metal is brought close to the antenna device 100A, the maximum receiving sensitivity direction remains unchanged.

When the first coil 2A and the second coil 3A are made up of a printed pattern of the printed circuit board 4, the following advantageous effects (1) to (6) are obtained.

(1) By taking advantage of the thin characteristic of the printed circuit board 4, the overall shape of the antenna device 100A can be a low-profile shape.

(2) With a printed pattern, as compared to a wound coil, a coil shape can be accurately formed into a desired shape. Therefore, the coil shapes of the first coil 2A and second coil 3A can be made substantially the same, so the magnitude of the coil induced voltage of the first coil 2A and the magnitude of the coil induced voltage of the second coil 3A can be made substantially the same, with the result that both voltages can be accurately cancelled.

(3) When the coils are made up of a printed pattern, coils can be easily formed even with a configuration that the number of coils is three or more or a configuration that the shape of each coil is a complicated shape, as will be described later.

(4) Input/output terminals of the first coil 2A and second coil 3A can also be made up of a printed pattern, so no bobbin, input/output terminals, protective cover, or the like, are required even though they would otherwise be required for a general coil product made by a method other than a printed pattern. With this configuration, cost can be reduced as a result of reduction in the number of components.

(5) Coils and input/output terminals are integrally formed with a printed circuit board, so no processes such as winding, soldering, and annealing required in a process of manufacturing a general coil product made by a method other than a printed pattern are required. With this configuration, manufacturing man-hours can be reduced, so manufacturing cost can be reduced.

(6) With a general coil product made by a method other than a printed pattern, there can be a bobbin crack, an adhesion part peeling, a break, or the like, from a bending load. In contrast, when coils are formed by a printed pattern, particularly, when coils are formed by a printed pattern on a flexible printed circuit board, a break or fracture due to bending is hard to occur. With this configuration, a product that is considerably strong against a bending load or a load test such as vibrational impact and drop.

So far, there have been flat panel antennas in which coils are formed on or in a printed circuit board, such as NFC antennas and wireless charging antennas. However, in these products, the maximum transmission/receiving sensitivity directions are the axial directions of the coils. With this configuration, the maximum transmission/receiving sensitivity cannot be increased by increasing the length of the magnetic core 1 in the axial direction.

In contrast, with the antenna device 100A according to the first modification of the first embodiment, the maximum transmission/receiving sensitivity direction coincides with the axial direction of the magnetic core 1. Therefore, as shown in FIG. 10, by taking advantage of the shape that the magnetic core 1 is long in the axial direction, the antenna device 100A having a high maximum transmission/receiving sensitivity can be obtained. By increasing the length of the magnetic core 1 in the axial direction, the maximum transmission/receiving sensitivity can be easily increased.

(Second Modification of First Embodiment)

Figure 12:
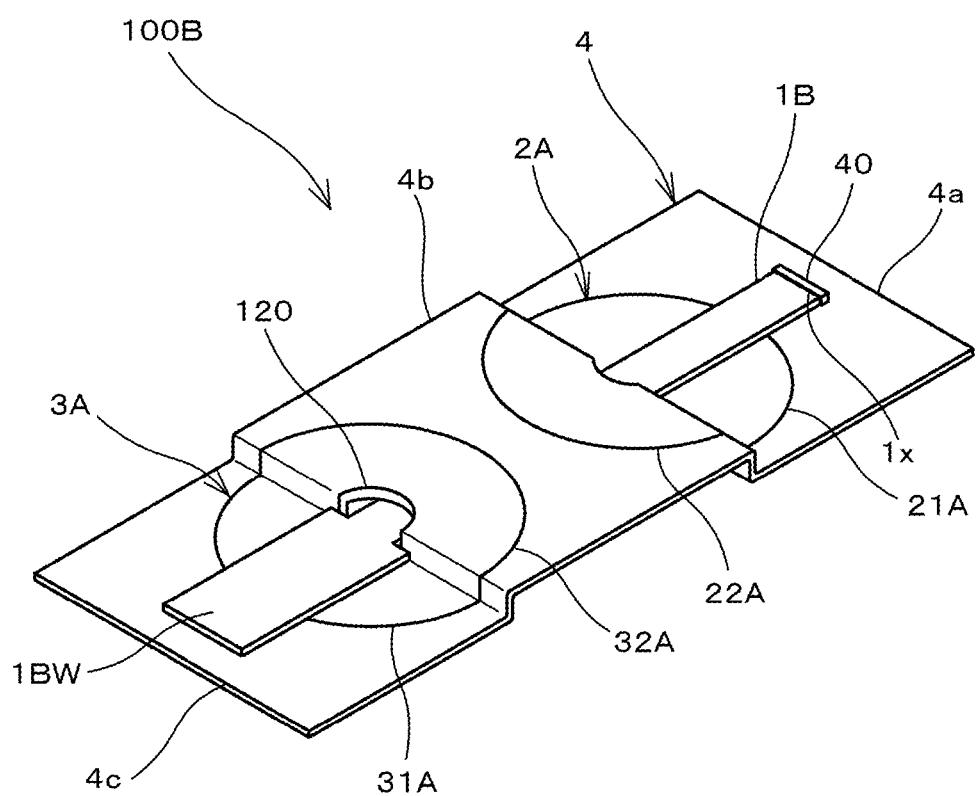
FIG. 12 is a perspective view that shows an antenna device according to a second modification of the first exemplary embodiment.

FIG. 12 is a perspective view that shows an antenna device 100B according to a second modification of the first embodiment. The antenna device 100B shown in FIG. 12 differs from the antenna device 100A shown in FIG. 10 in the shape of a magnetic core 1B and in that a core stopper 40 is provided in the printed circuit board 4.

The core stopper 40 is formed in a protruded shape with respect to the printed circuit board 4 and is used to position the magnetic core 1B by contacting with one end 1x of the magnetic core 1B in the axial direction.

The magnetic core 1B has a wide portion 1BW that is wider in width than the other portion. The wide portion 1BW is located on or above the third flat plate portion 4c of the printed circuit board 4. The width of the wide portion 1BW is greater than the diameter of a center hole 120 of the second coil 3A. With this configuration, the wide portion 1BW of the magnetic core 1B cannot move to the first coil 2A side, so the position of the magnetic core 1B relative to the printed circuit board 4 can be fixed at that position.

With the above configuration, during manufacturing of the antenna device 100B, the magnetic core 1B can be easily positioned relative to the printed circuit board 4.

Even when only any one of the above-described wide portion 1BW of the magnetic core 1B and the core stopper 40 is provided, the magnetic core 1B can be positioned relative to the printed circuit board 4.

Both sides of the magnetic core 1B in the axial direction may be positioned by providing a core stopper not only at one end 1x side of the magnetic core 1B but also at the other side.

(Third Modification of First Embodiment)

Figure 13:
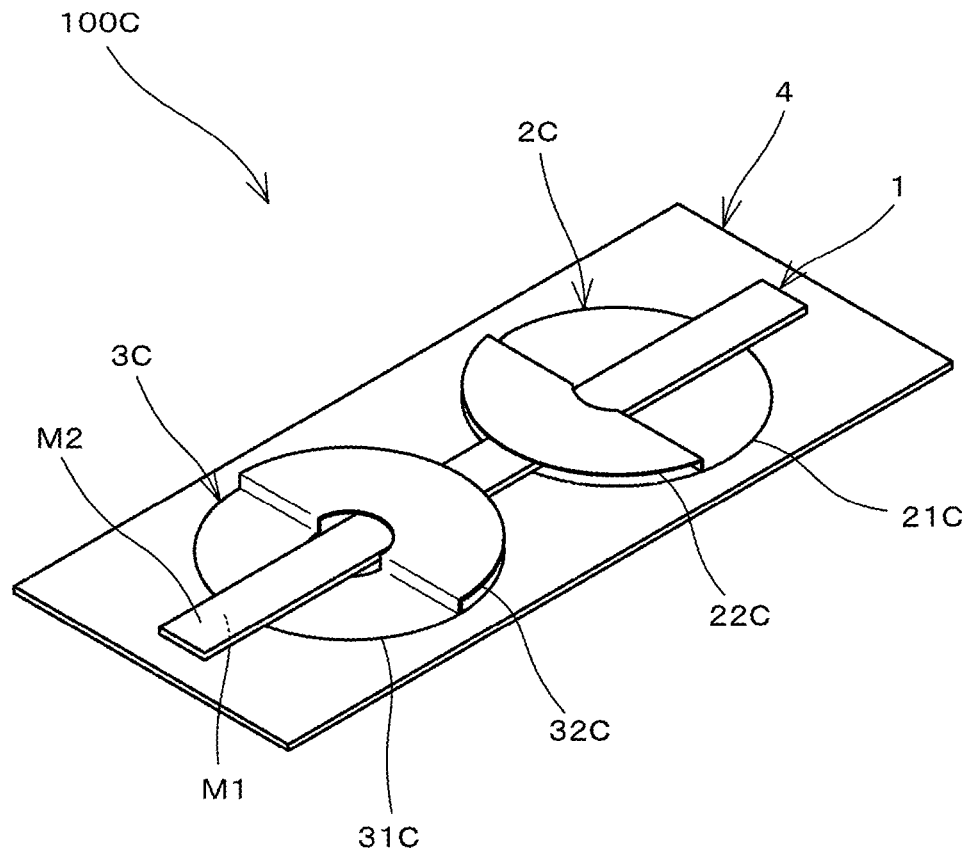
FIG. 13 is a perspective view that shows an antenna device according to a third modification of the first exemplary embodiment.

FIG. 13 is a perspective view that shows an antenna device 100C according to a third modification of the first embodiment. In the antenna device 100C as well, as in the case of the antenna device 100A shown in FIG. 10, a first coil 2C and a second coil 3C are formed on the printed circuit board 4. However, the antenna device 100C differs from the antenna device 100A in the following configuration.

In the antenna device 100A according to the first modification of the first embodiment shown in FIG. 10, the second flat plate portion 4b of the printed circuit board 4 is located higher than (i.e. above) the first flat plate portion 4a or the third flat plate portion 4c. In other words, the second portion 22A of the first coil 2A, located on the side of the second main surface M2, is located higher than the first portion 21A located on the side of the first main surface M1, and the fourth portion 32A of the second coil 3A, located on the side of the second main surface M2, is located higher than the third portion 31A located on the side of the first main surface M1.

In contrast to this configuration, in the antenna device 100C according to the third modification of the first embodiment shown in FIG. 13, the printed circuit board 4 has a flat plate shape as a whole. However, only the second portion 22C of the first coil 2C, located on the side of the second main surface M2, and the fourth portion 32C of the second coil 3C, located on the side of the second main surface M2, are formed at a higher level than the other portions.

In other words, of the portions that make up the first coil 2C, the second portion 22C located on the side of the second main surface M2 is formed to be bent upward from the printed circuit board 4 as shown in FIG. 13 so as to be located higher than a first portion 21C located on the side of the first main surface M1. Similarly, of the portions that make up the second coil 3C, the fourth portion 32C located on the side of the second main surface M2 is formed to be bent upward from the printed circuit board 4 so as to be located higher than a third portion 31C located on the side of the first main surface M1.

With the antenna device 100C according to the third modification of the first embodiment as well, similar advantageous effects to those of the antenna device 100A according to the first modification of the first embodiment are obtained. In forming the first coil 2C and the second coil 3C, the first coil 2C and the second coil 3C are formed by cutting and bending part of the printed circuit board 4, so the flexibility of disposition of the first coil 2C and second coil 3C improves. Moreover, the first coil 2C and the second coil 3C can be formed without bending the whole of the printed circuit board 4.

(Fourth Modification of First Embodiment)

In the antenna device 100C shown in FIG. 13, the portions of the first coil 2C and second coil 3C, close to each other, that is, the second portion 22C of the first coil 2C, located on the side of the second main surface M2, and the fourth portion 32C of the second coil 3C, located on the side of the second main surface M2, are formed to be bent upward from the printed circuit board 4.

In contrast to this, in an antenna device according to a fourth modification of the first embodiment, outer-side portions of a first coil and second coil in the axial direction of the magnetic core 1 are formed to be bent upward from the printed circuit board 4.

Figure 14:
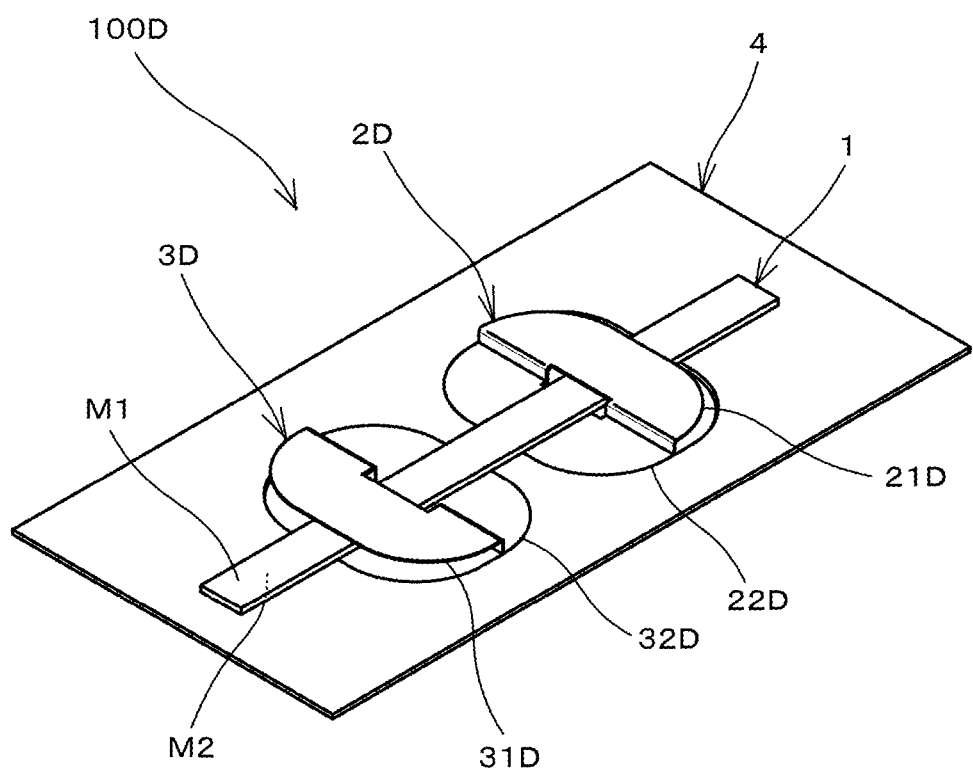
FIG. 14 is a perspective view that shows an antenna device according to a fourth modification of the first exemplary embodiment.

FIG. 14 is a perspective view that shows an antenna device 100D according to the fourth modification of the first embodiment. Different from FIG. 1 or FIG. 13 used in the foregoing description, in a configuration shown in FIG. 14, a top surface of the magnetic core 1 is the first main surface M1, and a bottom surface hidden in the drawing is the second main surface M2.

A first portion 21D of a first coil 2D, located on the side of the first main surface M1, is formed to be bent upward from the printed circuit board 4. In other words, the first portion 21D of the first coil 2D, located on the side of the first main surface M1, is located higher than a second portion 22D located on the side of the second main surface M2.

A third portion 31D of a second coil 3D, located on the side of the first main surface M1, is formed to be bent upward from the printed circuit board 4. In other words, the third portion 31D of the second coil 3D, located on the side of the first main surface M1, is located higher than a fourth portion 32D located on the side of the second main surface M2.

With the antenna device 100D as well, the first coil 2D is disposed from the first main surface M1 of the magnetic core 1 to the second main surface M2 of the magnetic core 1, and the second coil 3D is disposed from the second main surface M2 of the magnetic core 1 to the first main surface M1 of the magnetic core 1. The shortest distance between the second portion 22D of the first coil 2D and the fourth portion 32D of the second coil 3D is shorter than the shortest distance between the second portion 22D of the first coil 2D and the third portion 31D of the second coil 3D.

With the antenna device 100D according to the fourth modification of the first embodiment as well, similar advantageous effects to those of the antenna device 100A according to the first modification of the first embodiment are obtained. In forming the first coil 2D and the second coil 3D, the first coil 2D and the second coil 3D are formed by cutting and bending part of the printed circuit board 4, so the flexibility of disposition of the first coil 2D and second coil 3D improves. The first coil 2D and the second coil 3D can be formed without bending the whole of the printed circuit board 4.

Second Embodiment

In the antenna devices according to the first embodiment and its modifications, the magnetic core 1 has a flat plate shape, and the first coil and the second coil each have a bent shape not a flat plate shape.

In contrast to this, in an antenna device 200 according to a second embodiment, a first coil and a second coil each have a flat plate shape, and a magnetic core has a bent shape not a flat plate shape.

Figure 15:
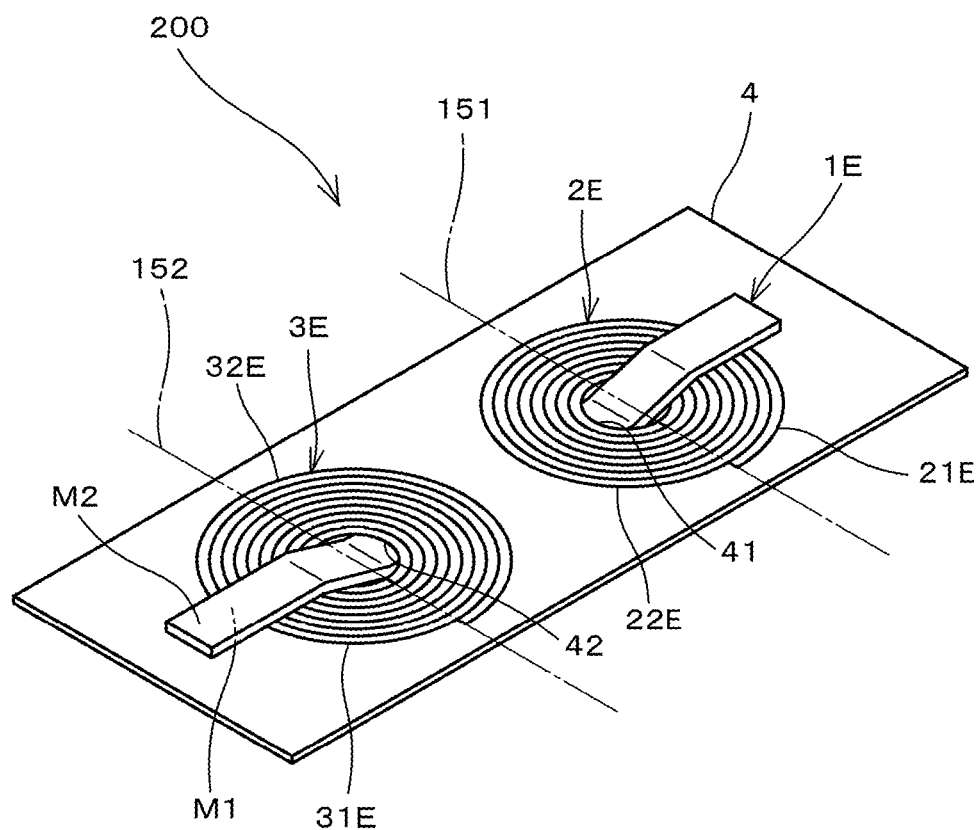
FIG. 15 is a perspective view that shows an antenna device according to a second exemplary embodiment.
Figure 16:
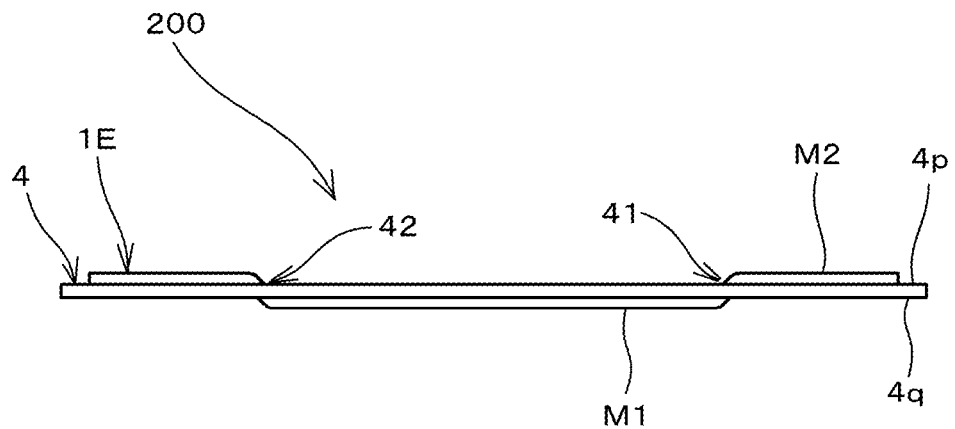
FIG. 16 is a side view of the antenna device according to the second exemplary embodiment.

FIG. 15 is a perspective view of the antenna device 200 according to the second embodiment. FIG. 16 is a side view of the antenna device 200 according to the second embodiment.

The antenna device 200 according to the second embodiment includes a magnetic core 1E, a first coil 2E, and a second coil 3E. As shown in FIG. 15, the first coil 2E and the second coil 3E are formed as a printed pattern on the printed circuit board 4.

As shown, the magnetic core 1E has a bent shape when viewed in the direction parallel to the first main surface M1 and the second main surface M2 and perpendicular to the longitudinal direction of the magnetic core 1E. The magnetic core 1E and the printed circuit board 4 may be bonded by, for example, tape, adhesive, or the like. Of both surfaces of the magnetic core 1E, the surface facing the printed circuit board 4 may be used as a bonding surface and bonded to the printed circuit board 4. In this case, work for fixing the magnetic core 1E to the printed circuit board 4 with tape, or the like, is not required.

As further shown, the printed circuit board 4 has a first through-hole 41 at the center of the first coil 2E and a second through-hole 42 at the center of the second coil 3E. The magnetic core 1E extends through the first through-hole 41 of the printed circuit board 4 from a coil forming surface 4p on which the first coil 2E and the second coil 3E are formed to a back surface 4q and further extends through the second through-hole 42 from the back surface 4q of the printed circuit board 4 to the coil forming surface 4p.

Therefore, the first coil 2E is disposed from the first main surface M1 of the magnetic core 1E to the second main surface M2. The second coil 3E is disposed from the second main surface M2 of the magnetic core 1E to the first main surface M1.

The first coil 2E has a first portion 21E located on the side of the first main surface M1 of the magnetic core 1E and a second portion 22E located on the side of the second main surface M2. More specifically, when the first coil 2E is divided by a first imaginary dividing line 151 passing through the center of the first coil 2E and perpendicular to the axial direction of the magnetic core 1E in the printed circuit board 4, a portion facing the first main surface M1 of the magnetic core 1E is referred to as the first portion 21E located on the side of the first main surface M1, and a portion facing the second main surface M2 is referred to as the second portion 22E located on the side of the second main surface M2.

The second coil 3E has a third portion 31E located on the side of the first main surface M1 of the magnetic core 1E and a fourth portion 32E located on the side of the second main surface M2. More specifically, when the second coil 3E is divided by a second imaginary dividing line 152 passing through the center of the second coil 3E and perpendicular to the axial direction of the magnetic core 1E in the printed circuit board 4, a portion facing the first main surface M1 of the magnetic core 1E is referred to as the third portion 31E located on the side of the first main surface M1, and a portion facing the second main surface M2 is referred to as the fourth portion 32E located on the side of the second main surface M2.

The second portion 22E of the first coil 2E, located on the side of the second main surface M2, is close to the fourth portion 32E of the second coil 3E, located on the side of the second main surface M2. In other words, in the axial direction of the magnetic core 1E, the shortest distance between the second portion 22E of the first coil 2E and the fourth portion 32E of the second coil 3E is shorter than the shortest distance between the second portion 22E of the first coil 2E and the third portion 31E of the second coil 3E.

When the magnetic core 1E is formed by using a flexible magnetic material, such as silicon steel plate, amorphous alloy foil, and ferrite sheet, the one shaped as shown in FIG. 15 does not need to be manufactured by bending. For example, a flat-shape magnetic core may be formed and inserted into the printed circuit board 4, then the magnetic core may be deformed into a shape as shown in FIG. 15 with a force applied to the magnetic core, and, after that, the shape may be fixed by using tape, adhesive, or the like.

With the antenna device 200 according to the second embodiment, since the magnetic core 1E has a bent shape, the overall shape can be low-profile in combination with the flat plate-shaped first coil 2E and second coil 3E. As described above, the magnetic core 1E is inserted into the center holes of the first coil 2E and second coil 3E and then bent, so insertion of the magnetic core 1E is easy, and the low-profile antenna device 200 can be manufactured.

Since the magnetic core 1E has a bent shape, the orientation in which the magnetic core 1E is inserted into the center hole of each of the first coil 2E and the second coil 3E is not confused during manufacturing of the antenna device 200. This is particularly advantageous in that the number of coils that make up an antenna device is increased.

(First Modification of Second Embodiment)

Figure 17:
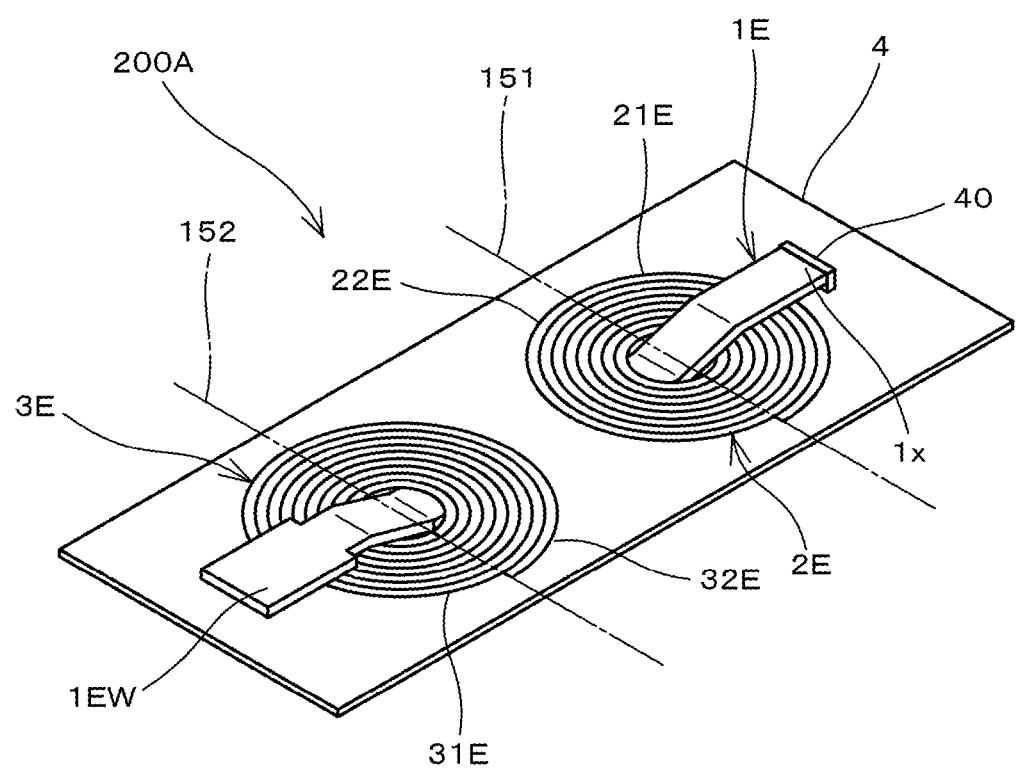
FIG. 17 is a perspective view that shows an antenna device according to a first modification of the second exemplary embodiment.

FIG. 17 is a perspective view that shows an antenna device 200A according to a first modification of the second embodiment. The antenna device 200A shown in FIG. 17 differs from the antenna device 200 shown in FIG. 15 in the shape of the magnetic core 1E and in that the core stopper 40 is provided in the printed circuit board 4.

The core stopper 40 is the same as the core stopper 40 of the antenna device 100B shown in FIG. 12 and is provided to position the magnetic core 1E by contacting with one end 1x of the magnetic core 1E in the axial direction.

As in the case of the antenna device 100B shown in FIG. 12, the magnetic core 1E has a wide portion 1EW at a side opposite from the one end 1x in the axial direction. The wide portion 1EW is wider in width than the other portion.

With the above configuration, during manufacturing of the antenna device 200A, the magnetic core 1E can be easily positioned relative to the printed circuit board 4.

(Second Modification of Second Embodiment)

Figure 18:
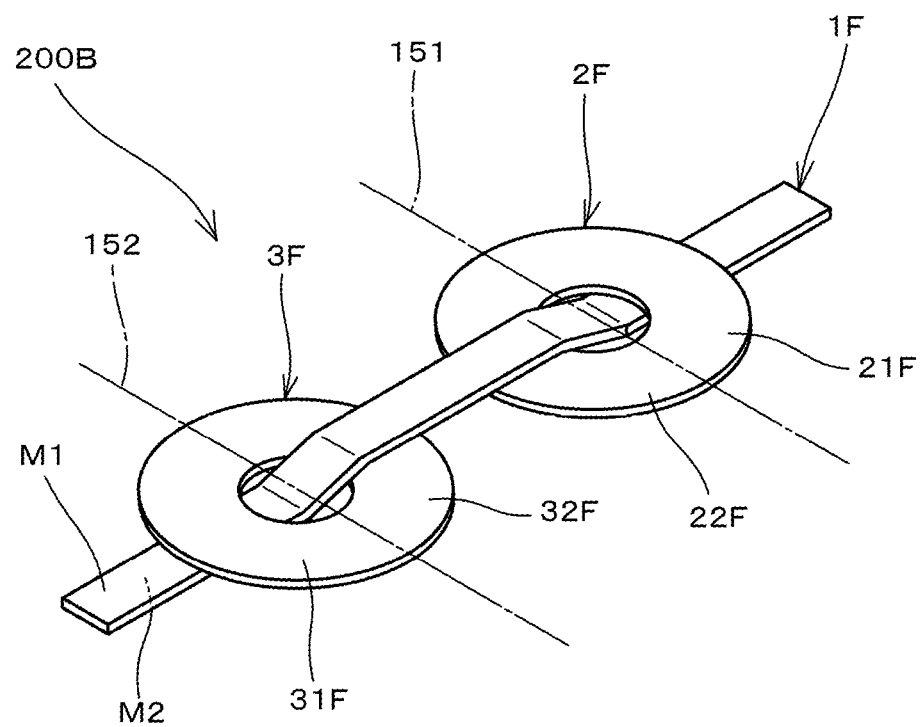
FIG. 18 is a perspective view that shows an antenna device according to a second modification of the second exemplary embodiment.

FIG. 18 is a perspective view of an antenna device 200B according to a second modification of the second embodiment. In the antenna device 200B according to the second modification of the second embodiment, a first coil 2F and a second coil 3F are not coils formed as a printed pattern on the printed circuit board 4 but flat-plate wound coils.

The antenna device 200B according to the second modification of the second embodiment includes a magnetic core 1F, the first coil 2F, and the second coil 3F.

The magnetic core 1F has substantially the same shape as the magnetic core 1E shown in FIG. 15. The magnetic core 1F shown in FIG. 18 is disposed in a state where the magnetic core 1E shown in FIG. 15 is upside down. Different from FIG. 1 or FIG. 13, in the disposition shown in FIG. 18, the top surface of the magnetic core 1 is the first main surface M1, and the bottom surface hidden in the drawing is the second main surface M2.

The first coil 2F is disposed from the first main surface M1 of the magnetic core 1F to the second main surface M2 of the magnetic core 1F. The second coil 3F is disposed from the second main surface M2 of the magnetic core 1F to the first main surface M1 of the magnetic core 1D.

The first coil 2F has a first portion 21F located on the side of the first main surface M1 of the magnetic core 1F and a second portion 22F located on the side of the second main surface M2. More specifically, when the first coil 2F is divided by the first imaginary dividing line 151 passing through the center of the first coil 2F and perpendicular to the axial direction of the magnetic core 1F, a portion facing the first main surface M1 of the magnetic core 1F is referred to as the first portion 21F located on the side of the first main surface M1, and a portion facing the second main surface M2 is referred to as the second portion 22F located on the side of the second main surface M2.

The second coil 3F has a third portion 31F located on the side of the first main surface M1 of the magnetic core 1F and a fourth portion 32F located on the side of the second main surface M2. More specifically, when the second coil 3F is divided by the second imaginary dividing line 152 passing through the center of the second coil 3F and perpendicular to the axial direction of the magnetic core 1F, a portion facing the first main surface M1 of the magnetic core 1F is referred to as the third portion 31F located on the side of the first main surface M1, and a portion facing the second main surface M2 is referred to as the fourth portion 32F located on the side of the second main surface M2.

The shortest distance between the second portion 22F of the first coil 2F and the fourth portion 32F of the second coil 3F is shorter than the shortest distance between the second portion 22F of the first coil 2F and the third portion 31F of the second coil 3F.

With the antenna device 200B as well, since the magnetic core 1F has a bent shape, the overall shape can be low-profile in combination with the flat plate-shaped first coil 2F and second coil 3F. As in the case of the antenna device 200 shown in FIG. 15, the magnetic core 1F is inserted into the center holes of the first coil 2F and second coil 3F and then bent, so insertion of the magnetic core 1F is easy, and the low-profile antenna device 200B can be manufactured.

When the first coil 2F and the second coil 3F each are formed in a flat plate shape, variations in the electrical characteristics of coils can be reduced as compared to the case where the coils are formed in a bent shape.

(Third Modification of Second Embodiment)

In the antenna device 200B according to the second modification of the second embodiment, the magnetic core 1F having a bent shape is integrally formed. In contrast to this, in an antenna device 200C according to a third modification of the second embodiment, a magnetic core is made up of a combination of a plurality of members.

Figure 19A:
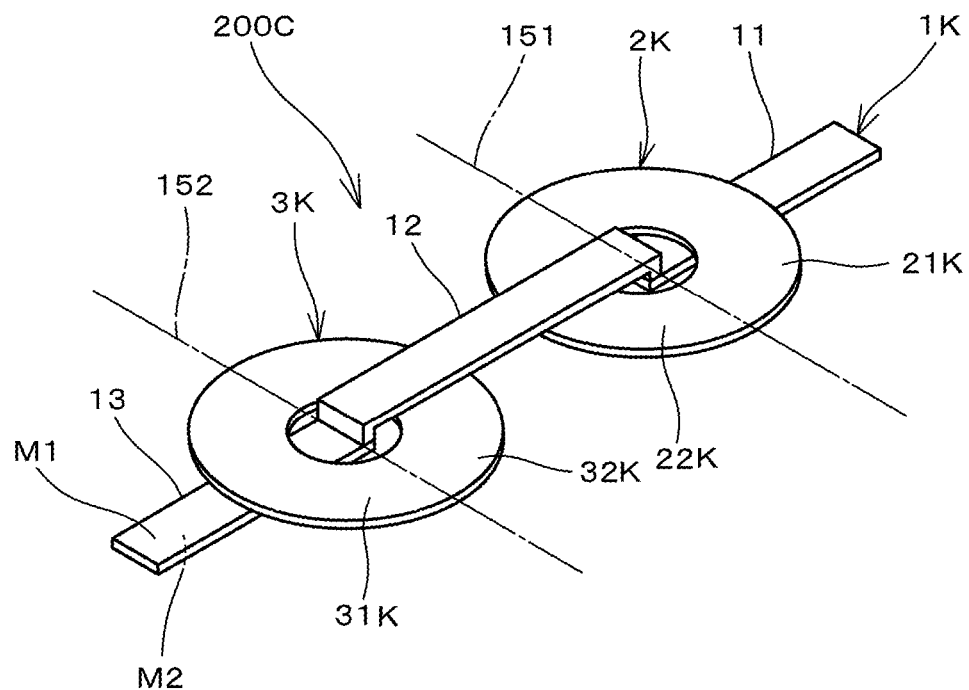
FIG. 19A is a perspective view that shows an antenna device according to a third modification of the second exemplary embodiment.
Figure 19B:
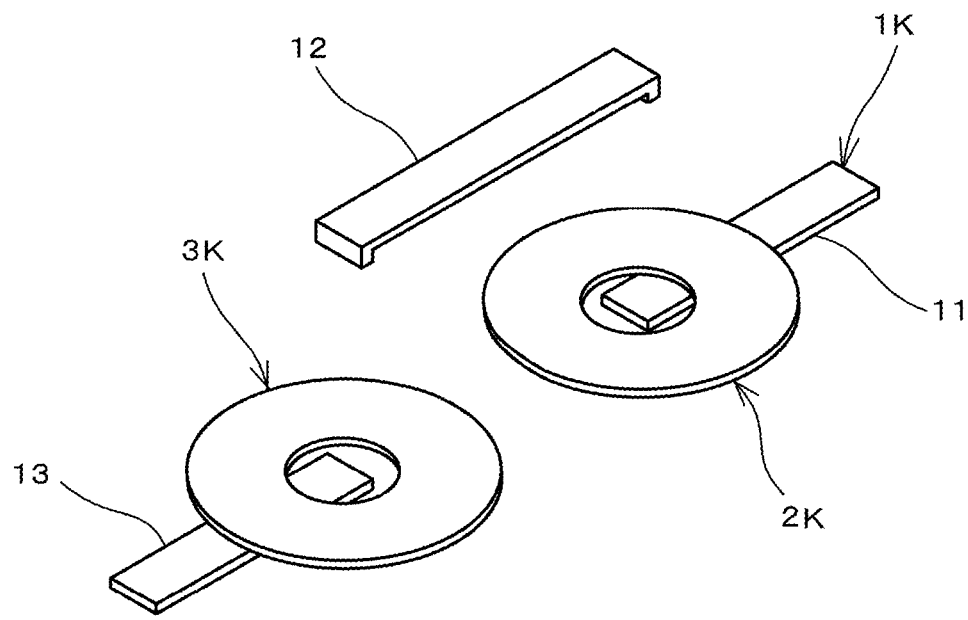
FIG. 19B is a view that shows a state where a magnetic core is divided in the antenna device according to the third modification of the second exemplary embodiment.

FIG. 19A is a perspective view of the antenna device 200C according to the third modification of the second embodiment. FIG. 19B is an exploded view of a magnetic core 1K in the antenna device 200C according to the third modification of the second embodiment.

The configuration of each of a first coil 2K and a second coil 3K is the same as the configuration of each of the first coil 2F and the second coil 3F shown in FIG. 18. Therefore, a first portion 21K of the first coil 2K, located on the side of the first main surface M1, and a second portion 22K of the first coil 2K, located on the side of the second main surface M2, respectively correspond to the first portion 21F of the first coil 2F, located on the side of the first main surface M1, and the second portion 22F of the first coil 2F, located on the side of the second main surface M2, shown in FIG. 18. A third portion 31K of the second coil 3K, located on the side of the first main surface M1, and a fourth portion 32K of the second coil 3K, located on the side of the second main surface M2, respectively correspond to the third portion 31F of the second coil 3F, located on the side of the first main surface M1, and the fourth portion 32F of the second coil 3F, located on the side of the second main surface M2, shown in FIG. 18.

The magnetic core 1K is made up of a combination of a first component part 11, a second component part 12, and a third component part 13.

With the antenna device 200C, during manufacturing of the antenna device 200C, a step of extending the integrally formed magnetic core through the center holes of the first coil and second coil is not required. In other words, as shown in FIG. 19B, the first coil 2K is placed on or above the first component part 11, the second coil 3K is placed on or above the third component part 13, and the second component part 12 is combined with the first component part 11 and the third component part 13. Thus, the antenna device 200C can be manufactured.

Therefore, for example, the low-profile antenna device 200C having the shape as shown in FIG. 19A can be manufactured by using a magnetic core that cannot be bent. As will be described later, when an antenna device including a plurality of coils is manufactured, a step of extending a magnetic core through the center holes of the coils is not required, so manufacturing of the antenna device is easy.

Third Embodiment

In the antenna device 100 according to the first embodiment, the first coil 2 and the second coil 3 each have a bent shape not a flat plate shape. In the antenna device 200 according to the second embodiment, the magnetic core 1E has a bent shape not a flat plate shape.

In contrast to this, in an antenna device according to a third embodiment, a magnetic core, a first coil, and a second coil each have a bent shape not a flat plate shape.

Figure 20:
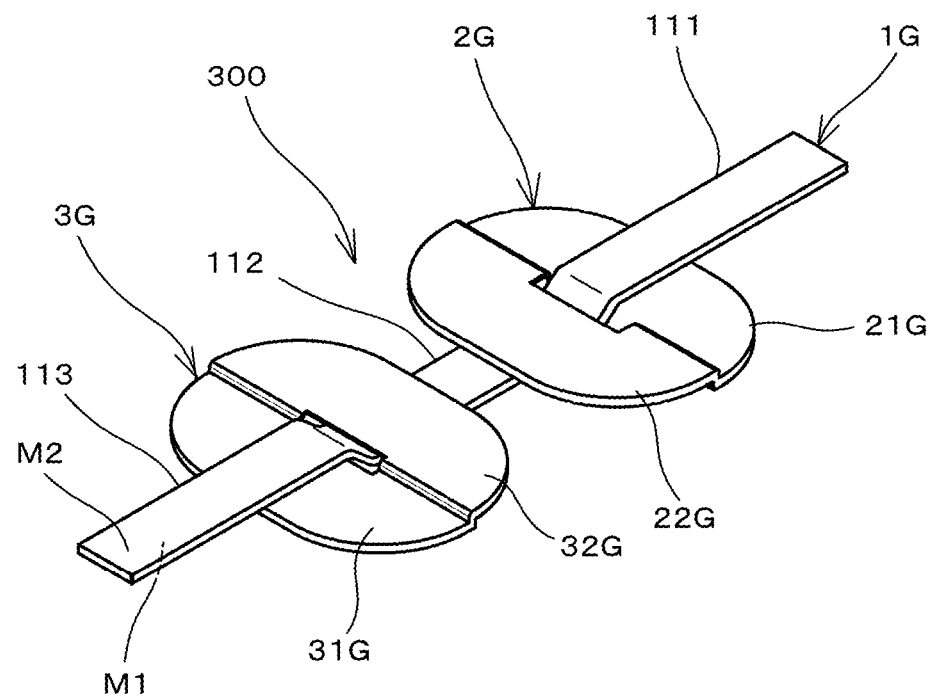
FIG. 20 is a perspective view that shows an antenna device according to a third exemplary embodiment.
Figure 21:
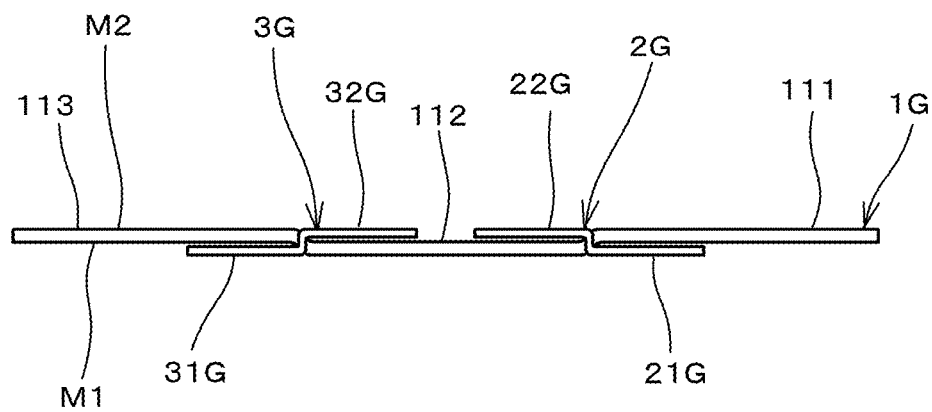
FIG. 21 is a side view of the antenna device according to the third exemplary embodiment.

FIG. 20 is a perspective view that shows the antenna device 300 according to the third embodiment. FIG. 21 is a side view of the antenna device 300 according to the third embodiment.

The antenna device 300 according to the third embodiment includes a magnetic core 1G, a first coil 2G, and a second coil 3G. The first coil 2G and the second coil 3G have shapes similar to those of the first coil 2 and the second coil 3 shown in FIG. 1, but the first coil 2G and the second coil 3G have a different thickness. In other words, the first coil 2G and the second coil 3G are thinner in thickness than the first coil 2 and the second coil 3 shown in FIG. 1.

The magnetic core 1G includes a first flat plate portion 111, a second flat plate portion 112, and a third flat plate portion 113. The first flat plate portion 111 and the third flat plate portion 113 are located at the same level. The second flat plate portion 112 is located lower than the first flat plate portion 111 and the third flat plate portion 113.

The first flat plate portion 111 of the magnetic core 1G is located on or above the first portion 21G of the first coil 2G, located on the side of the first main surface M1. The second flat plate portion 112 is located on or below the second portion 22G of the first coil 2G, located on the side of the second main surface M2, and the fourth portion 32G of the second coil 3G, located on the side of the second main surface M2. The third flat plate portion 113 is located on or above the third portion 31G of the second coil 3G, located on the side of the first main surface M1.

In the exemplary aspect, the thickness of the antenna device 100 according to the first embodiment is the sum of the thickness of the first portion 21 of the first coil 2, located on the side of the first main surface M1, the thickness of the magnetic core 1, and the thickness of the second portion 22 of the first coil 2, located on the side of the second main surface M2, as shown in FIG. 2.

In contrast to this, the thickness of the antenna device 300 according to the third embodiment is the sum of the thickness of the first portion 21G of the first coil 2G, located on the side of the first main surface M1, and the thickness of the first flat plate portion 111 of the magnetic core 1G, as shown in FIG. 21. In other words, with the antenna device 300 according to the present embodiment, the thickness is made thinner than that of the antenna device 100 according to the first embodiment, so further miniaturization can be achieved.

In the case where the configuration of a combination of a plurality of antenna devices is employed as well like a multiaxial antenna device (described below), when magnetic cores and coils, which are components of the multiaxial antenna device, each have a bent shape not a flat plate shape, further miniaturization can be achieved.

(First Modification of Third Embodiment)

Figure 22:
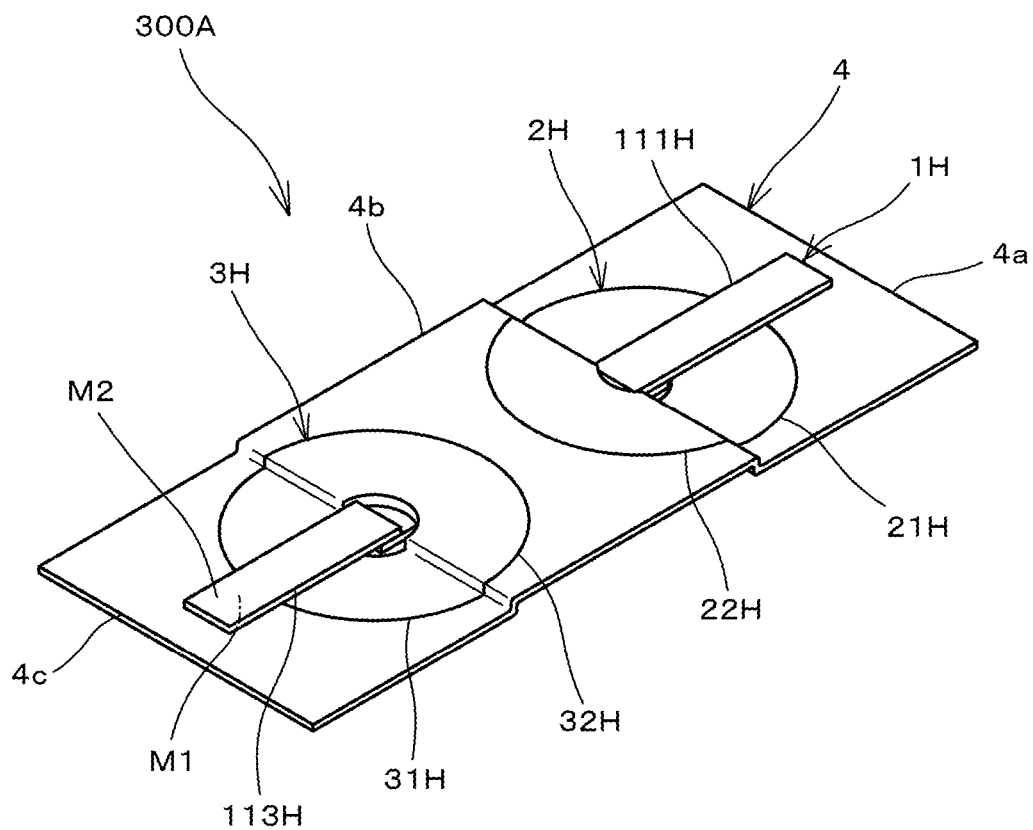
FIG. 22 is a perspective view that shows an antenna device according to a first modification of the third exemplary embodiment.
Figure 23:
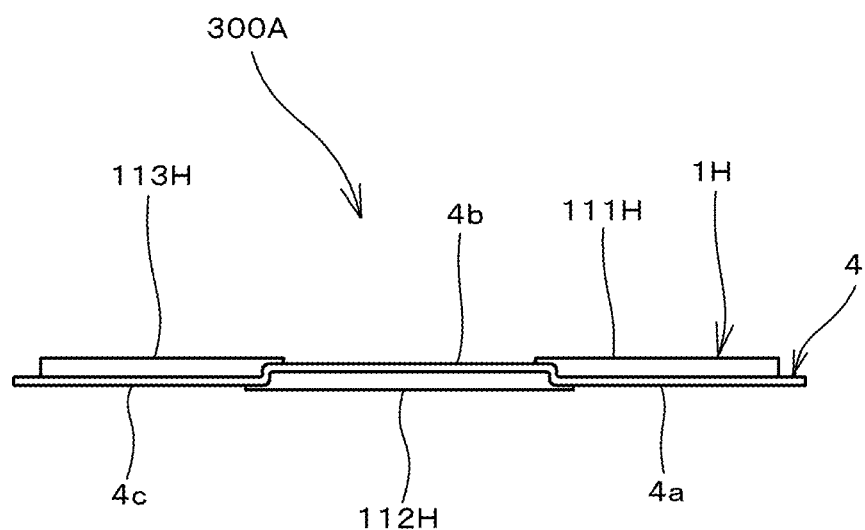
FIG. 23 is a side view of the antenna device according to the first modification of the third exemplary embodiment.

FIG. 22 is a perspective view that shows an antenna device 300A according to a first modification of the third embodiment. FIG. 23 is a side view of the antenna device 300A according to the first modification of the third embodiment.

In the antenna device 300A, a first coil 2H and a second coil 3H are formed as a printed pattern on a printed circuit board 4. The printed circuit board 4, as well as the printed circuit board 4 of the antenna device 100A shown in FIG. 10, includes the first flat plate portion 4a, the second flat plate portion 4b, and the third flat plate portion 4c.

The first coil 2H and the second coil 3H have shapes similar to those of the first coil 2A and the second coil 3A of the antenna device 100A shown in FIG. 10, but the first coil 2H and the second coil 3H have a different thickness. In other words, the first coil 2H and the second coil 3H are thinner in thickness than the first coil 2A and the second coil 3A shown in FIG. 10.

A magnetic core 1H includes a first flat plate portion 111H, a second flat plate portion 112H, and a third flat plate portion 113H. The first flat plate portion 111H and the third flat plate portion 113H are located at the same level. The second flat plate portion 112H is located lower than the first flat plate portion 111H and the third flat plate portion 113H.

As shown, the first flat plate portion 111H of the magnetic core 1H is located on or above the first portion 21H of the first coil 2H, located on the side of the first main surface M1. The second flat plate portion 112H is located on or below the second portion 22H of the first coil 2H, located on the side of the second main surface M2, and the fourth portion 32H of the second coil 3H, located on the side of the second main surface M2. The third flat plate portion 113H is located on or above the third portion 31H of the second coil 3H, located on the side of the first main surface M1.

With the antenna device 300A according to the first modification of the third embodiment, the thickness is made thinner than the antenna device 100A shown in FIG. 10, so further miniaturization can be achieved.

Fourth Embodiment

The antenna device 100 according to the first embodiment includes the magnetic core 1, the first coil 2, and the second coil 3. In contrast to this, an antenna device 400 according to a fourth embodiment includes the magnetic core 1 and three or more coils. Here, description will be made on the assumption that the number of coils is six according to the exemplary aspect.

Figure 24:
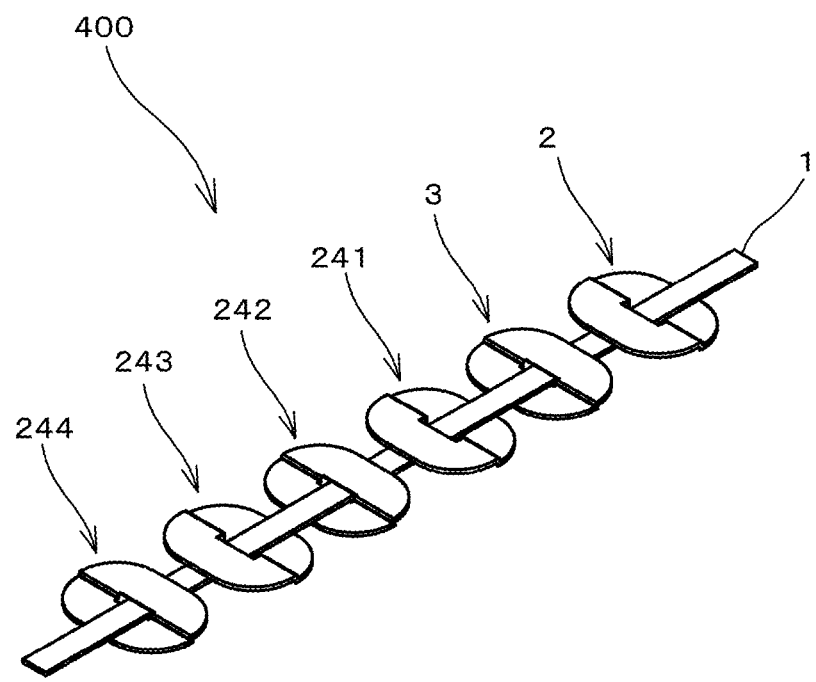
FIG. 24 is a perspective view that shows an antenna device according to a fourth exemplary embodiment.
Figure 25:
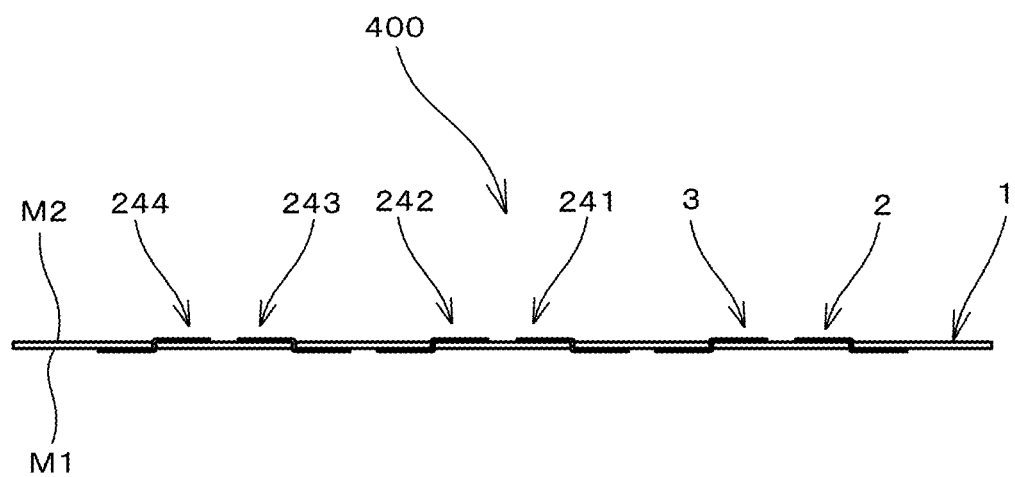
FIG. 25 is a side view of the antenna device according to the fourth exemplary embodiment.

FIG. 24 is a perspective view that shows the antenna device 400 according to the fourth embodiment. FIG. 25 is a side view of the antenna device 400 according to the fourth embodiment.

As shown in FIG. 24 and FIG. 25, the antenna device 400 according to the fourth embodiment includes the magnetic core 1, the first coil 2, the second coil 3, a third coil 241, a fourth coil 242, a fifth coil 243, and a sixth coil 244. The number of turns, thickness, winding width, wire type, and the like, of each of the first coil 2, the second coil 3, the third coil 241, the fourth coil 242, the fifth coil 243, and the sixth coil 244 are desirably the same.

The third coil 241 and the fifth coil 243 each have the same shape as the first coil 2. In other words, the first coil 2, the third coil 241, and the fifth coil 243 each are disposed from the first main surface M1 of the magnetic core 1 to the second main surface M2 of the magnetic core 1.

The fourth coil 242 and the sixth coil 244 each have the same shape as the second coil 3. In other words, the second coil 3, the fourth coil 242, and the sixth coil 244 each are disposed from the second main surface M2 of the magnetic core 1 to the first main surface M1 of the magnetic core 1.

Figure 26:
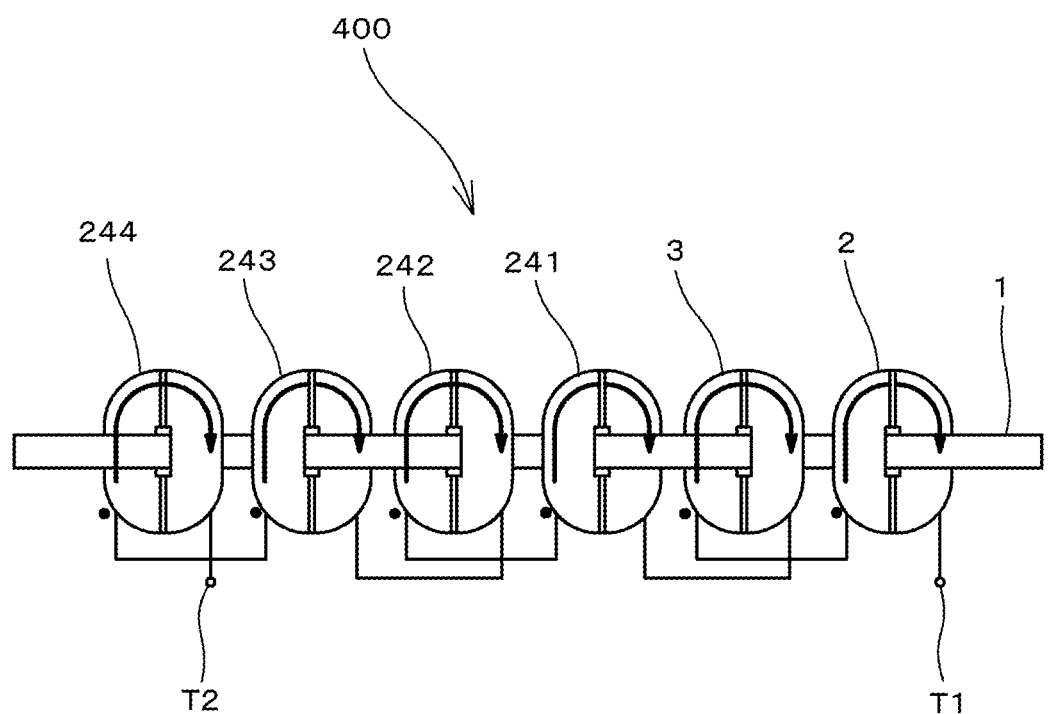
FIG. 26 is a view for illustrating a method of connecting a first coil, a second coil, a third coil, a fourth coil, a fifth coil, and a sixth coil in the antenna device according to the fourth exemplary embodiment.

FIG. 26 is a view for illustrating a method of connecting the first coil 2, the second coil 3, the third coil 241, the fourth coil 242, the fifth coil 243, and the sixth coil 244. Here, description will be made on the assumption that the electrical winding directions of all the coils are the same when viewed in the direction of normal to the first main surface M1 or second main surface M2 of the magnetic core 1.

In the present embodiment, as shown in FIG. 26, the electrical winding start of the first coil 2 and the electrical winding start of the second coil 3 are connected, and the electrical winding end of the second coil 3 and the electrical winding end of the third coil 241 are connected. The electrical winding start of the third coil 241 and the electrical winding start of the fourth coil 242 are connected, and the electrical winding end of the fourth coil 242 and the electrical winding end of the fifth coil 243 are connected. The electrical winding start of the fifth coil 243 and the electrical winding start of the sixth coil 244 are connected.

The electrical winding end of the first coil 2 is connected to the first terminal T1. The electrical winding end of the sixth coil 244 is connected to the second terminal T2. The first terminal T1 is any one of an input terminal and an output terminal, and the second terminal T2 is the other one of the input terminal and the output terminal.

Alternatively, the configuration that the electrical winding end of the first coil 2 and the electrical winding end of the second coil 3 are connected may be employed. In this state, the electrical winding start of the second coil 3 and the electrical winding start of the third coil 241 are connected, and the electrical winding end of the third coil 241 and the electrical winding end of the fourth coil 242 are connected. The electrical winding start of the fourth coil 242 and the electrical winding start of the fifth coil 243 are connected, and the electrical winding end of the fifth coil 243 and the electrical winding end of the sixth coil 244 are connected. In this case, the electrical winding start of the first coil 2 is connected to the first terminal T1, and the electrical winding start of the sixth coil 244 is connected to the second terminal T2.

Through the connection relationship as described above, the coil induced voltages of all the coils are cancelled, and an induced voltage that is the sum of the core induced voltages of all the coils is the induced voltage of the antenna device 400. Therefore, the induced voltage of the antenna device 400 is maximum when the magnetic field incident angle is 0° as described in the first embodiment.

In other words, the maximum receiving sensitivity direction of the antenna device 400 coincides with the axial direction of the magnetic core 1, and the maximum receiving sensitivity direction remains unchanged even when a metal is brought close to the antenna device 400.

In the antenna device 400, the length of the magnetic core 1 in the axial direction is longer than that of the antenna device 100 shown in FIG. 1, so the maximum receiving sensitivity can be further increased.

In FIG. 24 to FIG. 26, the number of coils is an even number, and description is made on the assumption that the number of turns, thickness, winding width, wire type, and the like, of each of the coils are desirably the same. Alternatively, the number of coils may be an odd number, and the number of turns, thickness, winding width, wire type, and the like, of each of the coils need not be the same. However, in this case as well, adjustment needs to be made such that the coil induced voltages of all the coils are cancelled as a whole and the maximum receiving sensitivity direction of the antenna device coincides with the axial direction of the magnetic core 1.

The order of arrangement of the first coil 2, the second coil 3, the third coil 241, the fourth coil 242, the fifth coil 243, and the sixth coil 244 is not limited to the order of arrangement shown in FIG. 24. For example, the order of arrangement of the first coil 2, the third coil 241, the fifth coil 243, the second coil 3, the fourth coil 242, and the sixth coil 244 may be employed. However, in this case, the connection relationship among the coils needs to be adjusted such that the coil induced voltages of all the coils are cancelled as a whole and the maximum receiving sensitivity direction of the antenna device coincides with the axial direction of the magnetic core 1.

In the above description, the antenna device 400 is a receiving antenna device; however, similar advantageous effects are obtained when the antenna device 400 is a transmitting antenna device having a similar configuration. In other words, the maximum transmission sensitivity direction of the transmitting antenna device having the structure shown in FIG. 24 to FIG. 26 coincides with the axial direction of the magnetic core 1, and the maximum transmission sensitivity direction remains unchanged even when a metal is brought close to the transmitting antenna device.

Figure 27:
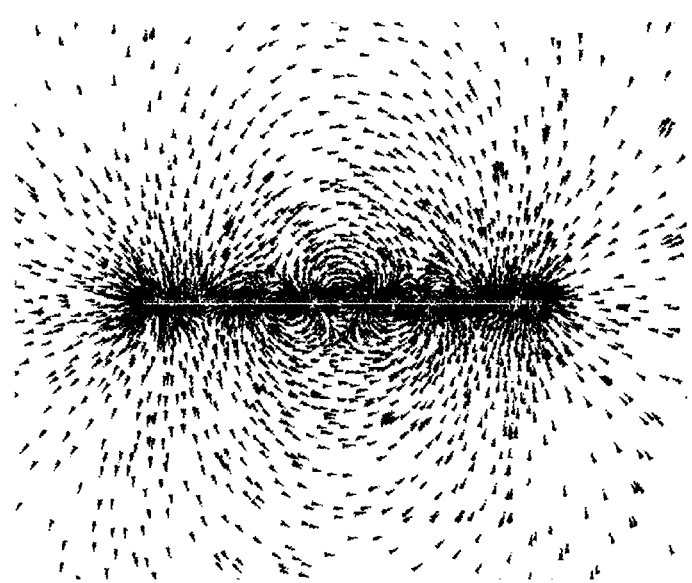
FIG. 27 is a view that shows results of an output magnetic field of a transmitting antenna device having the structure shown in FIG. 24 to FIG. 26 through finite difference method simulation.

FIG. 27 is a view that shows results of an output magnetic field of the transmitting antenna device having the structure shown in FIG. 24 to FIG. 26 through finite difference method simulation. Hitherto, there is no flat panel antenna device of a combination of a plurality of planar coils with a long core length, However, with the above-described configuration, a high-power low-profile transmitting antenna device is provided.

Fifth Embodiment

In the antenna devices according to the above-described first to fourth embodiments, the maximum receiving sensitivity direction coincides with the axial direction of the magnetic core.

In contrast to this, in an antenna device according to a fifth embodiment, the maximum receiving sensitivity direction coincides with the direction perpendicular to main surfaces of a magnetic core.

The appearance shape of the antenna device 500 according to the fifth embodiment is the same as the appearance shape of the antenna device 100 according to the first embodiment shown in FIG. 1. The antenna device 500 according to the present embodiment differs from the antenna device 100 according to the first embodiment in the connection relationship between the first coil 2 and the second coil 3.

Figure 28:
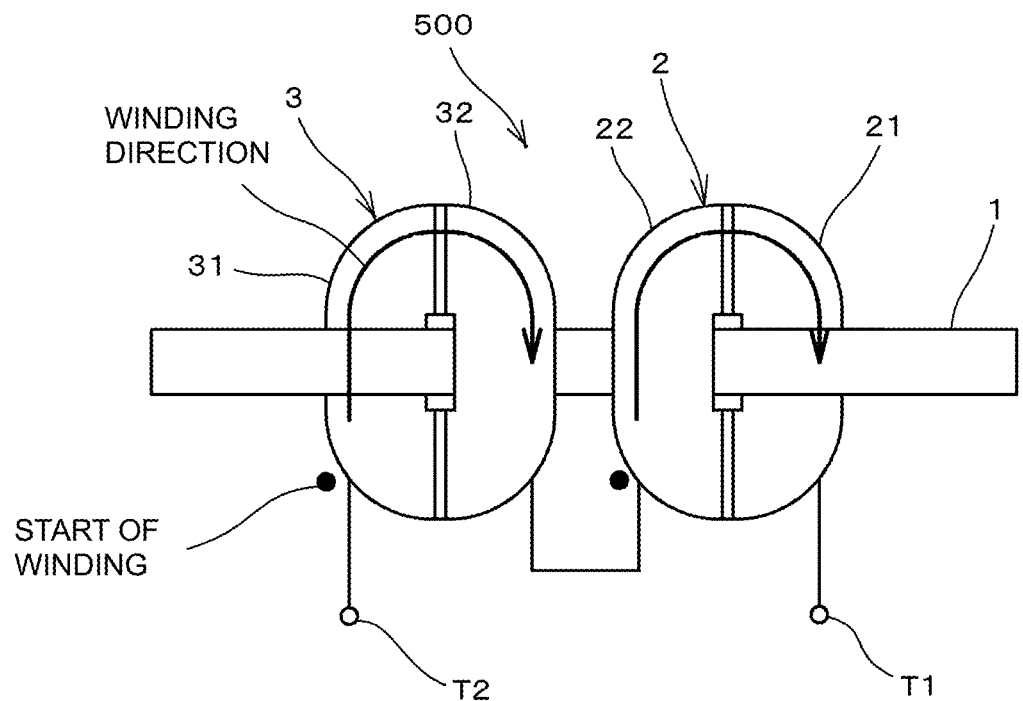
FIG. 28 is a view for illustrating a method of connecting a first coil and a second coil in an antenna device according to a fifth exemplary embodiment.

FIG. 28 is a view for illustrating a method of connecting the first coil 2 and the second coil 3. Here, description will be made on the assumption that the electrical winding directions of the first coil 2 and second coil 3 are the same when viewed in the direction of normal to the first main surface M1 or second main surface M2 of the magnetic core 1.

In the present embodiment, as shown in FIG. 28, the electrical winding start of the first coil 2 and the electrical winding end of the second coil 3 are connected. The electrical winding end of the first coil 2 is connected to the first terminal T1. The electrical winding start of the second coil 3 is connected to the second terminal T2.

Alternatively, the configuration that the electrical winding end of the first coil 2 and the electrical winding start of the second coil 3 are connected may be employed.

Figure 29:
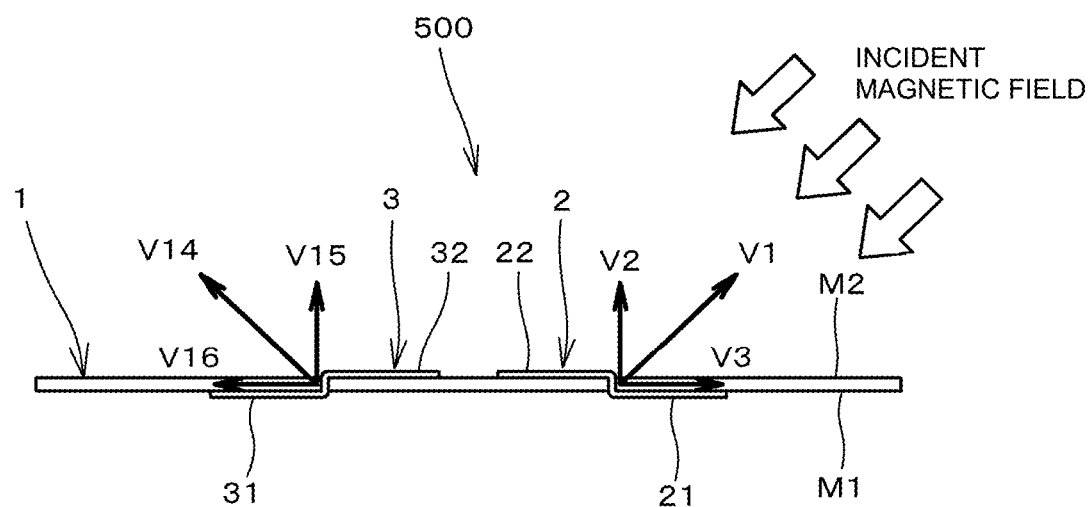
FIG. 29 is a view for illustrating the maximum transmission/receiving sensitivity of each of the first coil and the second coil in the case where a magnetic field having a magnetic field component in a direction of normal to the first main surface of the magnetic core enters in the antenna device according to the fifth exemplary embodiment.

As shown in FIG. 29, when a magnetic field having a magnetic field component in the direction of normal to the first main surface M1 of the magnetic core 1 enters, the maximum receiving sensitivity (e.g., vector V1) of the first coil 2 is a combined sensitivity of a maximum receiving sensitivity (e.g., vector V2) caused by a magnetic field that links with only the first coil 2 and a maximum receiving sensitivity (e.g., vector V3) caused by a magnetic field that links with the first coil 2 through the magnetic core 1.

The maximum receiving sensitivity (e.g., vector V14) of the second coil 3 is a combined sensitivity of a maximum receiving sensitivity (e.g., vector V15) caused by a magnetic field that links with only the second coil 3 and a maximum receiving sensitivity (e.g., vector V16) caused by a magnetic field that links with the second coil 3 through the magnetic core 1.

Here, in the antenna device 500 according to the present embodiment, as compared to the antenna device 100 according to the first embodiment shown in FIG. 1, the connection relationship between the first coil 2 and the second coil 3 is opposite (see FIG. 3 and FIG. 28), the direction of the vector V15 is opposite from the direction of the vector V5 shown in FIG. 5, and the direction of the vector V16 is opposite from the direction of the vector V6 shown in FIG. 5. Therefore, the direction of the vector V14 is also opposite from the direction of the vector V4.

A vector that represents the overall maximum receiving sensitivity of the antenna device 500 is a resultant vector of the vector V1 and the vector V14. The vector V3 and the vector V16 having opposite directions in the axial direction of the magnetic core 1 are cancelled, so the vector that represents the maximum receiving sensitivity is a resultant vector of the vector V2 and the vector V15.

In other words, the maximum receiving sensitivity direction of the antenna device 500 coincides with the direction perpendicular to the main surfaces (the first main surface M1 and the second main surface M2) of the magnetic core 1, and the maximum receiving sensitivity direction remains unchanged even when a metal is brought close to the antenna device 500.

Figure 30:
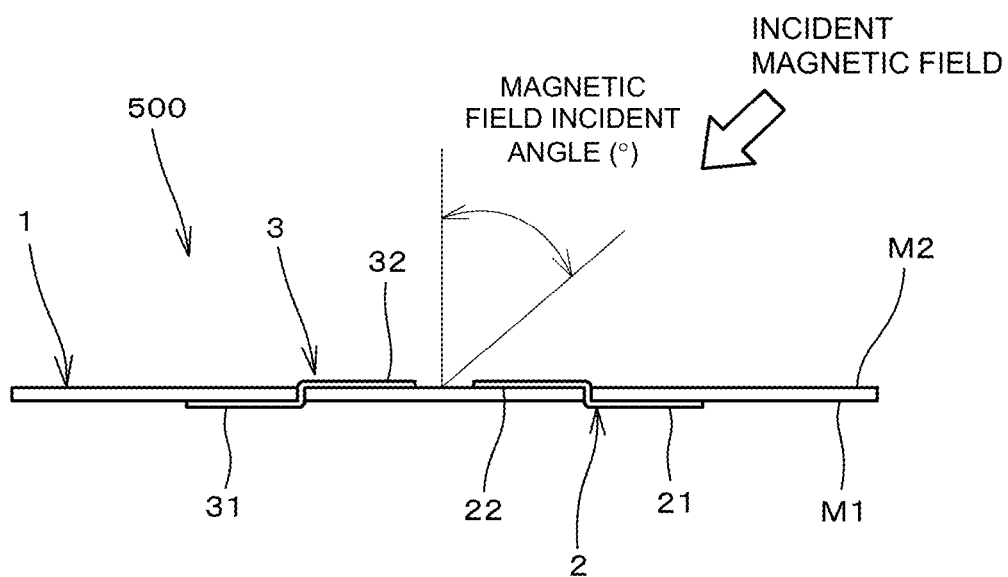
FIG. 30 is a view for illustrating a magnetic field incident angle in the antenna device according to the fifth exemplary embodiment.

Here, the relationship between an induced voltage of each of the first coil 2 and second coil 3 and a magnetic field incident angle will be described. Here, description will be made on the assumption that an angle formed between the direction perpendicular to the second main surface M2 of the magnetic core 1 and an incident magnetic field is a magnetic field incident angle as shown in FIG. 30.

Figure 31:
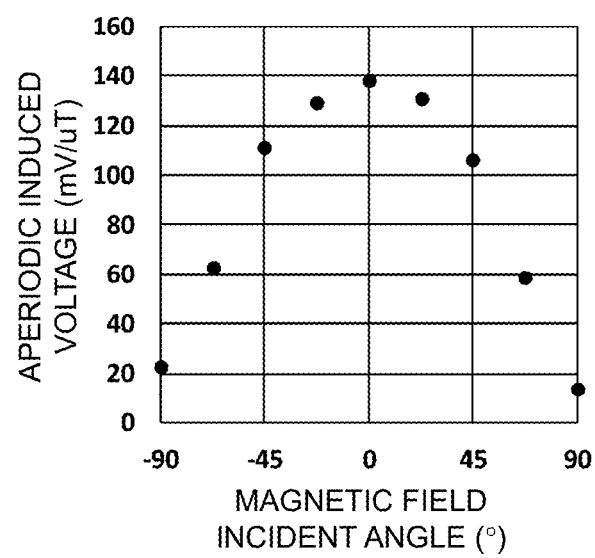
FIG. 31 is a graph that shows measured results of the relationship between a magnetic field incident angle and an induced voltage of the antenna device in the antenna device according to the fifth exemplary embodiment.

FIG. 31 is a graph that shows measured results of the relationship between a magnetic field incident angle (°) and an induced voltage (mV/μT) of the antenna device 500. The relationship between a magnetic field incident angle and an induced voltage was measured where the inductance of the first coil 2 was 3.8 mH, the inductance of the second coil 3 was 3.7 mH, the length of the magnetic core 1 in the axial direction was 50 mm, and the thickness of the antenna device 500 was 1.0 mm.

As shown in FIG. 31, the induced voltage of the antenna device 500 was maximum when the magnetic field incident angle was 0°. In other words, it demonstrated that the maximum receiving sensitivity direction of the antenna device 500 coincides with the direction perpendicular to the main surfaces of the magnetic core 1. Therefore, even when a metal is brought close to the antenna device 500, the maximum receiving sensitivity direction remains unchanged.

In the above description, the antenna device 500 is a receiving antenna device; however, similar advantageous effects are obtained when the antenna device 500 is a transmitting antenna device having a similar configuration.

Sixth Embodiment

As in the case of the antenna device 400 (see FIG. 24) according to the fourth embodiment for the antenna device 100 (see FIG. 1) according to the first embodiment, the antenna device 500 according to the above-described fifth embodiment may include three or more coils. Here, description will be made on the assumption that the number of coils is six according to the exemplary aspect.

Figure 32:
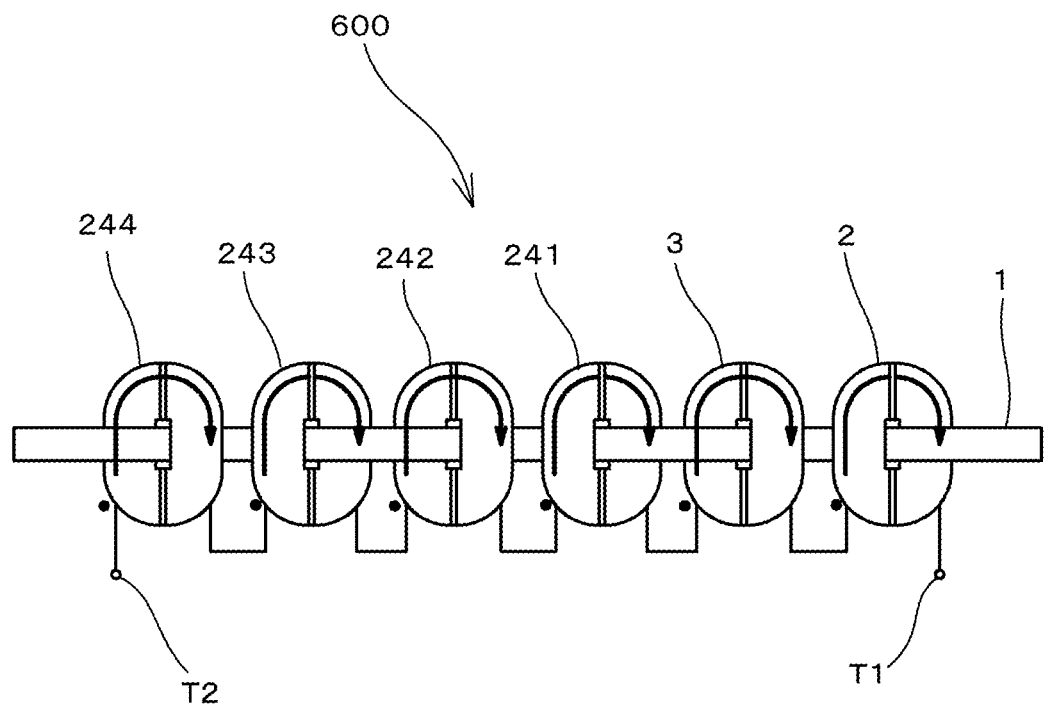
FIG. 32 is a view for illustrating a method of connecting coils in an antenna device according to a sixth exemplary embodiment.

FIG. 32 is a view for illustrating a method of connecting coils in an antenna device 600 according to a sixth embodiment. The antenna device 600 according to the sixth embodiment includes the magnetic core 1, the first coil 2, the second coil 3, the third coil 241, the fourth coil 242, the fifth coil 243, and the sixth coil 244. The number of turns, thickness, winding width, wire type, and the like, of each of the coils are desirably the same.

Here, description will be made on the assumption that the electrical winding directions of all the coils are the same when viewed in the direction of normal to the first main surface M1 or the second main surface M2. In the present embodiment, as shown in FIG. 32, the electrical winding start of the first coil 2 and the electrical winding end of the second coil 3 are connected, and the electrical winding start of the second coil 3 and the electrical winding end of the third coil 241 are connected. The electrical winding start of the third coil 241 and the electrical winding end of the fourth coil 242 are connected, and the electrical winding start of the fourth coil 242 and the electrical winding end of the fifth coil 243 are connected. The electrical winding start of the fifth coil 243 and the electrical winding end of the sixth coil 244 are connected. The electrical winding end of the first coil 2 is connected to the first terminal T1. The electrical winding start of the sixth coil 244 is connected to the second terminal T2.

Through the connection relationship as described above, the core induced voltages of all the coils are cancelled, and an induced voltage that is the sum of the coil induced voltages of all the coils is the induced voltage of the antenna device 600. The induced voltage of the antenna device 600 is maximum when the magnetic field incident angle is 0° as described in the fifth embodiment.

In other words, the maximum receiving sensitivity direction of the antenna device 600 coincides with the direction perpendicular to the main surfaces of the magnetic core 1, and the maximum receiving sensitivity direction remains unchanged even when a metal is brought close to the antenna device 600.

In FIG. 32, the number of coils is an even number, and description is made on the assumption that the number of turns, thickness, winding width, wire type, and the like, of each of the coils are desirably the same. Alternatively, the number of coils may be an odd number, and the number of turns, thickness, winding width, wire type, and the like, of each of the coils need not be the same. However, in this case, adjustment needs to be made such that the core induced voltages of all the coils are cancelled as a whole and the maximum receiving sensitivity direction of the antenna device coincides with the direction perpendicular to the main surfaces of the magnetic core 1.

As described in the fourth embodiment, the order of arrangement of the first coil 2, the second coil 3, the third coil 241, the fourth coil 242, the fifth coil 243, and the sixth coil 244 is not limited to the order of arrangement shown in FIG. 32.

In the above description, the antenna device 600 is a receiving antenna device; however, similar advantageous effects are obtained when the antenna device 600 is a transmitting antenna device having a similar configuration. In other words, the maximum transmission sensitivity direction of the transmitting antenna device having the structure shown in FIG. 32 coincides with the direction perpendicular to the main surfaces of the magnetic core 1, and the maximum transmission sensitivity direction remains unchanged even when a metal is brought close to the transmitting antenna device.

Figure 33:
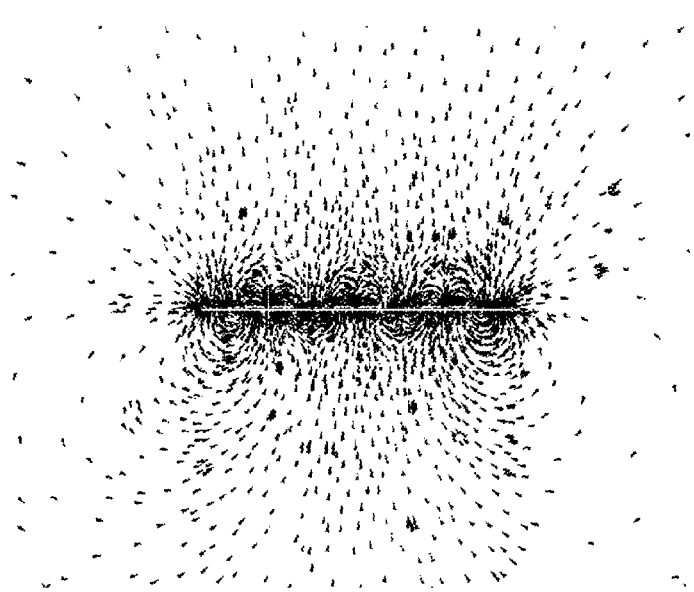
FIG. 33 is a view that shows results of an output magnetic field of a transmitting antenna device having the structure shown in FIG. 32 through finite difference method simulation.

FIG. 33 is a view that shows results of an output magnetic field of the transmitting antenna device having the structure shown in FIG. 32 through finite difference method simulation. Hitherto, there is no flat panel antenna device of a combination of a plurality of planar coils with a long core length. However, with the above-described configuration, a high-power low-profile transmitting antenna device is provided.

Seventh Embodiment

Figure 34:
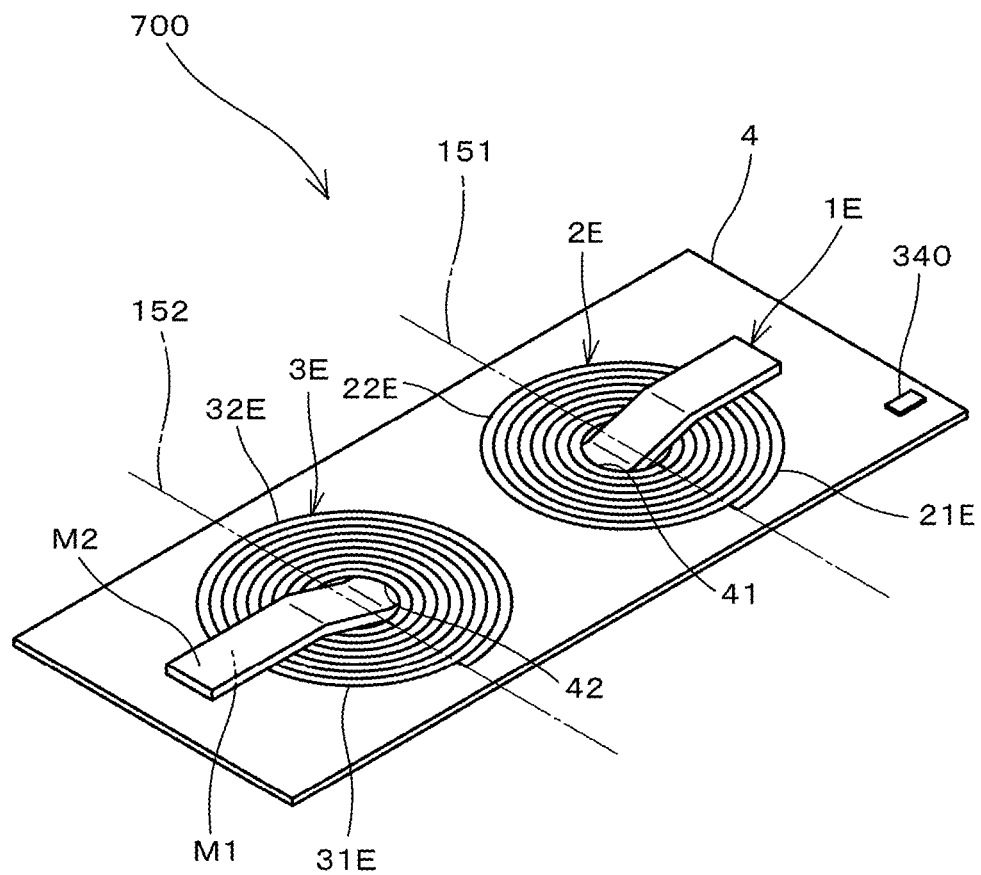
FIG. 34 is a perspective view that shows an antenna device according to a seventh exemplary embodiment.

FIG. 34 is a perspective view that shows an antenna device 700 according to a seventh embodiment. The antenna device 700 according to the seventh embodiment has a configuration that the antenna device 200 according to the second embodiment shown in FIG. 15 further includes an electronic component 340.

Figure 35:
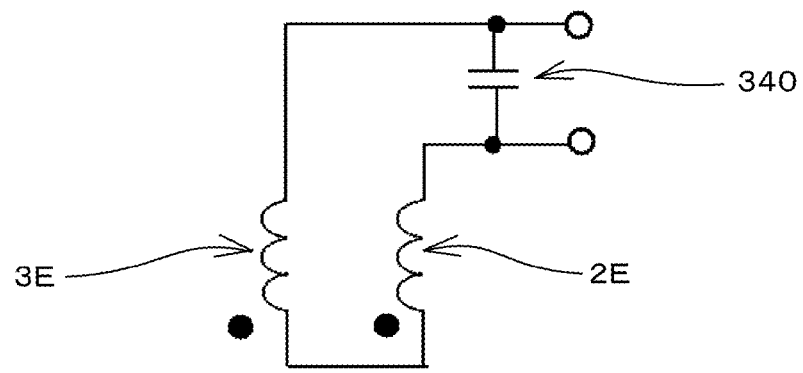
FIG. 35 is an equivalent circuit diagram in the case where a resonance capacitor is used as an electronic component in the antenna device according to the seventh exemplary embodiment.

The electronic component 340 is, for example, a resonance capacitor and is implemented on the printed circuit board 4. FIG. 35 is an equivalent circuit diagram in the case where a resonance capacitor is used as the electronic component 340.

The electronic component 340 is not limited to a resonance capacitor. An electronic component that is required of an antenna device, such as a receiving control IC and a transmitting power IC, may be implemented on or in the printed circuit board 4.

Figure 36:
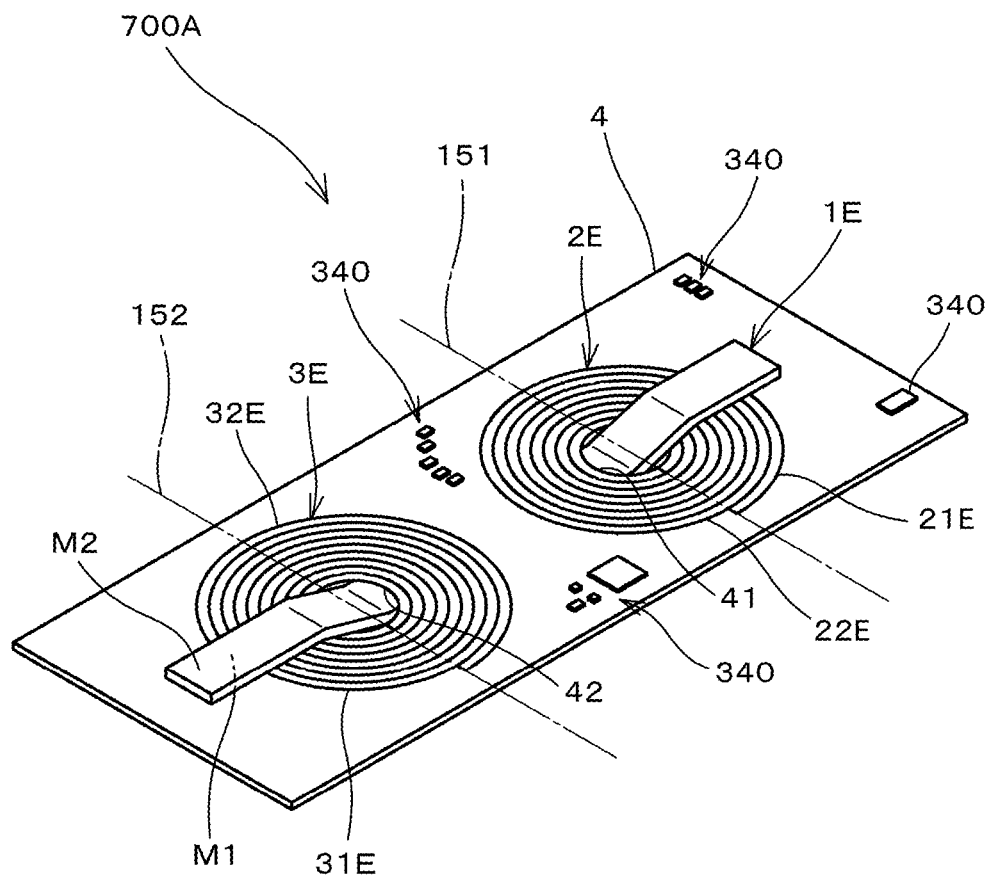
FIG. 36 is a perspective view of an antenna device in which a plurality of electronic components is implemented on a printed circuit board.

FIG. 36 is a perspective view of an antenna device 700A in which a plurality of the electronic components 340 is implemented on the printed circuit board 4. As shown in FIG. 36, a plurality of the electronic components 340 may be implemented on or in the printed circuit board 4.

With the antenna devices 700, 700A according to the seventh embodiment, since the electronic component(s) is/are implemented, for example, an advanced antenna device having a resonance tuning function or other functions can be provided.

Eighth Embodiment

Figure 37:
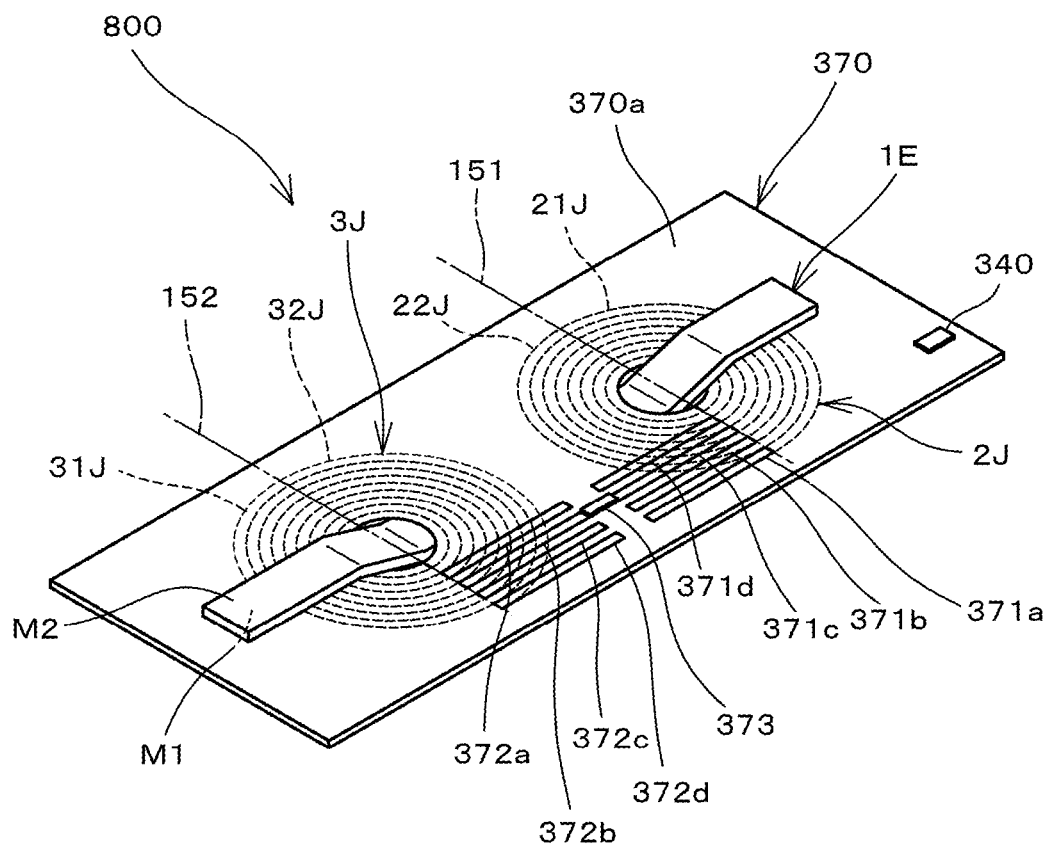
FIG. 37 is a perspective view that shows an antenna device according to an eighth exemplary embodiment.
Figure 38:
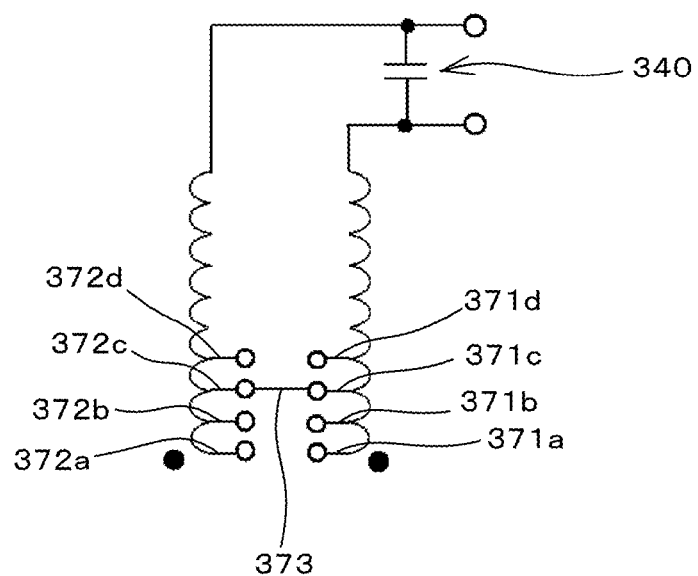
FIG. 38 is an equivalent circuit diagram of the antenna device according to the eighth exemplary embodiment.

FIG. 37 is a perspective view that shows an antenna device 800 according to an eighth embodiment. FIG. 38 is an equivalent circuit diagram of the antenna device 800 according to the eighth embodiment. The antenna device 800 according to the eighth embodiment has a structure of which the inductance is adjustable. In FIG. 37, like reference numerals denote the same components as those of the antenna device 700 shown in FIG. 34, and the detailed description is omitted.

In the present embodiment, a first coil 2J and a second coil 3J are formed in a multilayer board 370. In other words, the first coil 2J and the second coil 3J each are formed inside the multilayer board 370 in a spiral shape with the axis set to a board lamination direction.

A plurality of first tap extended lines 371a to 371d is connected to the first coil 2J. The first tap extended lines 371a to 371d are formed as a printed pattern on a topmost surface 370a of the multilayer board 370 and are connected to the first coil 2J, formed inside the multilayer board 370, through via conductors (not shown).

The first tap extended line 371a is connected to the outermost peripheral portion of the first coil 2J formed in a circular shape. The first tap extended line 371b is connected to the first coil 2J at a radially inner portion to the portion to which the first tap extended line 371a is connected. The first tap extended line 371c is connected to the first coil 2J at a radially inner portion to the portion to which the first tap extended line 371b is connected. The first tap extended line 371d is connected to the first coil 2J at a radially inner portion to the portion to which the first tap extended line 371c is connected.

A plurality of second tap extended lines 372a to 372d is connected to the second coil 3J. The second tap extended lines 372a to 372d are formed as a printed pattern on the topmost surface 370a of the multilayer board 370 and are connected to the second coil 3J through via conductors (not shown).

The second tap extended line 372a is connected to the outermost peripheral portion of the second coil 3J formed in a circular shape. The second tap extended line 372b is connected to the second coil 3J at a radially inner portion to the portion to which the second tap extended line 372a is connected. The second tap extended line 372c is connected to the second coil 3J at a radially inner portion to the portion to which the second tap extended line 372b is connected. The second tap extended line 372d is connected to the second coil 3J at a radially inner portion to the portion to which the second tap extended line 372c is connected.

The antenna device 800 is configured to change the inductance by changing connection between any one of the plurality of first tap extended lines 371a to 371d and any one of the plurality of second tap extended lines 372a to 372d. Combinations of connection include a combination of the first tap extended line 371a and the second tap extended line 372a, a combination of the first tap extended line 371b and the second tap extended line 372b, a combination of the first tap extended line 371c and the second tap extended line 372c, and a combination of the first tap extended line 371d and the second tap extended line 372d.

A chip jumper 373 can be used to connect any one of the plurality of first tap extended lines 371a to 371d and any one of the plurality of second tap extended lines 372a to 372d.

In the present embodiment, the inductance is maximum when the first tap extended line 371a and the second tap extended line 372a are connected, and the inductance is minimum when the first tap extended line 371d and the second tap extended line 372d are connected.

With an existing antenna device, the inductance can be adjusted by a method, such as core length, an interphase position between a core and a coil, and addition of a core for adjusting the inductance; however, particularly for a small antenna device, such methods have not been implemented so much in view of poor work efficiency, cost-effectiveness, and the like.

However, with the antenna device 800 according to the present embodiment, the inductance can be easily adjusted through adjustment of the number of turns by switching the points of connection between the first coil 2J and the second coil 3J.

Here, when a coil component is used in resonance operation, it is very important to conform the resonant frequency to required specifications. However, the resonant frequency varies depending on variations in characteristics among resonance capacitors and core materials, so it is difficult to conform the resonant frequency to required specifications.

However, with the antenna device 800 according to the present embodiment, the number of turns of each of the coils can be adjusted by changing the line to connect any one of the first tap extended lines 371a to 371d and any one of the second tap extended lines 372a to 372d. With this configuration, the inductance can be adjusted in consideration of variations among resonance capacitors and core materials, so the resonant frequency can be accurately adjusted to a predetermined frequency, and the antenna device having extremely highly accurate characteristics can be provided.

As shown in the equivalent circuit diagram of FIG. 38, by forming the first tap extended lines 371a to 371d and the second tap extended lines 372a to 372d, the number of turns of the first coil 2J and the number of turns of the second coil 3J can be constantly made equal to each other when the first tap extended line and the second tap extended line are connected. With this configuration, variations in characteristics between the first coil 2J and the second coil 3J are reduced, so the transmission/receiving sensitivity direction of the antenna device can be highly accurately brought into coincidence with the axial direction of the magnetic core 1 or the direction perpendicular to the main surfaces of the magnetic core 1.

Ninth Embodiment

The antenna devices according to the above-described first to eighth embodiments have a maximum transmission/receiving sensitivity in one direction. In contrast to this configuration, a multiaxial antenna device according to a ninth embodiment has a maximum transmission/receiving sensitivity in multiple directions. The maximum transmission/receiving sensitivity here does not necessarily mean the maximum transmission/receiving sensitivity and means a transmission/receiving sensitivity when the transmission/receiving sensitivity that varies with the angle of a magnetic field takes on a peak. In other words, the antenna device according to the present embodiment has a plurality of peaks of transmission/receiving sensitivity.

Figure 39:
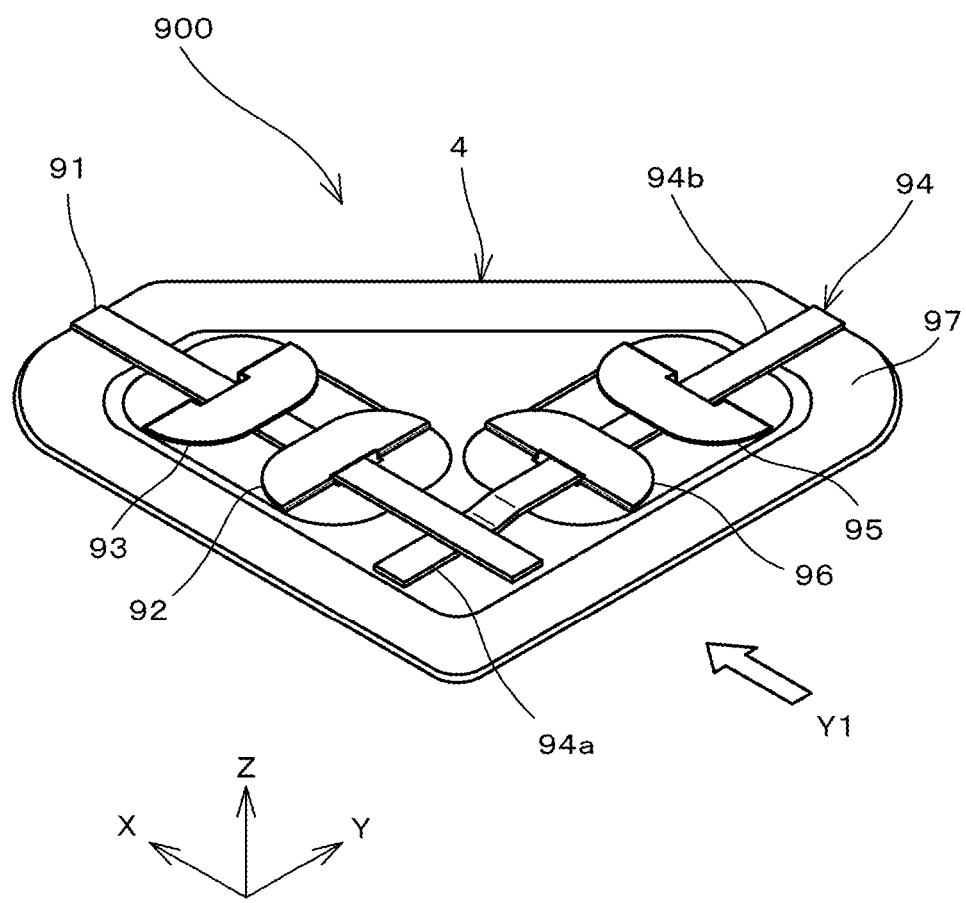
FIG. 39 is a perspective view that shows a multiaxial antenna device according to a ninth exemplary embodiment.
Figure 40:
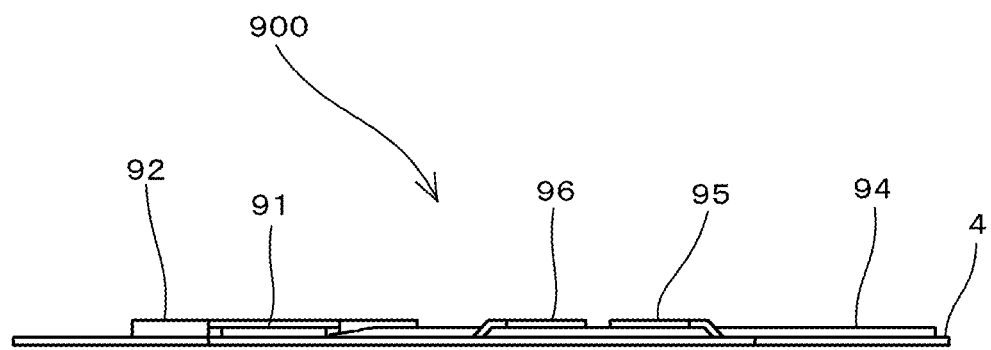
FIG. 40 is a side view of the multiaxial antenna device according to the ninth exemplary embodiment when viewed in a direction of an arrow Y1.

FIG. 39 is a perspective view that shows the multiaxial antenna device 900 according to the ninth embodiment. FIG. 40 is a side view of the multiaxial antenna device 900 according to the ninth embodiment when viewed in a direction of an arrow Y1. The multiaxial antenna device 900 has peaks of maximum transmission/receiving sensitivity in three directions, that is, X-axis direction, Y-axis direction, and Z-axis direction.

The multiaxial antenna device 900 includes a first magnetic core 91, a first coil 92, a second coil 93, a second magnetic core 94, a third coil 95, a fourth coil 96, and a fifth coil 97.

The configuration of a combination of the first magnetic core 91, the first coil 92, and the second coil 93 is the same as the configuration of a combination of the magnetic core 1, the first coil 2C, and the second coil 3C shown in FIG. 13, and makes up a single antenna device. As described in the first embodiment, the maximum receiving sensitivity direction of the antenna device made up of a combination of the first magnetic core 91, the first coil 92, and the second coil 93 coincides with the axial direction (X-axis direction) of the first magnetic core 91.

The configuration of a combination of the second magnetic core 94, the third coil 95, and the fourth coil 96 is the same as the configuration of a combination of the magnetic core 1, the first coil 2C, and the second coil 3C shown in FIG. 13, and makes up a single antenna device. However, the second magnetic core 94 has a portion that perpendicularly crosses the first magnetic core 91 in plan view and has a bent shape such that the portion 94a that perpendicularly crosses the first magnetic core 91 is located lower than the other portion 94b. The maximum receiving sensitivity direction of the antenna device made up of a combination of the second magnetic core 94, the third coil 95, and the fourth coil 96 coincides with the axial direction (i.e., Y-axis direction) of the second magnetic core 94.

The fifth coil 97 is formed so as to circle at the radially outer side on the surface of the printed circuit board 4. The maximum receiving sensitivity direction of the fifth coil 97 coincides with the direction perpendicular to the printed circuit board 4 (i.e., Z-axis direction).

Instead of the fifth coil 97, the antenna device 500 shown in FIG. 28 may be provided. In this case as well, the maximum receiving sensitivity direction of the antenna device 500 coincides with the direction perpendicular to the printed circuit board 4 (i.e., Z-axis direction).

With the above-described configuration, even when a metal is brought close to the multiaxial antenna device 900, the maximum receiving sensitivity directions that are the three-axis directions, that is, X-axis direction, Y-axis direction, and Z-axis direction, remain unchanged. Therefore, the multiaxial antenna device 900 that has a wide range of receiving sensitivity and of which the maximum receiving sensitivity directions remain unchanged even when a metal is brought close to the multiaxial antenna device 900 can be provided.

The multiaxial antenna device 900 may be configured as a transmitting antenna device having a similar configuration, and similar advantageous effects are obtained.

(First Modification of Ninth Embodiment)

Figure 41:
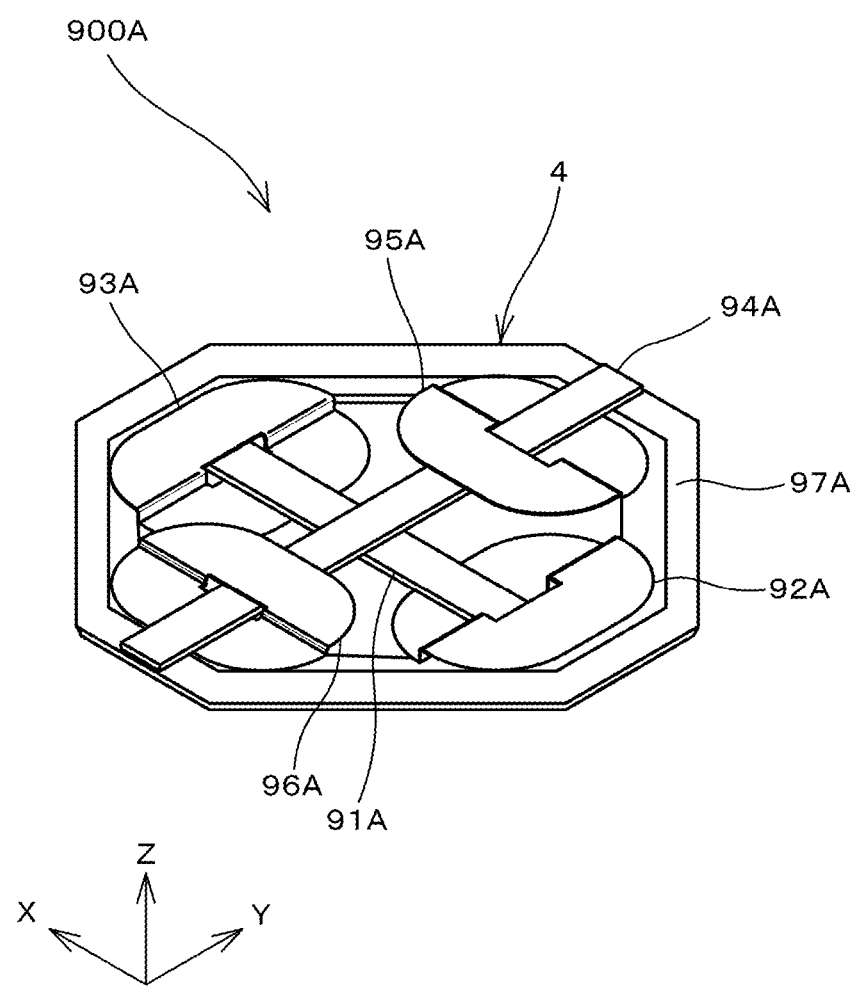
FIG. 41 is a perspective view that shows a multiaxial antenna device according to a first modification of the ninth exemplary embodiment.

FIG. 41 is a perspective view that shows a multiaxial antenna device 900A according to a first modification of the ninth embodiment. The multiaxial antenna device 900A includes a first magnetic core 91A, a first coil 92A, a second coil 93A, a second magnetic core 94A, a third coil 95A, a fourth coil 96A, and a fifth coil 97A.

The configuration of a combination of the first magnetic core 91A, the first coil 92A, and the second coil 93A differs from the configuration of a combination of the magnetic core 91, the first coil 92, and the second coil 93 shown in FIG. 39, in that the orientation in which the first coil 92A and the second coil 93A are inserted relative to the first magnetic core 91A. In other words, the orientation in which the first coil 92A and the second coil 93A are inserted relative to the first magnetic core 91A is opposite to the orientation in which the first coil 92 and the second coil 93 are inserted relative to the first magnetic core 91, shown in FIG. 39.

The maximum receiving sensitivity direction of the antenna device made up of a combination of the first magnetic core 91A, the first coil 92A, and the second coil 93A coincides with the axial direction (i.e., X-axis direction) of the first magnetic core 91A.

The configuration of a combination of the second magnetic core 94A, the third coil 95A, and the fourth coil 96A is the same as the configuration of a combination of the second magnetic core 94, the third coil 95, and the fourth coil 96, shown in FIG. 39. The maximum receiving sensitivity direction of the antenna device made up of a combination of the second magnetic core 94A, the third coil 95A, and the fourth coil 96A coincides with the axial direction (i.e., Y-axis direction) of the second magnetic core 94A.

The fifth coil 97A is formed so as to circle at the radially outer side on the surface of the printed circuit board 4. The maximum receiving sensitivity direction of the fifth coil 97A coincides with the direction perpendicular to the printed circuit board 4 (i.e., Z-axis direction).

With the above-described configuration, even when a metal is brought close to the multiaxial antenna device 900A, the maximum receiving sensitivity directions that are the three-axis directions, that is, X-axis direction, Y-axis direction, and Z-axis direction, remain unchanged. Therefore, the multiaxial antenna device 900A that has a wide range of receiving sensitivity and of which the maximum receiving sensitivity directions remain unchanged even when a metal is brought close to the multiaxial antenna device 900A can be provided.

(Second Modification of Ninth Embodiment)

Figure 42:
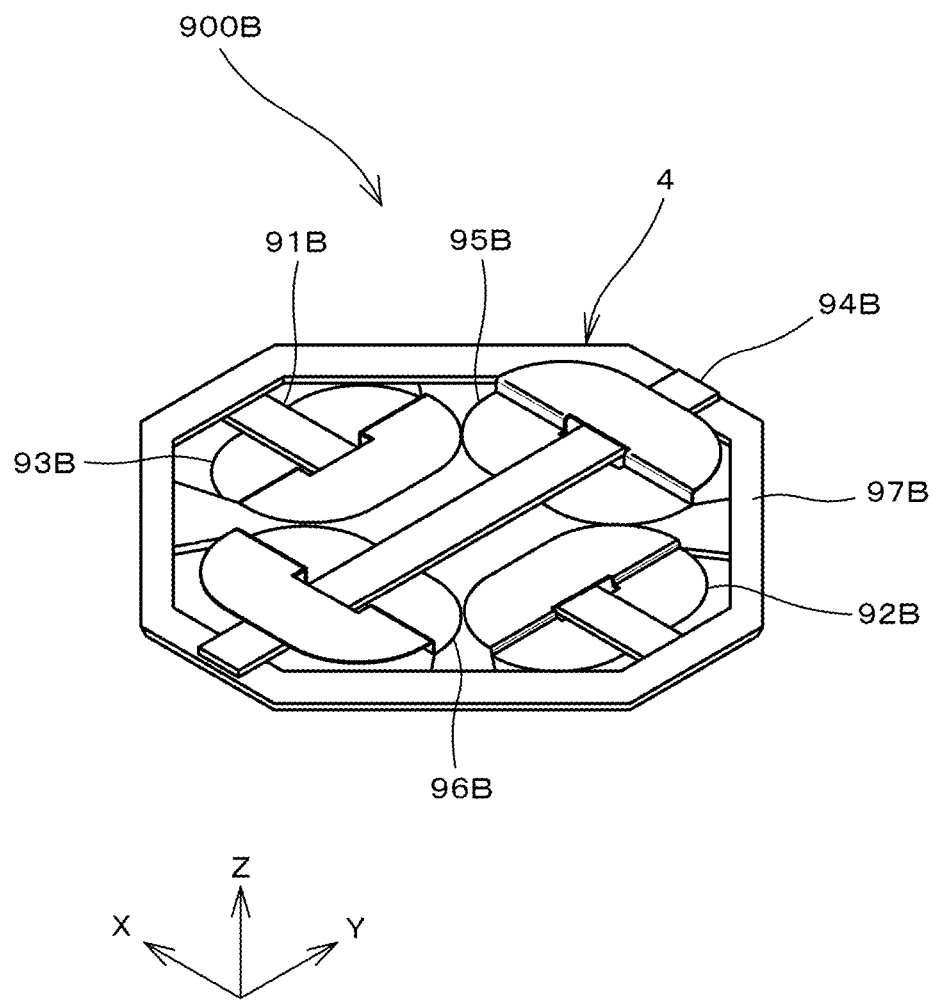
FIG. 42 is a perspective view that shows a multiaxial antenna device according to a second modification of the ninth exemplary embodiment.

FIG. 42 is a perspective view that shows a multiaxial antenna device 900B according to a second modification of the ninth embodiment. The multiaxial antenna device 900B includes a first magnetic core 91B, a first coil 92B, a second coil 93B, a second magnetic core 94B, a third coil 95B, a fourth coil 96B, and a fifth coil 97B.

The configuration of a combination of the first magnetic core 91B, the first coil 92B, and the second coil 93B is the same as the configuration of a combination of the first magnetic core 91, the first coil 92, and the second coil 93, shown in FIG. 39. The maximum receiving sensitivity direction of the antenna device made up of a combination of the first magnetic core 91B, the first coil 92B, and the second coil 93B coincides with the axial direction of the first magnetic core 91B (i.e., X-axis direction).

The orientation in which the third coil 95B and the fourth coil 96B are inserted relative to the second magnetic core 94B is opposite to the orientation in which the third coil 95 and the fourth coil 96 are inserted relative to the second magnetic core 94, shown in FIG. 39. The maximum receiving sensitivity direction of the antenna device made up of a combination of the second magnetic core 94B, the third coil 95B, and the fourth coil 96B coincides with the axial direction of the second magnetic core 94B (i.e., Y-axis direction).

The fifth coil 97B is a planar coil formed so as to circle at the outer side on the surface of the printed circuit board 4. The fifth coil 97B is, for example, formed as a printed pattern on the printed circuit board 4. The maximum receiving sensitivity direction of the fifth coil 97B coincides with the direction perpendicular to the printed circuit board 4 (i.e., Z-axis direction).

With the above-described configuration, even when a metal is brought close to the multiaxial antenna device 900B, the maximum receiving sensitivity directions that are the three-axis directions, that is, X-axis direction, Y-axis direction, and Z-axis direction, remain unchanged. Therefore, the multiaxial antenna device 900B that has a wide range of receiving sensitivity and of which the maximum receiving sensitivity directions remain unchanged even when a metal is brought close to the multiaxial antenna device 900B can be provided.

(Third Modification of Ninth Embodiment)

Figure 43:
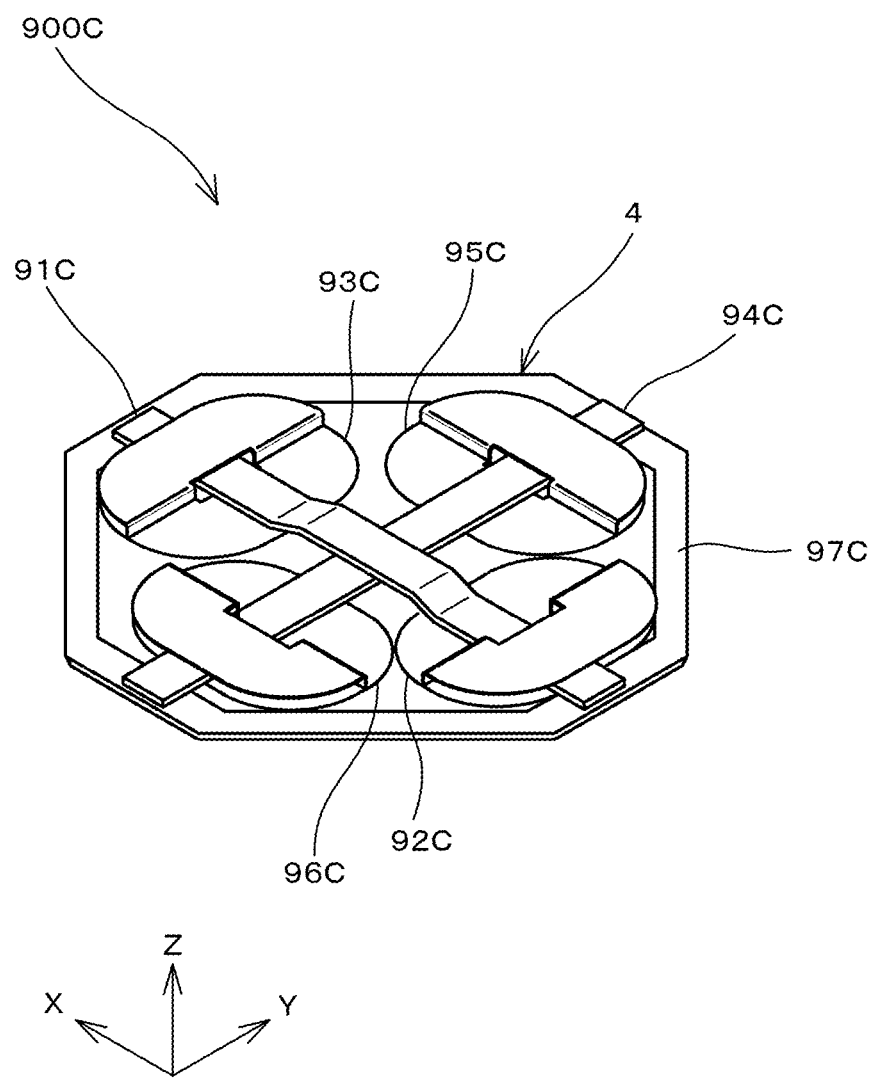
FIG. 43 is a perspective view that shows a multiaxial antenna device according to a third modification of the ninth exemplary embodiment.

FIG. 43 is a perspective view that shows a multiaxial antenna device 900C according to a third modification of the ninth embodiment. The multiaxial antenna device 900C includes a first magnetic core 91C, a first coil 92C, a second coil 93C, a second magnetic core 94C, a third coil 95C, a fourth coil 96C, and a fifth coil 97C.

The configuration of a combination of the first magnetic core 91C, the first coil 92C, and the second coil 93C is the same as the configuration of a combination of the first magnetic core 91A, the first coil 92A, and the second coil 93A, shown in FIG. 41. The maximum receiving sensitivity direction of the antenna device made up of a combination of the first magnetic core 91C, the first coil 92C, and the second coil 93C coincides with the axial direction of the first magnetic core 91C (X-axis direction).

The configuration of a combination of the second magnetic core 94C, the third coil 95C, and the fourth coil 96C is the same as the configuration of a combination of the second magnetic core 94B, the third coil 95B, and the fourth coil 96B, shown in FIG. 42. The maximum receiving sensitivity direction of the antenna device made up of a combination of the second magnetic core 94C, the third coil 95C, and the fourth coil 96C coincides with the axial direction of the second magnetic core 94C (i.e., X-axis direction).

The fifth coil 97C is formed so as to circle at the radially outer side on the surface of the printed circuit board 4. The maximum receiving sensitivity direction of the fifth coil 97C coincides with the direction perpendicular to the printed circuit board 4 (i.e., Z-axis direction).

With the above-described configuration, even when a metal is brought close to the multiaxial antenna device 900C, the maximum receiving sensitivity directions that are the three-axis directions, that is, X-axis direction, Y-axis direction, and Z-axis direction, remain unchanged. Therefore, the multiaxial antenna device 900C that has a wide range of receiving sensitivity and of which the maximum receiving sensitivity directions remain unchanged even when a metal is brought close to the multiaxial antenna device 900C can be provided.

Tenth Embodiment

Figure 44:
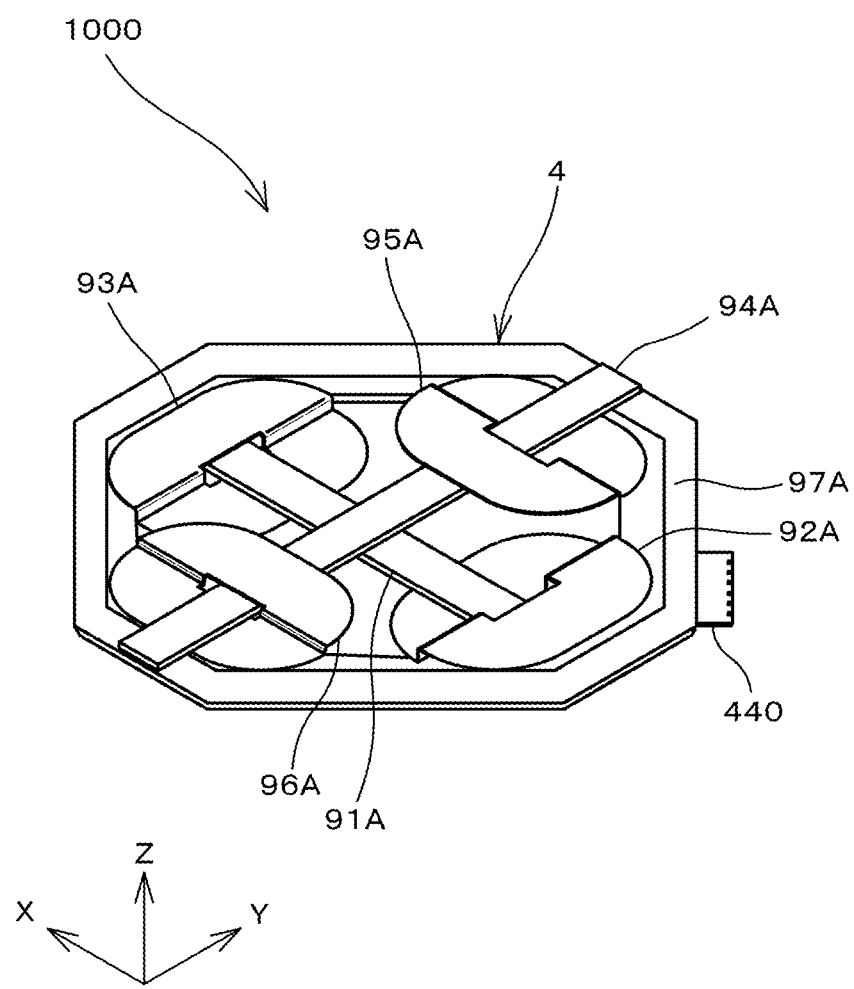
FIG. 44 is a perspective view that shows a multiaxial antenna device according to a tenth exemplary embodiment.

FIG. 44 is a perspective view that shows a multiaxial antenna device 1000 according to a tenth embodiment. The multiaxial antenna device 1000 according to the tenth embodiment has a configuration that the multiaxial antenna device 900A shown in FIG. 41 further includes an external connector 440.

In an exemplary aspect, the external connector 440 is integrally formed with the printed circuit board 4.

With an existing antenna device, terminals for external connection need to be separately provided and coils need to be connected to the terminals for external connection, so there is inconvenience such as an increase in cost, an increase in size, and an increase in the number of manufacturing steps.

However, like the multiaxial antenna device 1000 according to the present embodiment, when the external connector 440 is formed integrally with the printed circuit board 4, a purchaser of the multiaxial antenna device 1000 does not need to separately provide terminals for external connection, and no step of connecting coils to the terminals for external connection is required.

When the printed circuit board 4 is a flexible printed circuit board, the external connector 440 may be configured as a flexible sheet connector. With this configuration, it is advantageous in cost, size, manufacturing work efficiency, easiness of use, and the like.

Alternatively, not a multiaxial antenna device having maximum transmission/receiving sensitivity in multiple directions but a configuration that an antenna device having a maximum transmission/receiving sensitivity in one direction is provided with an external connector may be employed.

(Application Example of Tenth Embodiment)

Here, description will be made on the assumption that the printed circuit board 4 is a flexible printed circuit board and the external connector 440 is a flexible sheet connector.

Figure 45:
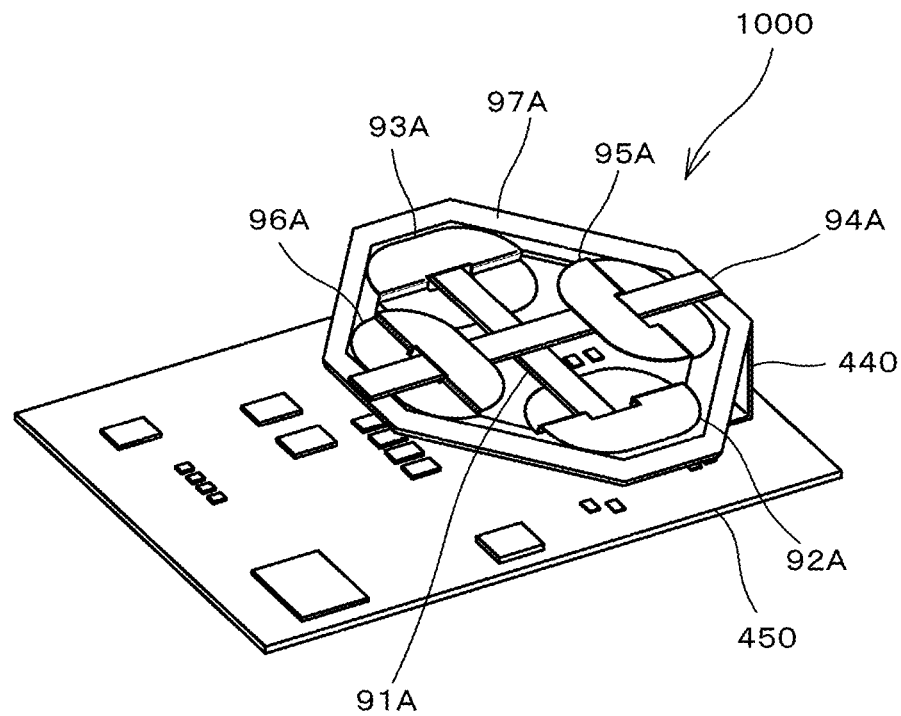
FIG. 45 is a perspective view that shows a state where the multiaxial antenna device according to the tenth exemplary embodiment is mounted on a main board by an external connector.
Figure 46:
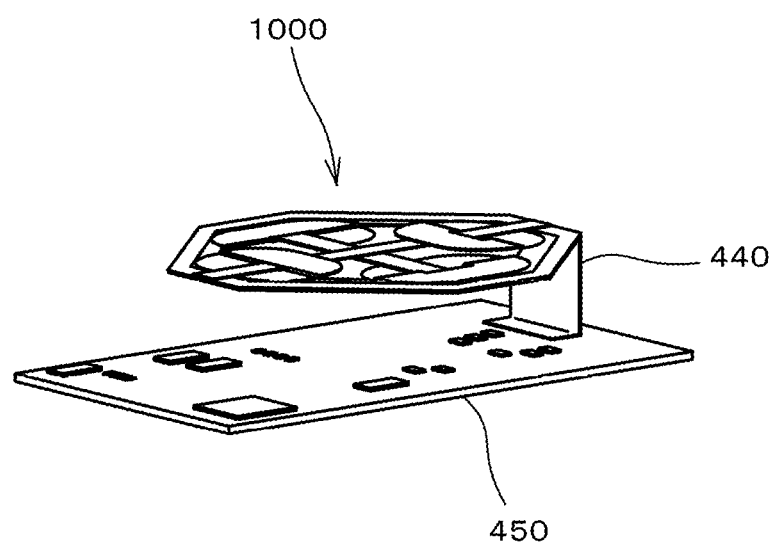
FIG. 46 is a perspective view of the state where the multiaxial antenna device according to the tenth exemplary embodiment is mounted on the main board by the external connector when viewed further lateral to the state shown in FIG. 45.

FIG. 45 is a perspective view that shows a state where the multiaxial antenna device 1000 according to the tenth embodiment is mounted on a main board 450 by the external connector 440 when viewed obliquely from above. FIG. 46 is a perspective view when viewed further laterally from the state shown in FIG. 45 so that the positional relationship among the multiaxial antenna device 1000, the external connector 440, and the main board 450 can be seen.

The multiaxial antenna device 1000 is disposed at a position that overlaps the main board 450 in plan view in the direction of normal to the main board 450. In other words, the external connector 440 is bent, and the multiaxial antenna device 1000 is located above the main board 450.

When the multiaxial antenna device 1000 is mounted on the main board 450 in the arrangement shown in FIG. 45 and FIG. 46, the footprint of the antenna device can be reduced as compared to the configuration that the multiaxial antenna device 1000 is mounted laterally to the main board 450. With this configuration, miniaturization of a unit including the main board 450 and the multiaxial antenna device 1000 as a whole can be achieved.

Eleventh Embodiment

The appearance shape of an antenna device according to an eleventh embodiment is the same as the appearance shape of the antenna device 700 shown in FIG. 34. In other words, the antenna device according to the eleventh embodiment includes the magnetic core 1E, the first coil 2E, and the second coil 3E, shown in FIG. 34. The first coil 2E and the second coil 3E are formed as a printed pattern on the printed circuit board 4.

The antenna device 1100 according to the eleventh embodiment is configured to be able to switch the state of connection between the first coil 2E and the second coil 3E. Specifically, the antenna device 1100 is configured to be able to switch between the state of connection shown in FIG. 3 and the state of connection shown in FIG. 28.

Figure 47A:
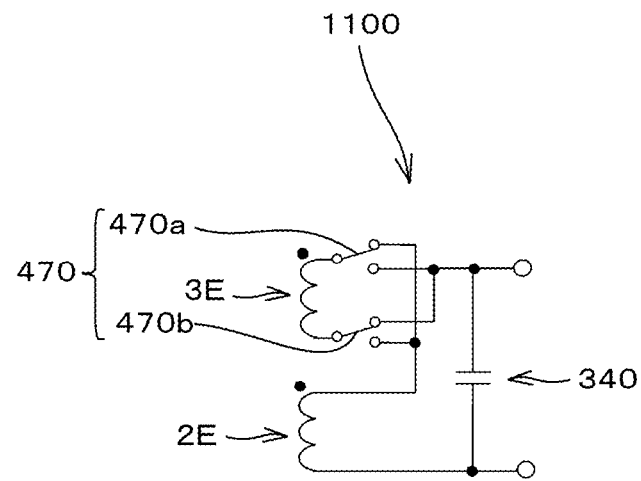
FIG. 47(a) and FIG. 47(b) are diagrams for illustrating a method of switching connection between a first coil and a second coil in an antenna device according to an eleventh exemplary embodiment.
Figure 47B:
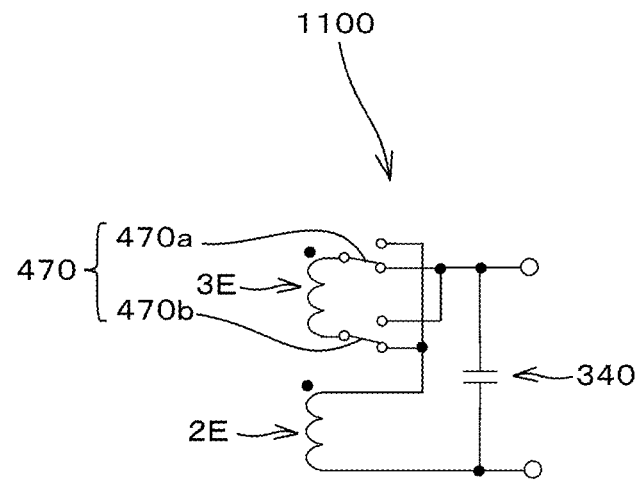

To implement the above configuration, the antenna device 1100 according to the present embodiment includes a switch 470 for connecting the electrical winding start of the first coil 2E and any one of the electrical winding start and electrical winding end of the second coil 3E and connecting the electrical winding end of the first coil and the other one of the electrical winding start and electrical winding end of the second coil (see FIG. 47). The switch 470 is made up of a first switch 470a and a second switch 470b.

FIG. 47(*a*) is a diagram that shows a state where the electrical winding start of the first coil 2E and the electrical winding start of the second coil 3E are connected by the first switch 470a, and the electrical winding end of the first coil 2E and the electrical winding end of the second coil 3E are connected by the second switch 470b. The electrical winding end of the first coil 2E and the electrical winding end of the second coil 3E are connected via the electronic component 340 that is a resonance capacitor.

The state of connection shown in FIG. 47(*a*) is the same as the state of connection shown in FIG. 3. In this state of connection, the maximum receiving sensitivity direction of the antenna device 1100 coincides with the axial direction of the magnetic core 1E.

FIG. 47(*b*) is a diagram that shows a state where the electrical winding start of the first coil 2E and the electrical winding end of the second coil 3E are connected by the first switch 470a, and the electrical winding end of the first coil 2E and the electrical winding start of the second coil 3E are connected by the second switch 470b. As shown, the electrical winding end of the first coil 2E and the electrical winding start of the second coil 3E are connected via the electronic component 340 that is a resonance capacitor.

The state of connection shown in FIG. 47(*b*) is the same as the state of connection shown in FIG. 28. In this state of connection, the maximum receiving sensitivity direction of the antenna device 1100 coincides with the direction perpendicular to the main surfaces of the magnetic core 1E.

In other words, with the antenna device 1100 according to the eleventh embodiment, the maximum receiving sensitivity direction of the antenna device 1100 can be easily switched between the axial direction of the magnetic core 1E and the direction perpendicular to the main surfaces of the magnetic core 1E.

Twelfth Embodiment

The antenna device 1100 according to the eleventh embodiment is configured to be able to switch the maximum receiving sensitivity direction of the antenna device with the switch 470.

In contrast to this, an antenna device according to a twelfth embodiment is configured to be able to switch the maximum receiving sensitivity direction of the antenna device by switching the phase of an input signal to a first coil and the phase of an input signal to a second coil between the same phase and opposite phases. The antenna device according to the present embodiment is a transmitting antenna device that outputs a magnetic field signal.

Figure 48:
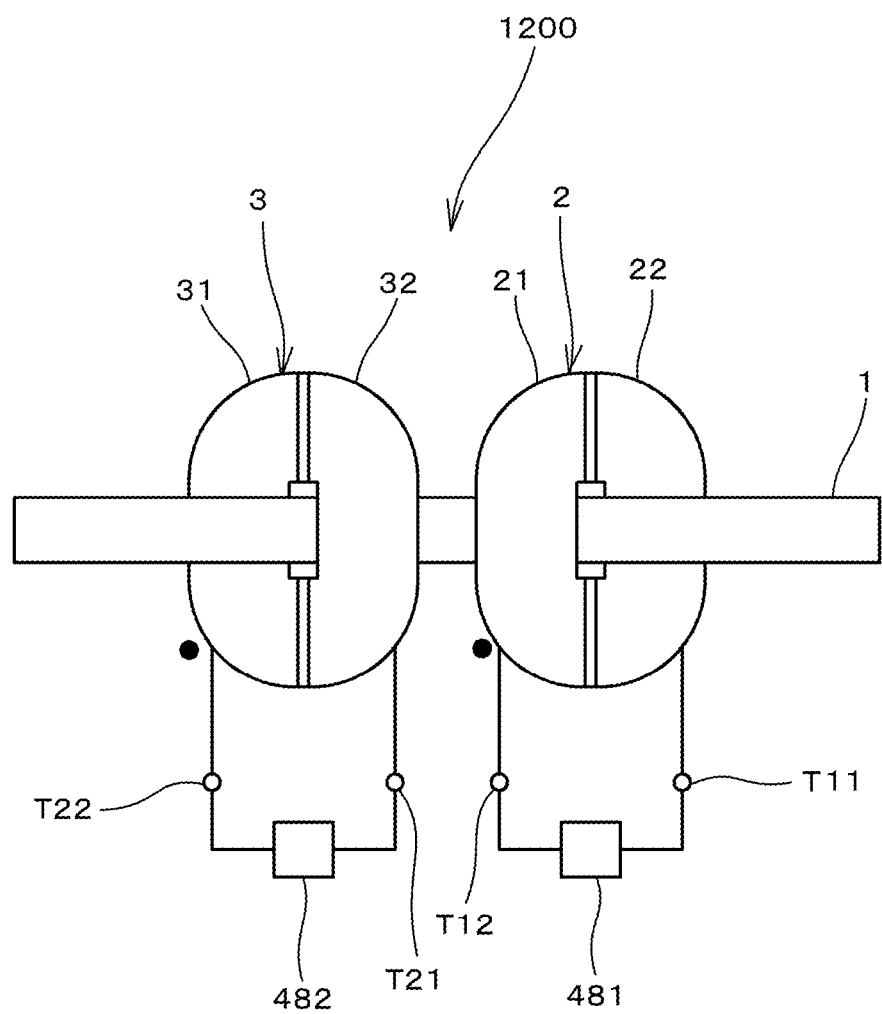
FIG. 48 is a plan view that shows a state where a first driver circuit and a second driver circuit each are connected to an antenna device according to a twelfth exemplary embodiment.

FIG. 48 is a plan view that shows a state where a first driver circuit 481 and a second driver circuit 482 each are connected to the antenna device 1200 according to the twelfth embodiment. The configuration of the antenna device 1200 is basically the same as the configuration of the antenna device 100 shown in FIG. 1 and differs from the configuration of the antenna device 100 in that the first coil 2 and the second coil 3 are not connected.

The first driver circuit 481 is a circuit for driving the first coil 2 and is connected to an input terminal T11 and output terminal T12 of the first coil 2.

Moreover, the second driver circuit 482 is a circuit for driving the second coil 3 and is connected to an input terminal T21 and output terminal T22 of the second coil 3. The second driver circuit 482 is driven in synchronization with the first driver circuit 481. In other words, the input timing of a signal that is input from the first driver circuit 481 to the first coil 2 and the input timing of a signal that is input from the second driver circuit 482 to the second coil 3 are the same.

When a signal that is input from the first driver circuit 481 to the first coil 2 and a signal that is input from the second driver circuit 482 to the second coil 3 are opposite phases, the maximum transmission sensitivity direction of the antenna device 1200 can be brought into coincidence with the axial direction of the magnetic core 1 as in the case of the antenna device 100 (see, e.g., FIG. 3) according to the first embodiment.

When a signal that is input from the first driver circuit 481 to the first coil 2 and a signal that is input from the second driver circuit 482 to the second coil 3 are the same phase, the maximum transmission sensitivity direction of the antenna device 1200 can be brought into coincidence with the direction perpendicular to the main surfaces of the magnetic core 1 as in the case of the antenna device 500 (see, e.g., FIG. 28) according to the fifth embodiment.

Therefore, by switching the phase of a signal that is input from the first driver circuit 481 to the first coil 2 and the phase of a signal that is input from the second driver circuit 482 to the second coil 3 between the same phase and opposite phases, the maximum transmission sensitivity direction of the antenna device 1200 can be easily switched between the axial direction of the magnetic core 1 and the direction perpendicular to the main surfaces of the magnetic core 1.

Thirteenth Embodiment

Figure 49:
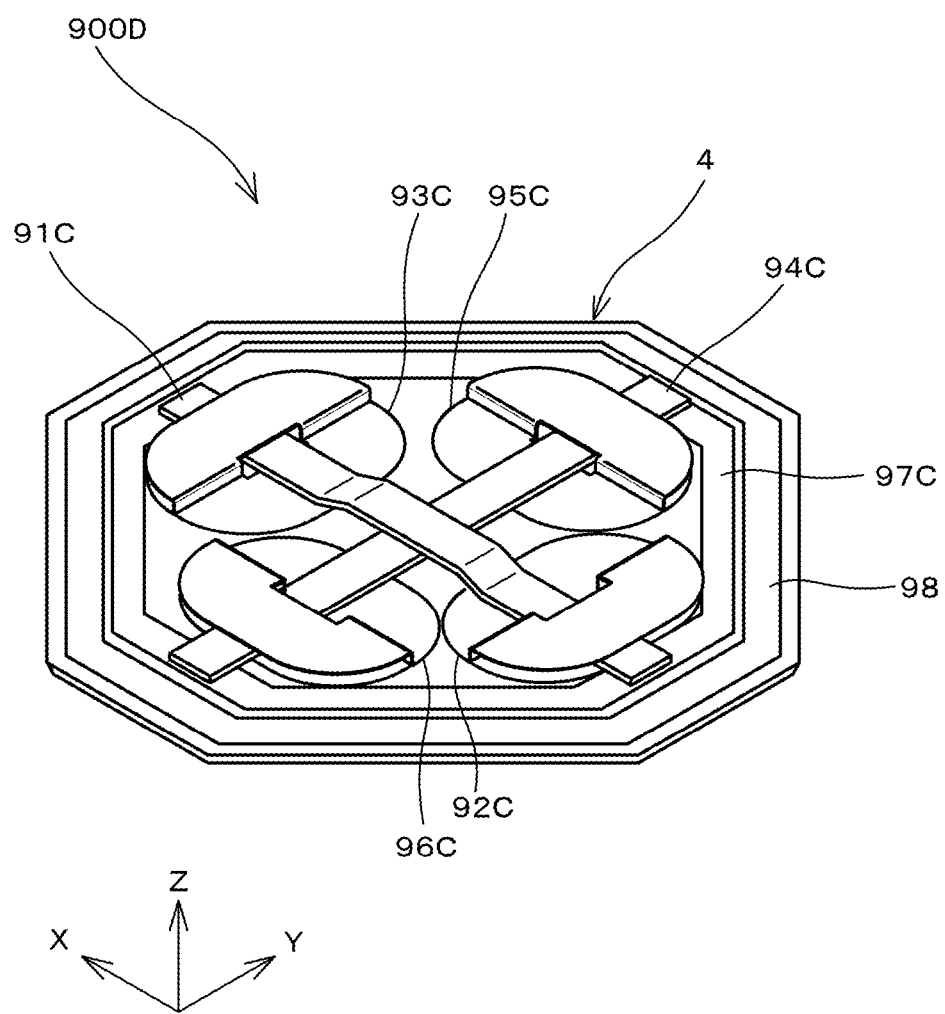
FIG. 49 is a perspective view that shows a multiaxial antenna device according to a thirteenth exemplary embodiment.

FIG. 49 is a perspective view that shows a multiaxial antenna device 900D according to a thirteenth embodiment. The multiaxial antenna device 900D according to the thirteenth embodiment further includes a sixth coil 98 in addition to the configuration of the multiaxial antenna device 900C shown in FIG. 43.

The sixth coil 98 is formed so as to circle outside the fifth coil 97C on the surface of the printed circuit board 4. The maximum receiving sensitivity direction of the sixth coil 98, as well as the maximum receiving sensitivity direction of the fifth coil 97C, coincides with the direction perpendicular to the printed circuit board 4 (Z-axis direction).

Here, the multiaxial antenna device 900C shown in FIG. 43 can be configured to receive, for example, an LF signal around a frequency of 125 kHz. When the sixth coil 98 is configured to receive, for example, an NFC signal around a frequency of 13.56 MHz, the multiaxial antenna device 900D is able to receive an LF signal and an NFC signal. In this case, two of an antenna device for receiving an LF signal and an antenna device for receiving an NFC signal need not be provided to receive an LF signal and an NFC signal, so a footprint for components can be reduced, and manufacturing cost can be reduced. The sixth coil 98 is not limited to the configuration that receives an NFC signal and may be used as a wireless power feeding coil.

When the printed circuit board 4 in which the fifth coil 97C is formed is a multilayer board, the sixth coil 98 can also be formed inside the board by using the same multilayer board, so the device as a whole can be miniaturized.

The multiaxial antenna device 900 may be configured as a transmitting antenna device having a similar configuration, and similar advantageous effects are obtained.

The multiaxial antenna device 900D shown in FIG. 49 has a configuration that the sixth coil 98 is added to the multiaxial antenna device 900C shown in FIG. 43. Alternatively, a multiaxial antenna device may have a configuration that the sixth coil 98 is added to the multiaxial antenna device 900 shown in FIG. 39, the multiaxial antenna device 900A shown in FIG. 41, or the multiaxial antenna device 900B shown in FIG. 42.

Fourteenth Embodiment

The multiaxial antenna devices according to the ninth embodiment and its modifications have peaks of maximum transmission/receiving sensitivity in three directions, that is, X-axis direction, Y-axis direction, and Z-axis direction. However, in the multiaxial antenna devices, there is inconvenience that a coupling capacitance occurs between the coils or between each coil and an external conductor, the receiving voltage of the coils to receive a magnetic field signal decreases, and the receiving area reduces. A coupling capacitance between the coils or between each coil and an external conductor easily occurs at the outermost layer of a coil formed as a conductor pattern in three or more conductor pattern layers of a flexible printed circuit board.

A multiaxial antenna device according to a fourteenth embodiment has a structure such that a coupling capacitance between coils or between each coil and an external conductor can be reduced. The appearance shape of the multiaxial antenna device according to the fourteenth embodiment is the same as the appearance shape of the multiaxial antenna device 900A shown in FIG. 41.

Figure 50:
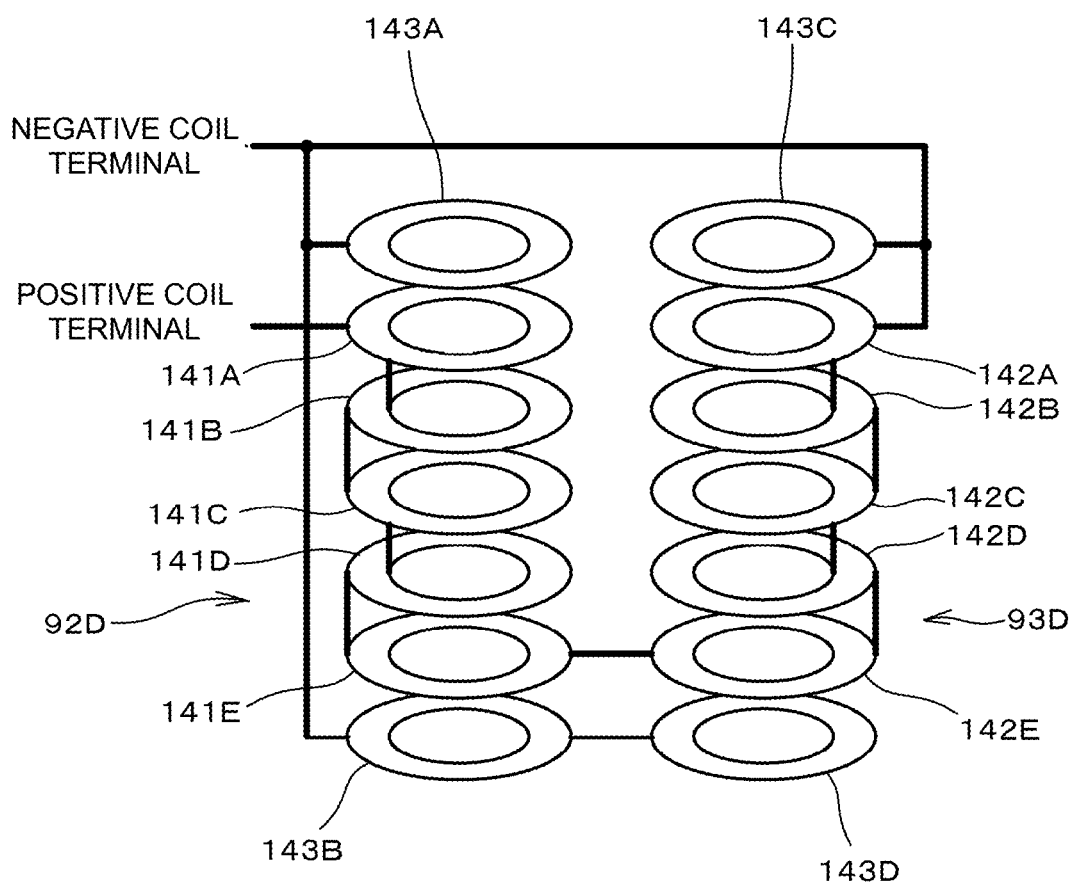
FIG. 50 is a view that shows the connection relationship between a first coil and a second coil that make up a multiaxial antenna device according to a fourteenth exemplary embodiment.

FIG. 50 is a view that shows the connection relationship between a first coil 92D and a second coil 93D that make up the multiaxial antenna device according to the fourteenth embodiment. The first coil 92D and the second coil 93D are coils that respectively correspond to the first coil 92A and the second coil 93A, shown in FIG. 41.

The first coil 92D and the second coil 93D each are made up of a conductor pattern formed in three or more conductor pattern layers formed in a flexible printed circuit board. In the present embodiment, the first coil 92D is made up of conductor patterns 141A to 141E respectively formed in five conductor pattern layers, and the second coil 93D is made up of conductor patterns 142A to 142E respectively formed in five conductor pattern layers.

As shown in FIG. 50, of the conductor patterns 141A to 141E that make up the first coil 92D, any adjacent two of the conductor patterns are connected. Similarly, of the conductor patterns 142A to 142E that make up the second coil 93D, any adjacent two of the conductor patterns are connected. The conductor pattern 141E in the outermost layer of the first coil 92D and the conductor pattern 142E in the outermost layer of the second coil 93D are connected.

A plurality of guard conductor pattern layers in which a plurality of guard conductor patterns 143A to 143D electrically connected to a ground is formed outward of the first coil 92D or the second coil 93D in the axial direction. Specifically, the guard conductor pattern 143A is disposed outward of the conductor pattern 141A of the first coil 92D, the guard conductor pattern 143B is disposed outward of the conductor pattern 141E of the first coil 92D, the guard conductor pattern 143C is disposed outward of the conductor pattern 142A of the second coil 93D, and the guard conductor pattern 143D is disposed outward of the conductor pattern 142E of the second coil 93D. The guard conductor patterns 143A, 143C are formed in the same guide conductor pattern layer. The guard conductor patterns 143B, 143D are formed in the same guard conductor pattern layer.

As described above, the guard conductor patterns 143A to 143D are electrically connected to the ground. In the present embodiment, the guard conductor patterns 143A to 143C, as well as the conductor pattern 142A of the second coil 93D, are connected to a negative coil terminal, and the guard conductor pattern 143D is connected to the guard conductor pattern 143B. The negative coil terminal is connected to the ground. With such a configuration, all the guard conductor patterns 143A to 143D are electrically connected to the ground. The guard conductor pattern 143D may be directly connected to the negative coil terminal.

A positive coil terminal is connected to the conductor pattern 141A of the first coil 92A.

Figure 51:
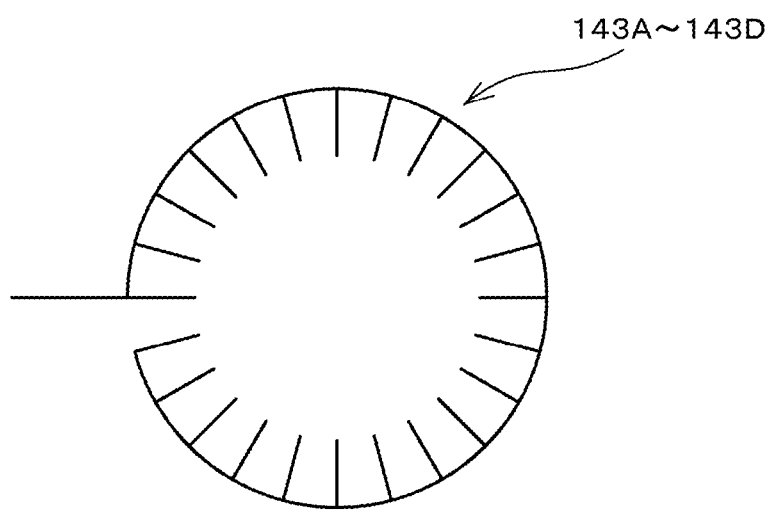
FIG. 51 is a view that shows an example of the shapes of guard conductor patterns through which loop current does not flow.
Figure 52:
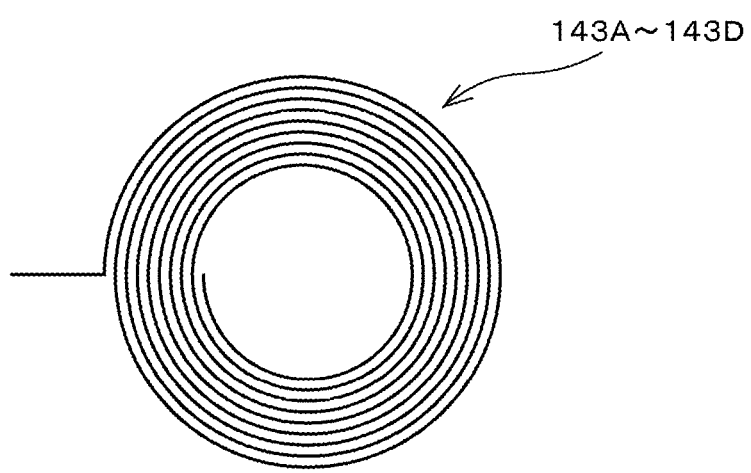
FIG. 52 is a view that shows another example of the shapes of guard conductor patterns through which loop current does not flow.

The guard conductor patterns 143A to 143D each have a shape such that loop current does not flow. FIG. 51 is a view that shows an example of the shapes of the guard conductor patterns 143A to 143D through which loop current does not flow. FIG. 52 is a view that shows another example of the shapes of the guard conductor patterns 143A to 143D through which loop current does not flow. However, the shapes of the guard conductor patterns 143A to 143D are not limited to the shapes shown in FIG. 51 or FIG. 52.

In the above description, description is made on the assumption that, of the multiaxial antenna device 900A shown in FIG. 41, the guard conductor pattern layers in which the guard conductor patterns are formed are disposed for coils corresponding to the first coil 92A and the second coil 93A. Alternatively, similarly, for coils corresponding to the third coil 95A, the fourth coil 96A, and the fifth coil 97A, guard conductor pattern layers in which guard conductor patterns are formed may be disposed.

With the multiaxial antenna device according to the fourteenth embodiment, since the plurality of guard conductor pattern layers in which the guard conductor patterns 143A to 143D electrically connected to the ground are formed are disposed outward of the first coil 92D or the second coil 93D in the axial direction, occurrence of a coupling capacitance between coils or between each coil and another conductor can be reduced. In addition, since the guard conductor patterns 143A to 143D each have a shape such that loop current does not flow, influence on the coils is reduced by reducing occurrence of eddy current caused by an external magnetic field.

Since occurrence of a coupling capacitance between coils or between each coil and another conductor, particularly, a decrease in receiving sensitivity in a tuned state and occurrence of induced voltage due to resonance of another coil can be suppressed. With the guard conductor patterns 143A to 143D, coils are insusceptible to a nearby metal, so the flexibility of arrangement of the multiaxial antenna device improves, and limitations on usage conditions can be reduced.

When the guard conductor patterns 143A to 143D are disposed, the self-capacitance of each coil increases, so a capacitance required to tune can be achieved by only the self-capacitance. In this case, capacitors required to tune can be reduced.

The above-described guard conductor patterns may be similarly disposed in the multiaxial antenna devices according to the above-described embodiments and their modifications. The guard conductor patterns may also be disposed in the antenna devices according to the above-described embodiments and their modifications, other than the multiaxial antenna devices.

Fifteenth Embodiment

In the multiaxial antenna device according to the fourteenth embodiment, since the plurality of guard conductor pattern layers in which the guard conductor patterns 143A to 143D electrically connected to the ground are formed are disposed, occurrence of a coupling capacitance between coils or between each coil and another conductor is reduced.

In contrast to this configuration, a multiaxial antenna device according to a fifteenth embodiment has a configuration that is able to reduce occurrence of a coupling capacitance between coils or between each coil and another conductor without guard conductor pattern layers.

The appearance shape of the multiaxial antenna device according to the fifteenth embodiment is the same as the appearance shape of the multiaxial antenna device 900A shown in FIG. 41.

Figure 53:
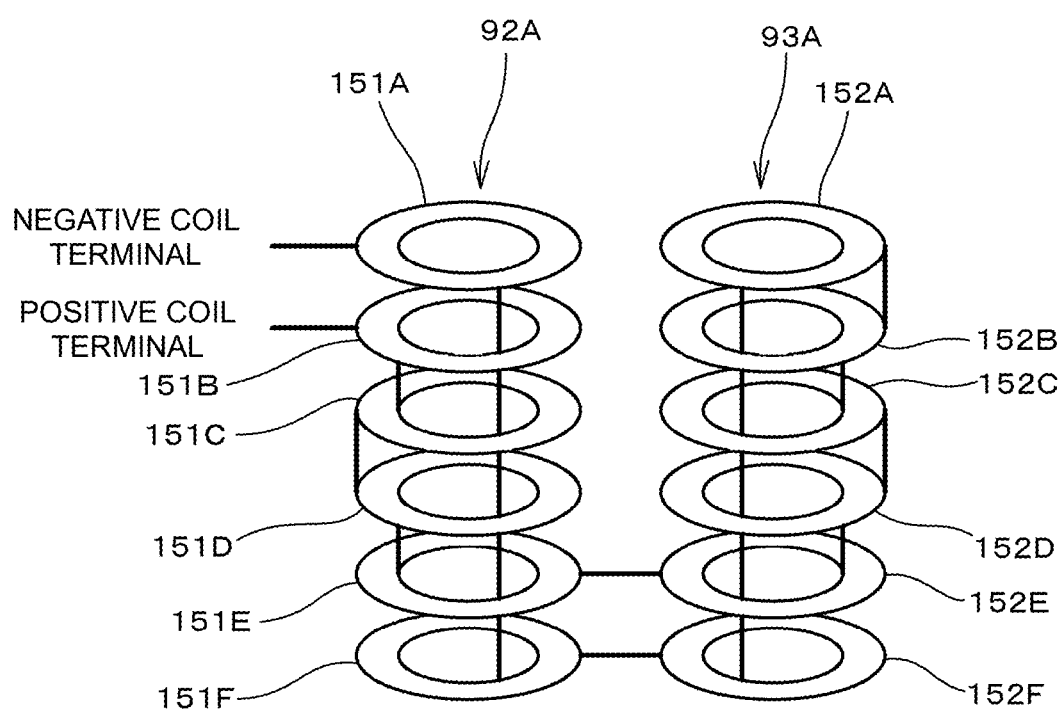
FIG. 53 is a view that shows the connection relationship between a first coil and a second coil that make up a multiaxial antenna device according to a fifteenth exemplary embodiment.

FIG. 53 is a view that shows the connection relationship between the first coil 92A and the second coil 93A that make up the multiaxial antenna device according to the fifteenth embodiment. The first coil 92A and the second coil 93A respectively correspond to the first coil 92A and the second coil 93A, shown in FIG. 41.

A first coil 92E and a second coil 93E each are made up of a conductor pattern formed in three or more conductor pattern layers formed in a flexible printed circuit board. In the present embodiment, the first coil 92E is made up of conductor patterns 151A to 151F respectively formed in six conductor pattern layers, and the second coil 93D is made up of conductor patterns 152A to 152F respectively formed in six conductor pattern layers.

The conductor pattern 151B is connected to the positive coil terminal. The conductor pattern 151A is connected to the negative coil terminal. The negative coil terminal is connected to the ground.

From the positive coil terminal to the negative coil terminal, the conductor patterns are connected in order of the conductor pattern 151B, the conductor pattern 151C, the conductor pattern 151D, the conductor pattern 151E, the conductor pattern 152E, the conductor pattern 152D, the conductor pattern 152C, the conductor pattern 152B, the conductor pattern 152A, the conductor pattern 152F, the conductor pattern 151F, and the conductor pattern 151A.

In other words, of the plurality of conductor patterns that make up the first coil 92D and the second coil 93D, the outermost conductor patterns 151A, 151F, 152F, 152A are connected in series with each other, and one end of the conductor pattern 151A that is one end of the serially connected outermost conductor patterns 151A, 151F, 152F, 152A is electrically connected to the ground. With such a configuration, the outermost conductor patterns 151A, 151F, 152F, 152A can be caused to respectively function as in the case of the guard conductor patterns 143A to 143D shown in FIG. 50, so occurrence of a coupling capacitance between coils or between each coil and another conductor can be reduced.

Since no additional guard conductor patterns need to be provided, the number of turns reduces accordingly, so an increase in the thickness of each coil can be suppressed.

In the above description, the connection relationship between the first coil 92A and the second coil 93A, shown in FIG. 41, is described; however, a similar connection relationship may be applied to the third coil 95A and the fourth coil 96A.

The above-described feature, that is, the configuration that the outermost conductor patterns that make up the coils are connected in series with each other and one end of the conductor pattern that is one end of the serially connected outermost conductor patterns is electrically connected to the ground, may be similarly applied to the multiaxial antenna devices according to the above-described embodiments and their modifications and may also be similarly applied to the antenna devices according to the above-described embodiments and their modifications, other than the multiaxial antenna devices.

Sixteenth Embodiment

The multiaxial antenna devices according to the ninth embodiment and its modifications include two magnetic cores, that is, the first magnetic core and the second magnetic core disposed in a cross shape.

A multiaxial antenna device according to a sixteenth embodiment includes a single magnetic core having an integrally formed cross shape.

Figure 54A:
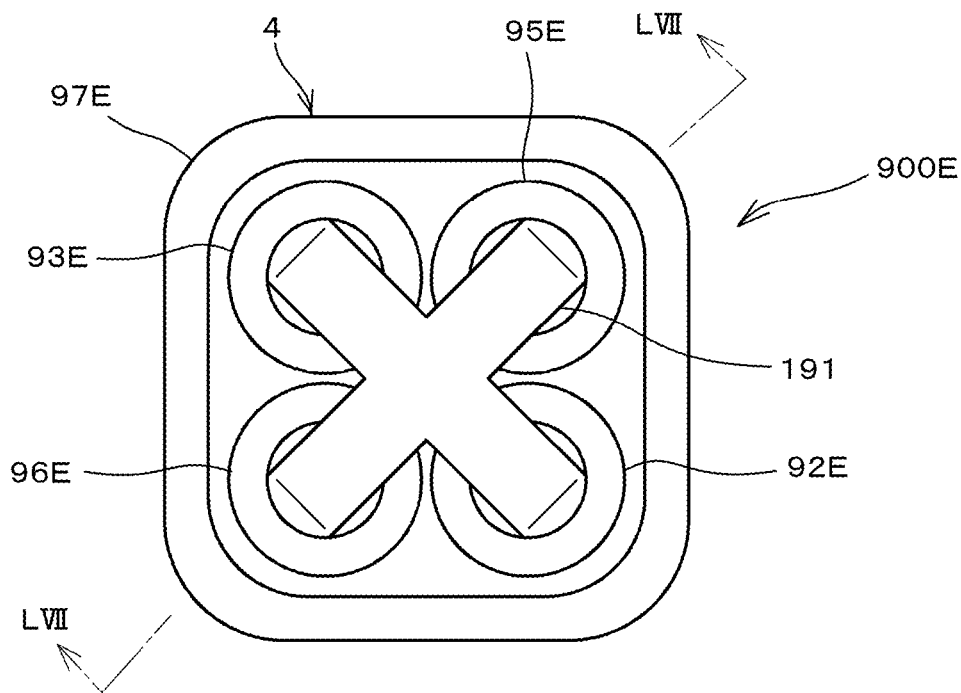
Figure 54B:
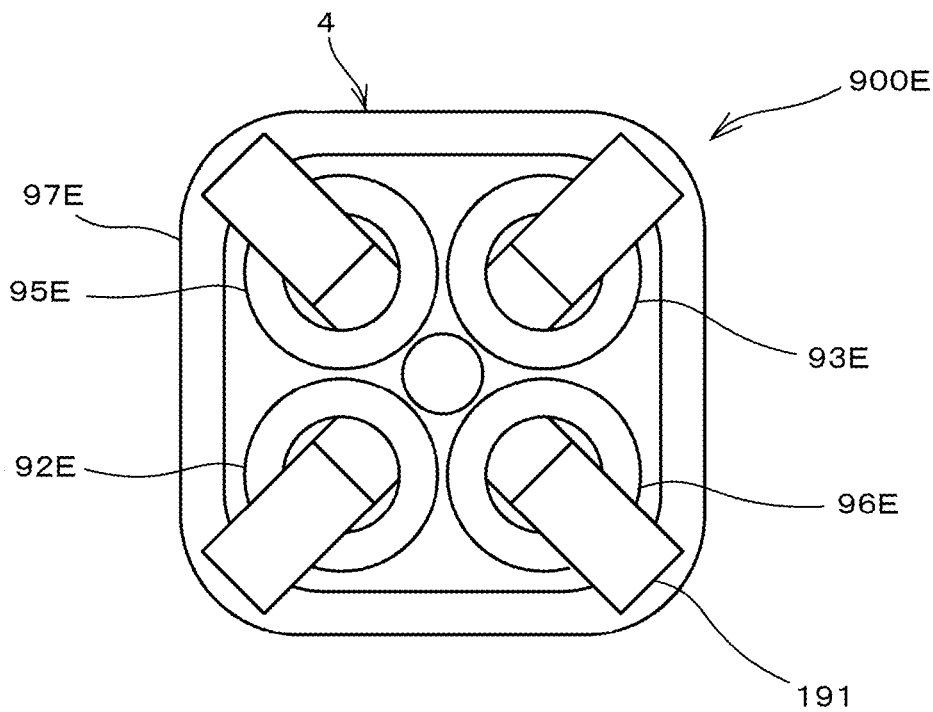

FIGS. 54(a) and 54(b) show plan views of the multiaxial antenna device 900E according to the sixteenth embodiment, in which FIG. 54(a) shows a front surface and FIG. 54(b) shows a back surface. Here, for the sake of convenience, the side shown in FIG. 54(a) is a front surface, and the side shown in FIG. 54(b) is a back surface; however, the side shown in FIG. 54(a) may be a back surface, and the side shown in FIG. 54(b) may be a front surface.

The multiaxial antenna device 900E includes a magnetic core 191, the first coil 92E, the second coil 93E, a third coil 95E, a fourth coil 96E, and a fifth coil 97E. The first coil 92E, the second coil 93E, the third coil 95E, the fourth coil 96E, and the fifth coil 97E are formed as a printed pattern in the printed circuit board 4.

Figure 55:
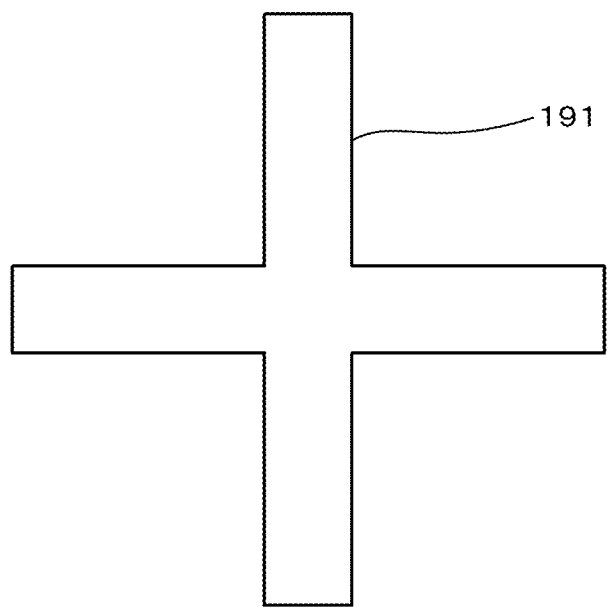
FIG. 55 is a plan view of a magnetic core of the multiaxial antenna device according to the sixteenth embodiment.
Figure 56:
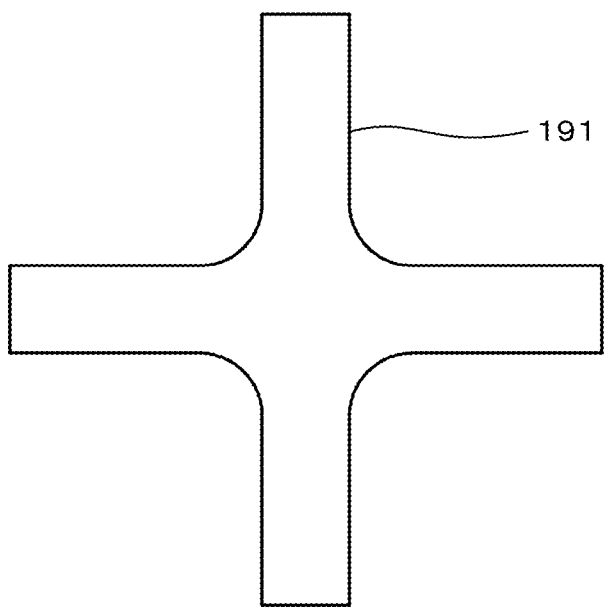
FIG. 56 is a plan view of a magnetic core having a shape different from the shape shown in FIG. 55.

FIG. 55 is a plan view of the magnetic core 191. As shown in FIG. 55, the magnetic core 191 has an integrally formed cross shape. However, the shape of the magnetic core 191 may be the shape shown in FIG. 56.

Figure 57:
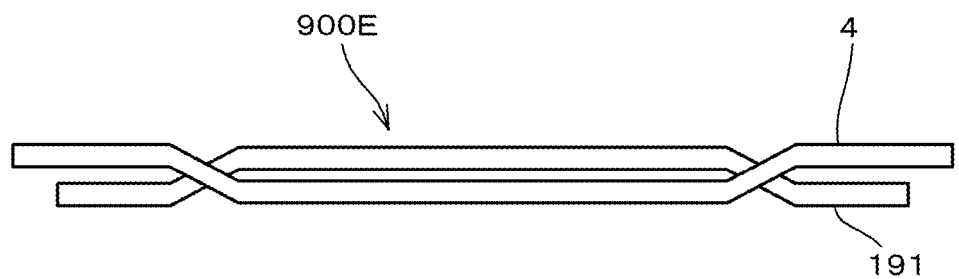
FIG. 57 is a cross-sectional view of the multiaxial antenna device, taken along the line LVII-LVII in FIG. 54(a).

FIG. 57 is a cross-sectional view of the multiaxial antenna device 900E taken along the line LVII-LVII in FIG. 54(a).

As shown in FIG. 57, the thickness of the multiaxial antenna device 900E is a thickness that is the sum of the thickness of the magnetic core 191 and the thickness of the printed circuit board 4 in which the coils 92E, 93E, 95E, 96E, 97E are formed.

With the configuration that two magnetic cores are disposed in a cross shape, the thickness increases at a point at which the two magnetic cores overlap; however, the multiaxial antenna device 900E according to the present embodiment includes the single cross-shape magnetic core 191, so the thickness of the multiaxial antenna device can be reduced.

With the configuration using two magnetic cores, the degrees of bending of the two magnetic cores vary, so the characteristics of the two magnetic cores due to bending vary, and the inductance and sensitivity of each axis are different. In addition, a relative angle between the two magnetic cores needs to be adjusted. However, with the multiaxial antenna device 900E according to the present embodiment, since the single cross-shape magnetic core 191 is used, a difference in the characteristics between the above-described axes can be reduced. In addition, a relative angle between the two magnetic cores does not need to be adjusted, so positioning of the magnetic core and the coils is easy.

Furthermore, with the configuration using two magnetic cores, magnetic cores need to be inserted into coils one by one during manufacturing and man-hours during manufacturing increase; however, with the multiaxial antenna device 900E according to the present embodiment, the single magnetic core just needs to be inserted into the coils, so man-hours during manufacturing can be reduced.

(First Modification of Sixteenth Embodiment)

Figure 58A:
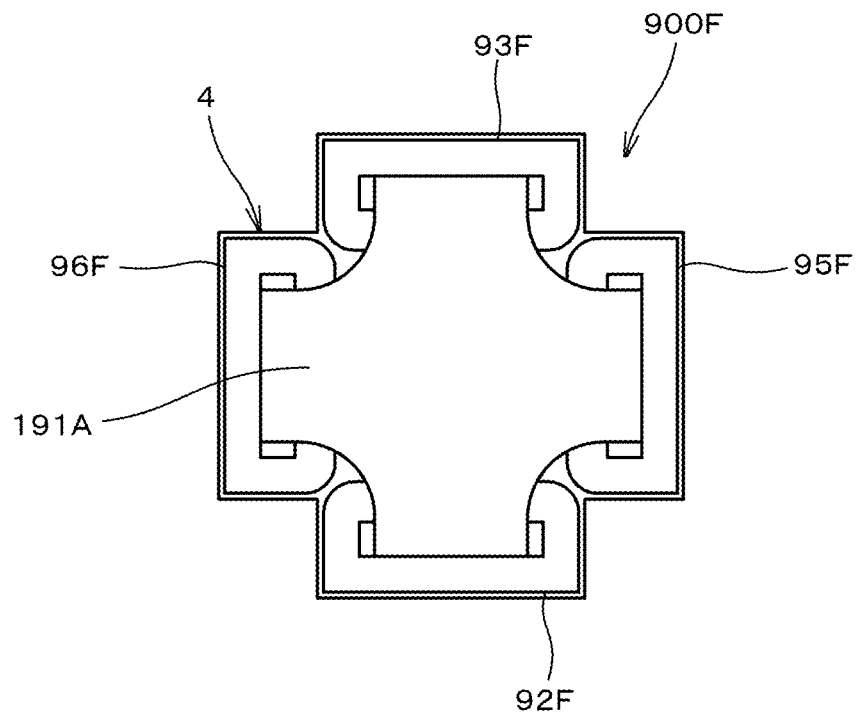
Figure 58B:
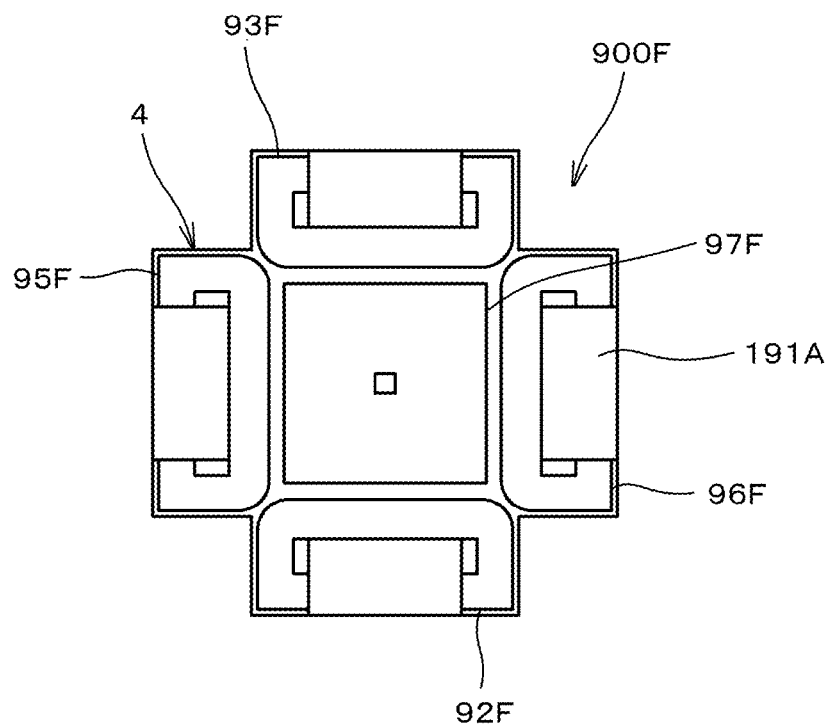

FIGS. 58(a) and 58(b) shows plan views of a multiaxial antenna device 900F according to a first modification of the sixteenth embodiment, in which FIG. 58(a) shows a front surface and FIG. 58(b) shows a back surface.

The multiaxial antenna device 900F according to the first modification of the sixteenth embodiment includes a magnetic core 191A, a first coil 92F, a second coil 93F, a third coil 95F, a fourth coil 96F, and a fifth coil 97F. The first coil 92F, the second coil 93F, the third coil 95F, the fourth coil 96F, and the fifth coil 97F are formed as a printed pattern in the printed circuit board 4.

Figure 59:
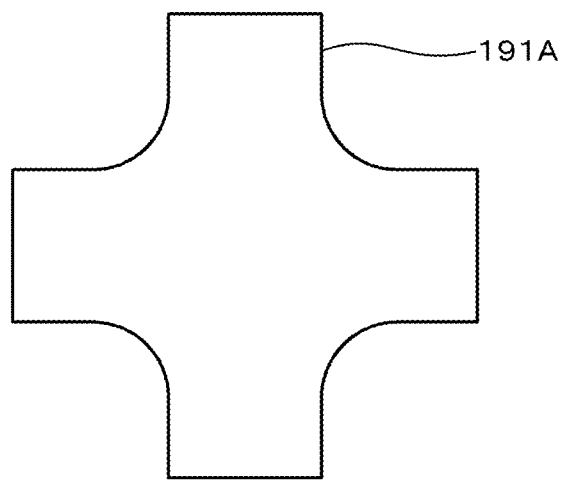
FIG. 59 is a plan view of a magnetic core of the multiaxial antenna device according to the first modification of the sixteenth exemplary embodiment.

FIG. 59 is a plan view of the magnetic core 191A. As shown in FIG. 59, the magnetic core 191A has an integrally formed cross shape.

Figure 60:
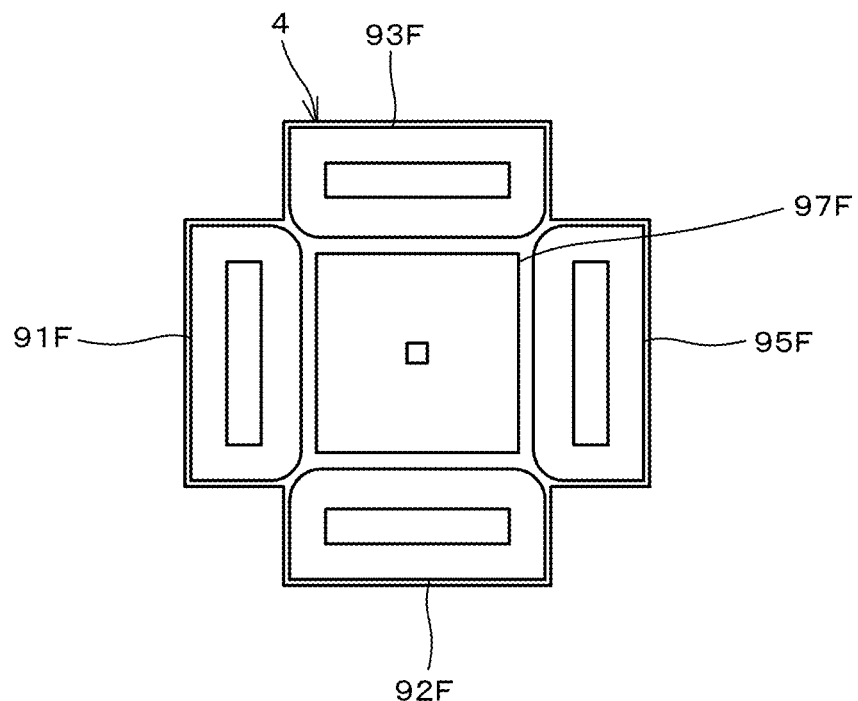
FIG. 60 is a plan view that shows a first coil, a second coil, a third coil, a fourth coil, and a fifth coil formed in a printed circuit board.

FIG. 60 is a plan view that shows the first coil 92F, the second coil 93F, the third coil 95F, the fourth coil 96F, and the fifth coil 97F formed in the printed circuit board 4. In the multiaxial antenna device 900E shown in FIGS. 54(a) and 54(b), the fifth coil 97E is formed so as to circle outside the first coil 92E, the second coil 93E, the third coil 95E, and the fourth coil 96E; however, the fifth coil 97F shown in FIG. 60 is disposed inside so as to be surrounded by the first coil 92F, the second coil 93F, the third coil 95F, and the fourth coil 96F.

A sixth coil that circles outside the first coil 92F, the second coil 93F, the third coil 95F, and the fourth coil 96F may be further provided.

Figure 61:
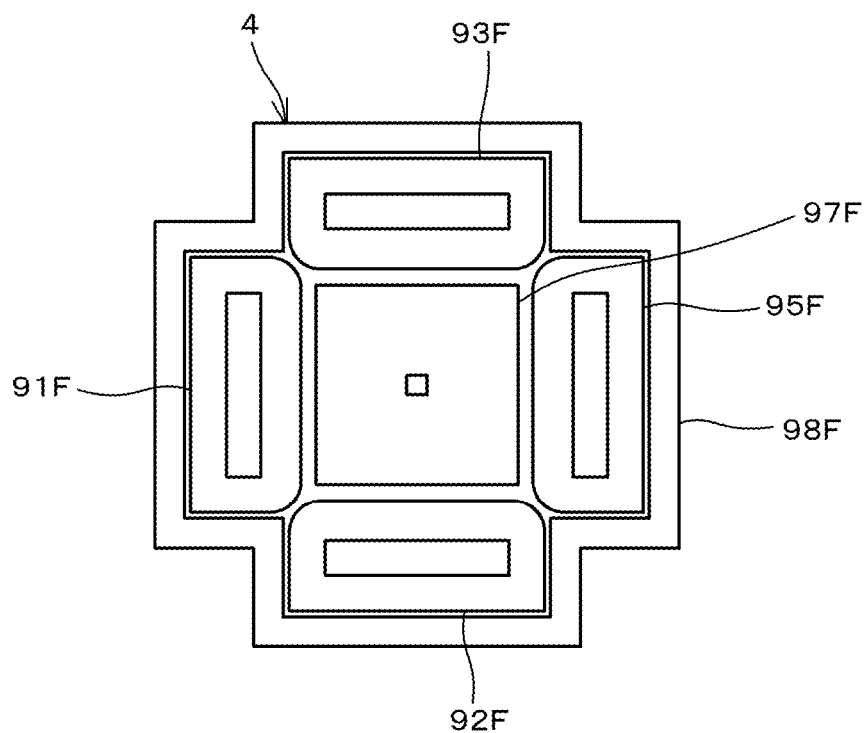
FIG. 61 is a plan view that shows a first coil, a second coil, a third coil, a fourth coil, a fifth coil, and a sixth coil formed in a printed circuit board.

FIG. 61 is a plan view that shows the first coil 92F, the second coil 93F, the third coil 95F, the fourth coil 96F, the fifth coil 97F, and a sixth coil 98F formed in the printed circuit board 4. The sixth coil 98F is formed so as to circle outside the first coil 92F, the second coil 93F, the third coil 95F, the fourth coil 96F, and the fifth coil 97F.

In general, it is noted that the exemplary aspects of the present invention are not limited to the above-described embodiments. Alternatively, various applications or alterations may be added within the scope of the present invention.

For example, in the above-described embodiments and their modifications, the antenna devices described as receiving antenna devices that receive a magnetic field signal may be configured as transmitting antenna devices having a similar configuration.

Moreover, the characteristic configurations described in the above-described embodiments and their modifications may be combined with the antenna devices of the other embodiments and their modifications as needed.

Figure 62:
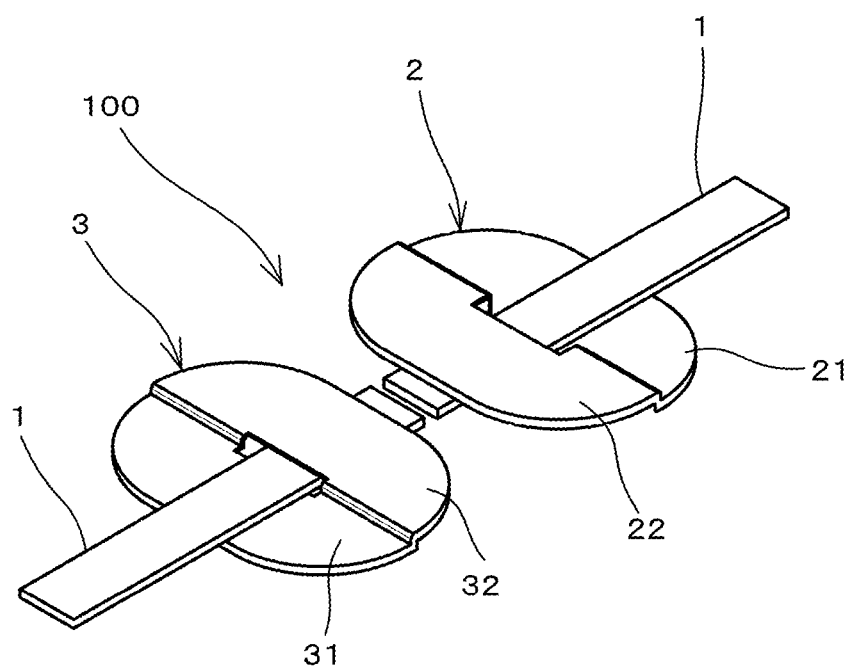
FIG. 62 is a perspective view that shows an antenna device having a configuration that a magnetic core is divided.
Figure 63:
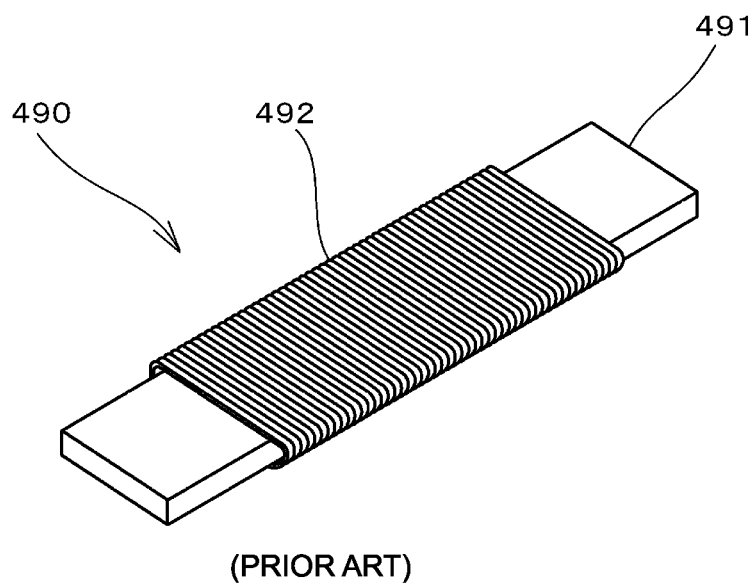
FIG. 63 is a perspective view that shows an existing bar antenna.
Figure 64:
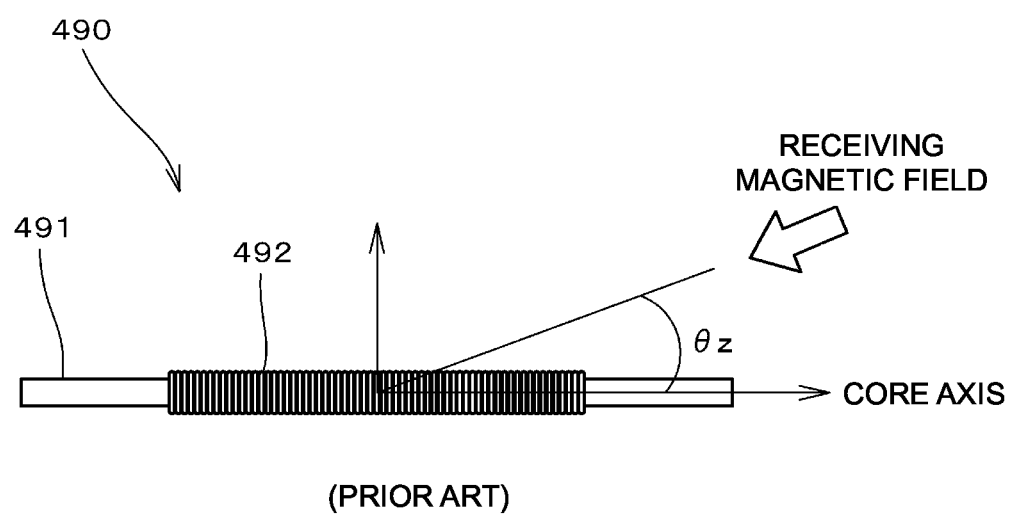
FIG. 64 is a view for illustrating an angle between a receiving magnetic field and a core axis in the existing bar antenna.
Figure 65:
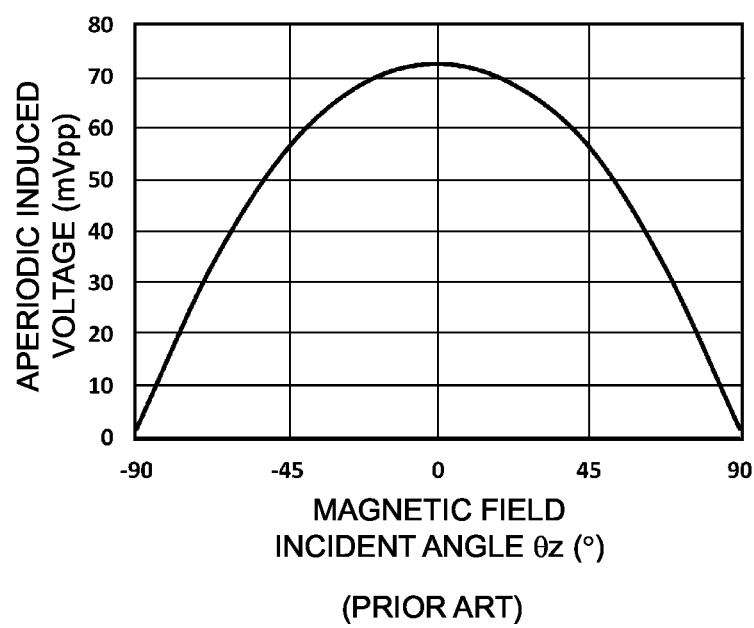
FIG. 65 is a graph that shows the relationship between a magnetic field incident angle and a receiving sensitivity in the existing bar antenna.
Figure 66A:
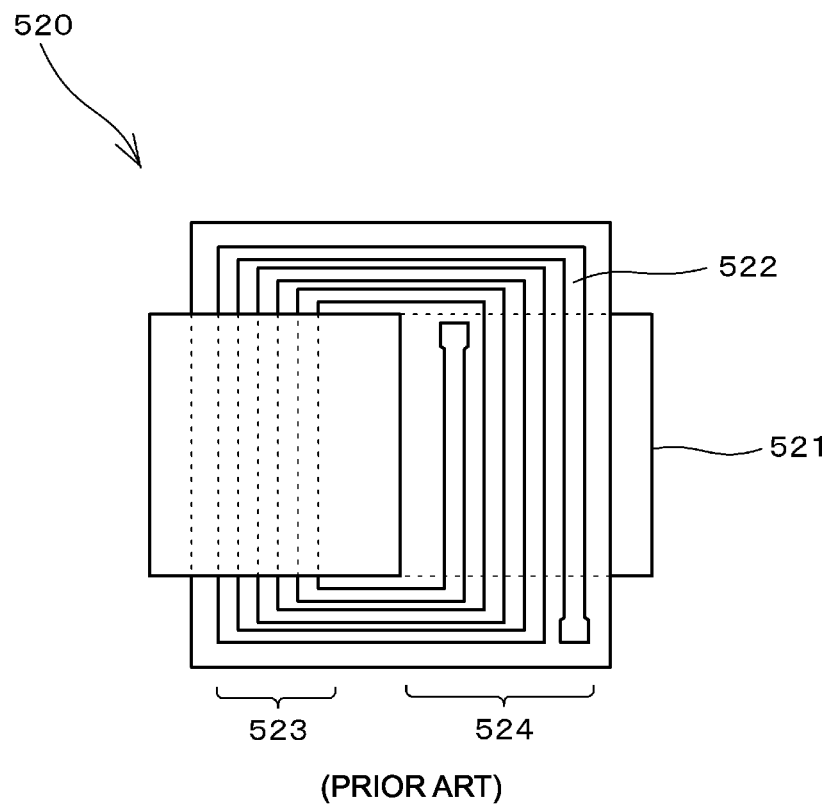
FIG. 66(*a*) is a plan view of the antenna device described in Patent Document 1, and FIG. 66(*b*) is a side view of the antenna device.
Figure 66B:
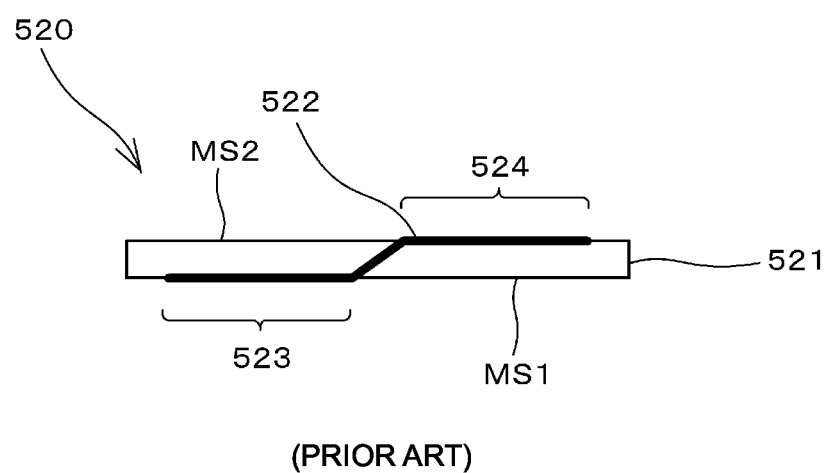

In the antenna device 100 shown in FIG. 1, the magnetic core 1 may be divided between the first coil 2 and the second coil 3. FIG. 62 is a perspective view that shows the antenna device 100 having a configuration that the magnetic core is divided. A configuration that the two divided magnetic cores 1 are in contact with each other may be employed.

In the configuration that the first coil and the second coil are formed as a printed pattern on the printed circuit board 4, the first coil and the second coil may be formed not on only one side of the printed circuit board 4 but on both sides of the printed circuit board 4. In the above-described embodiments and their modifications, as in the case of the antenna device 800 according to the eighth embodiment, the coils may be formed inside the multilayer board.

In the configuration that the first coil and the second coil are formed as a printed pattern on the printed circuit board 4, one of the first coil and the second coil may be formed as a printed pattern, and the other one of the coils may be formed as a wound coil, for example.

Moreover, it is noted that the above-described multiaxial antenna devices are described on the assumption that the peak of transmission/receiving sensitivity is provided in three directions, that is, the X-axis direction, the Y-axis direction, and the Z-axis direction perpendicular to one another. Alternatively, the configuration may be such that the peak of transmission/receiving sensitivity is provided in any two directions of the X-axis direction, the Y-axis direction, and the Z-axis direction, or the configuration may be such that the peak of transmission/receiving sensitivity is provided in a direction other than the three directions.

REFERENCE SIGNS LIST 1, 1B, 1E, 1F, 1G, 1H, 1K magnetic core
1BW, 1EW wide portion of the magnetic core
2, 2A, 2C, 2D, 2E, 2F, 2G, 2H, 2J, 2K first coil
3, 3A, 3C, 3D, 3E, 3F, 3G, 3H, 3J, 3K second coil
4 printed circuit board
11 first component part of the magnetic core
12 second component part of the magnetic core
13 third component part of the magnetic core
21, 21A, 21C, 21D, 21E, 21F, 21G, 21H, 21J first portion of the first coil
22, 22A, 22C, 22D, 22E, 22F, 22G, 22H, 22J second portion of the first coil
31, 31A, 31C, 31D, 31E, 31F, 31G, 31H, 31J third portion of the second coil
32, 32A, 32C, 32D, 32E, 32F, 32G, 32H, 32J fourth portion of the second coil
40 core stopper
91, 91A, 91B, 91C first magnetic core
92, 92A, 92B, 92C, 92D, 92E, 92F first coil
93, 93A, 93B, 93C, 93D, 93E, 93F second coil 94, 94A, 94B, 94C second magnetic core
95, 95A, 95B, 95C, 95E, 95F third coil
96, 96A, 96B, 96C, 96E, 96F fourth coil
97, 97A, 97B, 97C, 97E, 97F fifth coil
98, 98F sixth coil
100 antenna device according to a first embodiment
100A antenna device according to a first modification of the first embodiment
100B antenna device according to a second modification of the first embodiment
100C antenna device according to a third modification of the first embodiment
100D antenna device according to a fourth modification of the first embodiment
143A, 143B, 143C, 143D guard conductor pattern
191, 191A cross-shaped magnetic core
200 antenna device according to a second embodiment
200A antenna device according to a first modification of the second embodiment
200B antenna device according to a second modification of the second embodiment
200C antenna device according to a third modification of the second embodiment
241 third coil
242 fourth coil
243 fifth coil
244 sixth coil
300 antenna device according to a third embodiment
300A antenna device according to a first modification of the third embodiment
340 electronic component
370 multilayer board
371a, 371b, 371c, 371d first tap extended line
372a, 372b, 372c, 372d second tap extended line
373 chip jumper
400 antenna device according to a fourth embodiment
440 external connector
450 main board
470 switch
470a first switch
470b second switch
481 first driver circuit
482 second driver circuit
500 antenna device according to a fifth embodiment
600 antenna device according to a sixth embodiment
700 antenna device according to a seventh embodiment
700A antenna device according to a first modification of the seventh embodiment
800 antenna device according to an eighth embodiment
900 multiaxial antenna device according to a ninth embodiment
900A multiaxial antenna device according to a first modification of the ninth embodiment
900B multiaxial antenna device according to a second modification of the ninth embodiment
900C multiaxial antenna device according to a third modification of the ninth embodiment
900D multiaxial antenna device according to a thirteenth embodiment
900E multiaxial antenna device according to a sixteenth embodiment
900F multiaxial antenna device according to a first modification of the sixteenth embodiment
1000 multiaxial antenna device according to a tenth embodiment
1100 antenna device according to an eleventh embodiment
1200 antenna device according to a twelfth embodiment
M1 first main surface of the magnetic core
M2 second main surface of the magnetic core

The invention claimed is:

1. An antenna device comprising:
a magnetic core having first and second main surfaces that oppose each other and that extend in a first direction;
a planar first coil having a first portion disposed on the first main surface of the magnetic core and a second portion disposed on the second main surface of the magnetic core, such that the first and second portions of the planar first coil do not overlap each other in a plan view of the first or second main surfaces of the magnetic core; and
a planar second coil connected in series with the planar first coil and disposed next to the planar first coil in the first direction, with the planar second coil having a third portion disposed on the first main surface of the magnetic core and a fourth portion disposed on the second main surface of the magnetic core, such that the third and fourth portions of the planar second coil do not overlap each other in the plan view,
wherein a distance between the second and fourth portions is shorter than a distance between the second and third portions, and
wherein either respective electrical winding starts of the planar first and second coils are directly connected to each other with the planar first and second coils each having electrical winding directions that both extend from the electrical winding starts in a clockwise direction, or respective electrical winding ends of the planar first and second coils are directly connected to each other with the planar first and second coils each having electrical winding directions that both extend from the electrical winding ends in a counterclockwise direction.

2. The antenna device according to claim 1, wherein the magnetic core has a rectangular flat plate shape.

3. The antenna device according to claim 2, wherein each of the planar first coil and the planar second coil have a winding axis in a direction perpendicular to the first main surface or second main surface of the magnetic core.

4. The antenna device according to claim 1, wherein the magnetic core comprises a combination of a plurality of members.

5. The antenna device according to claim 1, wherein the magnetic core comprises a bent shape when viewed in a direction parallel to the first main surface.

6. The antenna device according to claim 1, wherein the planar first coil and the planar second coil each have a bent shape when viewed in a direction parallel to the first main surface of the magnetic core.

7. The antenna device according to claim 1, wherein at least one of the planar first and second coils is disposed on or in a board.

8. The antenna device according to claim 7, further comprising an electronic component implemented on or in the board.

9. The antenna device according to claim 7, further comprising a plurality of first tap extended lines respectively connected to different points of the first coil and a plurality of second tap extended lines respectively connected to different points of the second coil, with at least one of the plurality of first tap extended lines being connected to at least one of the plurality of second tap extended lines.

10. The antenna device according to claim 7, further comprising an external connector on the board.

11. The antenna device according to claim 1, wherein the planar first coil is configured such that a first driver circuit for driving the planar first coil is connectable to the planar first coil, and the planar second coil is configured such that a second driver circuit for driving the planar second coil in synchronization with the driving of the planar first coil is connectable to the planar second coil.

12. The antenna device according to claim 1, wherein the planar first and second coils each comprise a conductor pattern formed in three or more conductor pattern layers.

13. The antenna device according to claim 12, further comprising a plurality of guard conductor pattern layers disposed outward in an axial direction of the planar first coil or the planar second coil, with each guard conductor pattern layer having such a shape that loop current does not flow and guard conductor patterns that are electrically connected to a ground.

14. The antenna device according to claim 12, wherein the respective conductor patterns in outermost layers of the three or more conductor pattern layers are connected in series with each other, and each has a respective end that is connected in series with each other and that is electrically connected to a ground.

15. The antenna device according to claim 1, wherein each of the planar first and second coils comprises an opening in a center region thereof with the magnetic core extending therethrough.

16. An antenna device comprising;
a magnetic core having a planar shape with first and second main surfaces that oppose each other;
a first coil having a first planar portion disposed on the first main surface of the magnetic core and a second planar portion disposed on the second main surface of the magnetic core, such that the first and second planar portions do not overlap each other in a plan view of the magnetic core; and
a second coil connected in series with the first coil and having a third planar portion disposed on the first main surface of the magnetic core and a fourth planar portion disposed on the second main surface of the magnetic core, such that the third and fourth planar portions do not overlap each other in the plan view,
wherein each of the first and second coils comprises an opening in a center region thereof with the magnetic core extending therethrough,
wherein the first planar portion is in a same plane as the third planar portion and the second planar portion is in a same plane as the fourth planar portion,
wherein a distance between the second and fourth planar portions is shorter than a distance between the second and third planar portions, and
wherein the first and second coils each comprise an electrical winding from an electrical winding start to an electrical winding end and that both extend in a clockwise direction or both extend in a counterclockwise direction from the electrical winding start to the electrical winding end.

17. A multiaxial antenna device comprising a plurality of antenna devices, with each antenna device including:
a magnetic core having first and second main surfaces that oppose each other and that extend in a first direction;
a planar first coil having a first portion disposed on the first main surface of the magnetic core and a second portion disposed on the second main surface of the magnetic core, such that the first and second portions of the planar first coil do not overlap each other in a plan view of the first or second main surfaces of the magnetic core, and
a planar second coil connected in series with the planar first coil and disposed next to the planar first coil in the first direction, with the planar second coil having a third portion disposed on the first main surface of the magnetic core and a fourth portion disposed on the second main surface of the magnetic core, such that the third and fourth portions of the planar second coil do not overlap each other in the plan view,
wherein a distance between the second and fourth portions is shorter than a distance between the second and third portions, and
wherein either respective electrical winding starts of the planar first and second coils are directly connected to each other with the planar first and second coils each having electrical winding directions that both extend from the electrical winding starts in a clockwise direction, or respective electrical winding ends of the planar first and second coils are directly connected to each other with the planar first and second coils each having electrical winding directions that both extend from the electrical winding ends in a counterclockwise direction.

18. The multiaxial antenna device according to claim 17, wherein the magnetic core has an integrally formed cross shape.

* * * * *